(12) United States Patent
D'Agostini et al.

(10) Patent No.: US 10,584,051 B2
(45) Date of Patent: Mar. 10, 2020

(54) DOUBLE-STAGED OXY-FUEL BURNER

(71) Applicant: Air Products and Chemicals, Inc., Allentown, PA (US)

(72) Inventors: Mark Daniel D'Agostini, Allentown, PA (US); Aleksandar Georgi Slavejkov, Allentown, PA (US); Michael David Buzinski, Slatington, PA (US); William J. Horan, Bear Creek Township, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 164 days.

(21) Appl. No.: 15/865,911

(22) Filed: Jan. 9, 2018

(65) Prior Publication Data

US 2018/0237323 A1 Aug. 23, 2018

Related U.S. Application Data

(60) Provisional application No. 62/461,946, filed on Feb. 22, 2017.

(51) Int. Cl.
*C03B 5/235* (2006.01)
*F23D 14/22* (2006.01)
(Continued)

(52) U.S. Cl.
CPC .............. *C03B 5/2353* (2013.01); *F23C 5/28* (2013.01); *F23D 14/22* (2013.01); *F23D 14/32* (2013.01);
(Continued)

(58) Field of Classification Search
CPC .......... F23N 5/003; F23N 5/02; C03B 5/2353; F23C 5/28; F23C 2900/06041;
(Continued)

(56) References Cited

U.S. PATENT DOCUMENTS

| 5,431,559 A | 7/1995 | Taylor |
| 5,575,637 A | 11/1996 | Slavejkov et al. |

(Continued)

FOREIGN PATENT DOCUMENTS

| CN | 1439842 | 9/2003 |
| CN | 1507549 | 6/2004 |

(Continued)

*Primary Examiner* — Alfred Basichas
(74) *Attorney, Agent, or Firm* — Larry S. Zelson

(57) ABSTRACT

An oxy-fuel burner including a central burner element having a central conduit terminating in a central nozzle and an annular conduit terminating in an annular nozzle surrounding the central conduit, the central conduit flowing a first reactant and the annular conduit flowing a second reactant; a first staging conduit spaced apart from a side of the central burner element and terminating in a first staging nozzle; a second staging conduit spaced apart from an opposite side the central burner element and terminating in a second staging nozzle; a first mechanism to apportion a flow of the second reactant into a non-zero primary flow of the second reactant directed to the annular conduit and a non-zero secondary flow of the second reactant; and a second mechanism to selectively apportion the secondary flow of the second reactant between the staging conduits; wherein one reactant is fuel and the other reactant is oxygen.

19 Claims, 49 Drawing Sheets

(51) Int. Cl.
*F23D 14/32* (2006.01)
*F23D 14/56* (2006.01)
*F23M 5/02* (2006.01)
*F23C 5/28* (2006.01)
*F23N 5/00* (2006.01)
*F23N 5/02* (2006.01)

(52) U.S. Cl.
CPC .............. *F23D 14/56* (2013.01); *F23M 5/025* (2013.01); *F23N 5/003* (2013.01); *F23N 5/02* (2013.01); *F23C 2201/101* (2013.01); *F23C 2900/06041* (2013.01); *F23D 2900/00013* (2013.01); *Y02E 20/344* (2013.01)

(58) Field of Classification Search
CPC .... F23C 2201/101; F23D 14/32; F23D 14/56; F23D 14/22; F23D 2900/00013; F23M 5/025; Y02E 20/344
See application file for complete search history.

(56) References Cited

U.S. PATENT DOCUMENTS

| | | |
|---|---|---|
| 5,611,682 A | 3/1997 | Slavejkov et al. |
| 7,390,189 B2 | 6/2008 | D'Agostini |
| 2012/0247376 A1 | 10/2012 | Matsumoto et al. |
| 2015/0068437 A1 | 3/2015 | Kang et al. |

FOREIGN PATENT DOCUMENTS

| | | |
|---|---|---|
| EP | 2166284 | 3/2010 |
| JP | 02-085219 | 7/1990 |
| JP | 04-228433 | 8/1992 |
| JP | 9229315 | 9/1997 |
| JP | 11-082941 | 3/1999 |
| JP | 2013170740 A | 9/2013 |
| KR | 20010090506 | 10/2001 |
| KR | 20160138915 | 12/2016 |

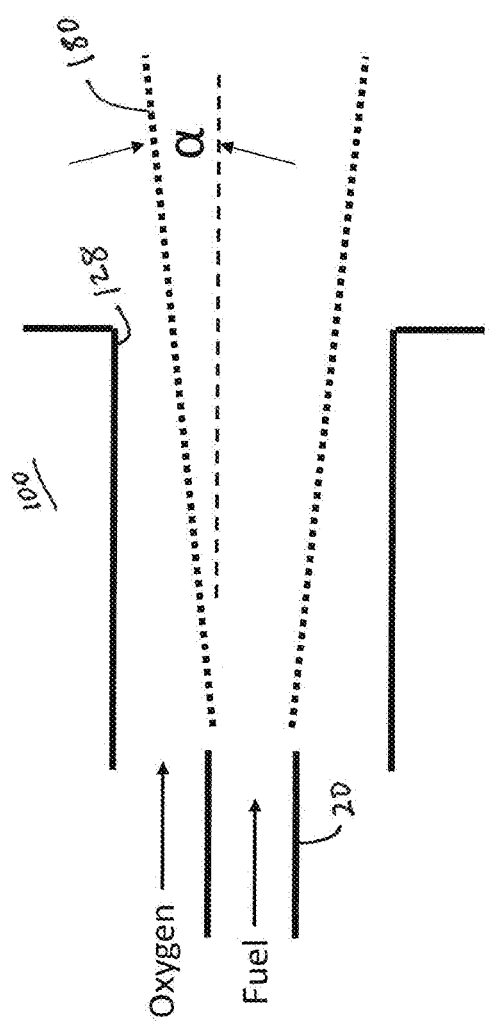

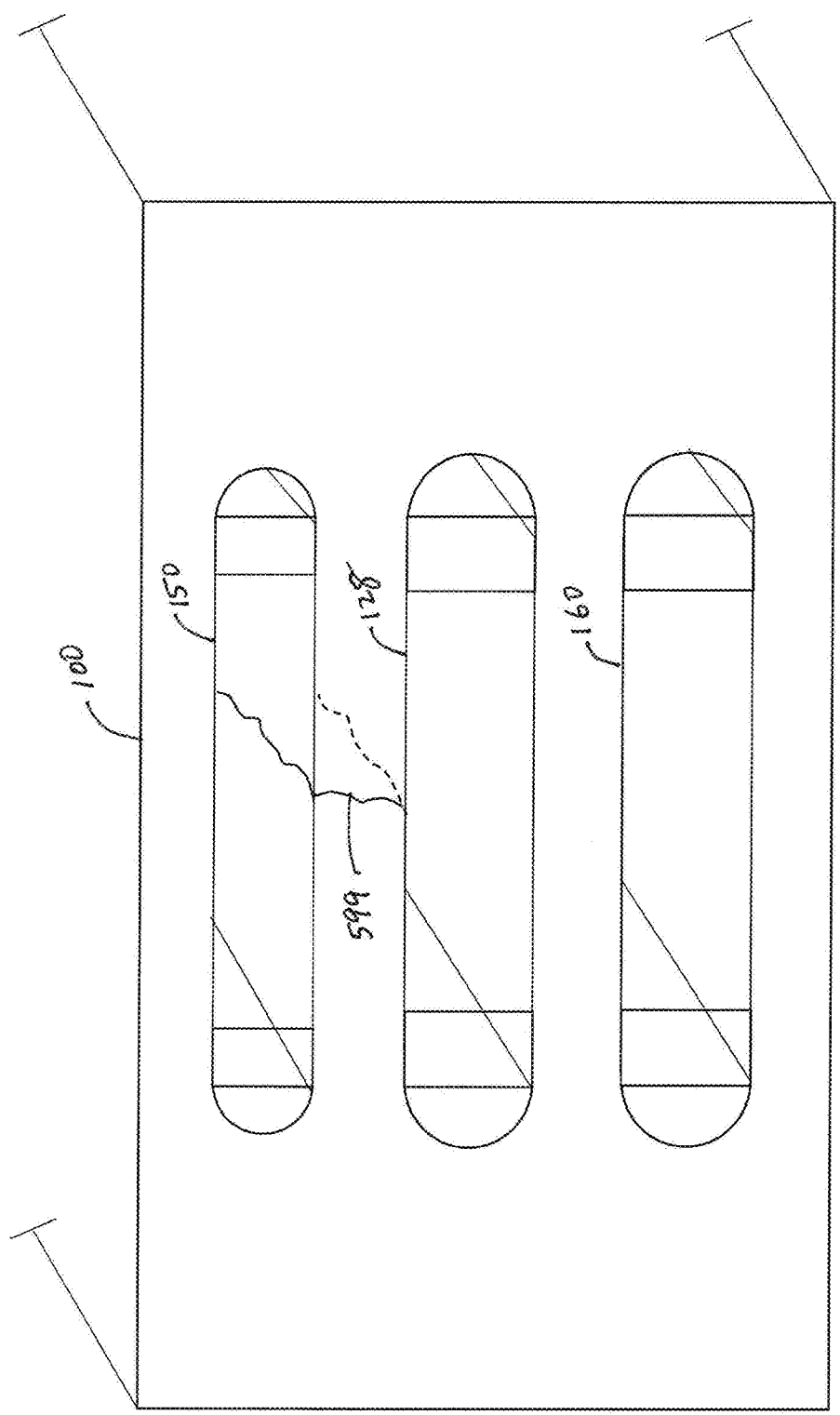

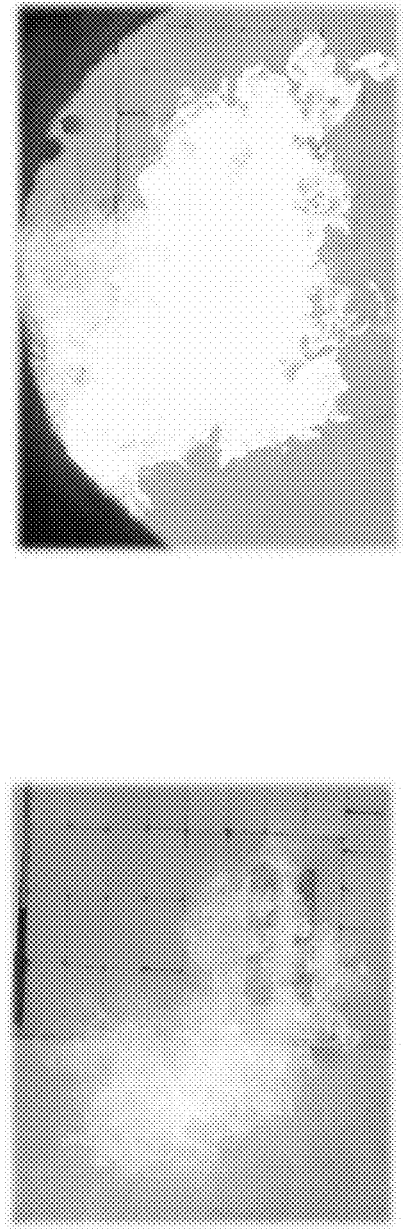
FIG. 32A
FIG. 32B
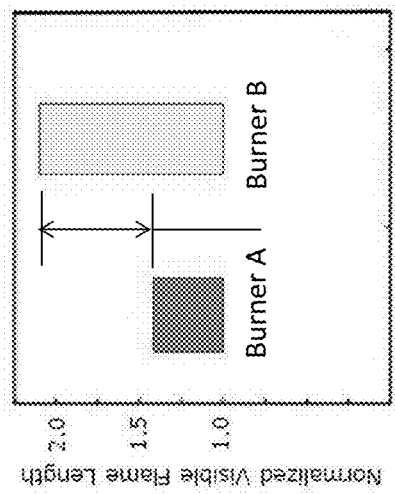
FIG. 32C

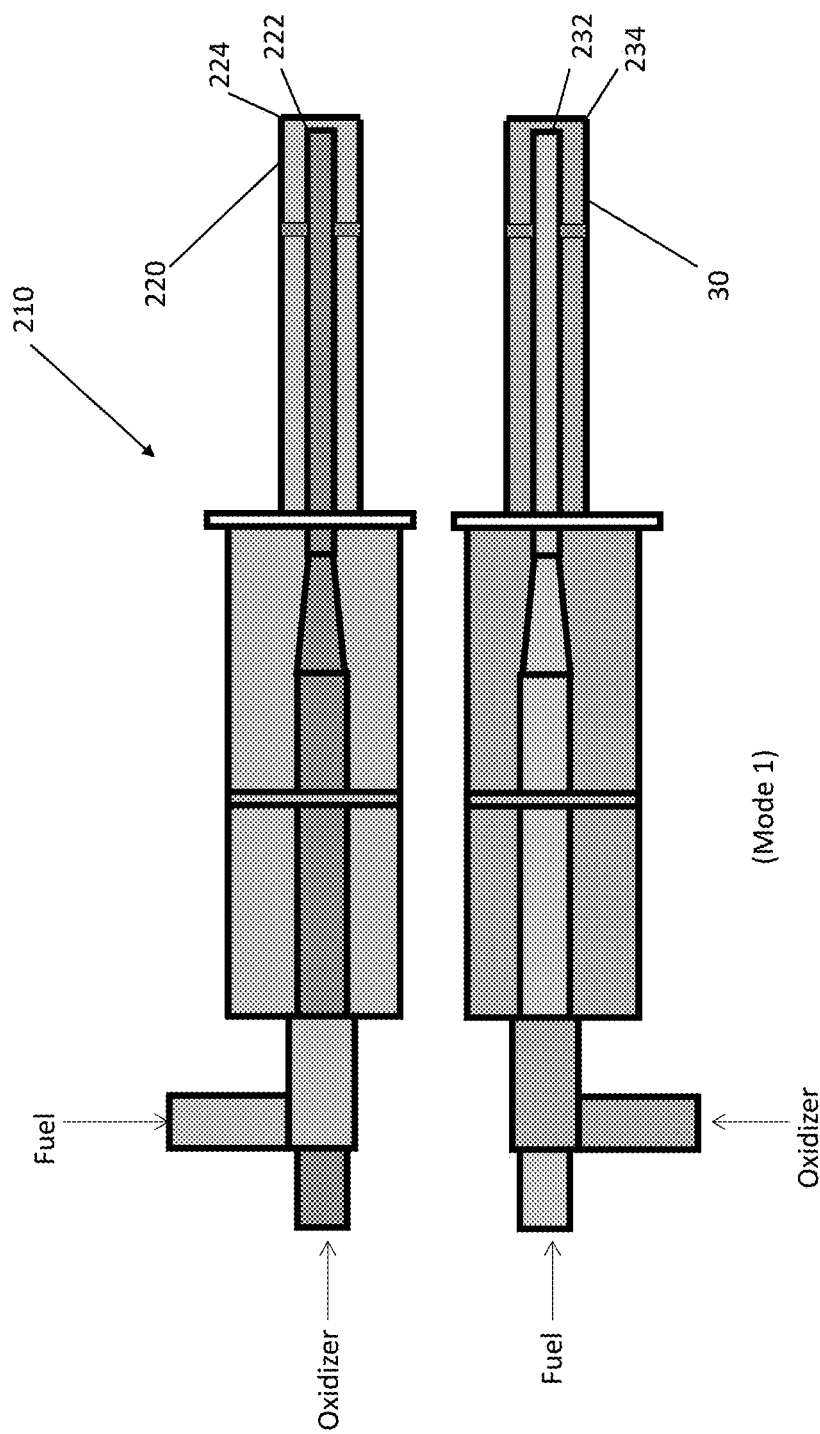
FIG. 43 (Mode 1)

DOUBLE-STAGED OXY-FUEL BURNER

CROSS-REFERENCE TO RELATED APPLICATIONS

This application claims priority from, and incorporates by reference in its entirety, U.S. Provisional Patent Application No. 62/461,946 filed on 22 Feb. 2017.

BACKGROUND

This application relates to an oxy-fuel burner and method of operating such burner, and specifically to an oxy-fuel burner having the ability to produce staged flames in two alternate configurations, wherein staging oxygen is introduced either above or below a fuel-rich primary flame, or simultaneously both above and below a fuel-rich primary flame, depending on furnace operating conditions and parameters.

Certain problems that persist in oxy-fuel combustion, and in particular oxy-fuel combustion in glass furnaces, have been solved by burners and methods of the present application.

First, it is difficult to generate high luminosity in an oxygen-natural gas flame. Soot formation in hydrocarbon gas flames is needed for substantial thermal radiation in the visible and near-infrared ranges of the electromagnetic spectrum. It is well known that the most commonly used hydrocarbon gaseous fuel, natural gas, which comprises principally methane and relatively minor amounts of other hydrocarbon gases and other diluent gases, has the lowest soot-forming propensity of all the major hydrocarbon gases. Hence, in practice it is relatively difficult to generate a high luminosity flame from natural gas. This inherent difficulty is compounded in oxy-fuel flames because any soot that is able to be generated, once formed, is short-lived. This is due to the exceedingly high reactivity of natural gas fuel with oxygen, particularly at the ultra-high flame temperatures generated in oxy-fuel combustion. One prior art approach to the problem has been through the use of an in-burner chamber for thermally "cracking" the natural gas by pre-mixing and igniting a fuel-rich oxy-gas mixture to form soot, then introducing the soot-containing products into a burner nozzle where they are mixed with oxygen to produce a flame that penetrates into the glass melting furnace. One inherent difficulty with this approach is that pre-mixing takes place in an internal chamber of the burner, and this exposes the burner metal to very high temperatures, while also risking internal fouling of burner passages due to soot deposition. Moreover, the flame formed by this device and/or method is difficult to adjust due to the very specific reactant composition required for cracking.

Another approach to soot formation relies on the coupled effects of maximizing interfacial area between fuel and oxygen by using a nozzle with high aspect ratio (i.e., wide-flame or flat-flame) and forming of a fuel-rich primary flame with the balance of oxygen gradually introduced or "staged" on the under-side of the flame adjacent the glass surface. See, for example, the burners of U.S. Pat. Nos. 5,575,637; 5,611,682; and 7,390,189. Data published in the '189 patent and reproduced herein in FIG. 48, show that peak underside (i.e., downward) flame radiation increases with increasing equivalence ratio of the primary flame; hence, at higher oxygen staging levels. While this approach is not burdened by the risk of premixing of fuel and oxygen, it is, for practical reasons, limited in the extent of oxygen staging that can be achieved. This is because oxygen flows between the flame boundary and internal walls of the precombustor, and thereby serves to convectively cool the precombustor walls from flame radiation and impingement. The extent of oxygen staging of the primary flame is thus dictated by cooling requirements, and the primary flame fuel-oxygen equivalence ratio is generally limited to a maximum of 3 (i.e., about ⅔ of the oxygen flowing through the secondary or staging nozzle, with ⅓ of the oxygen remaining in the primary nozzle to combust with 100% of the fuel, hence a 3:1 primary equivalence ratio) in commercial systems. But, as shown in FIG. 48, higher equivalence ratios are needed to maximize downward flame radiation to the glass surface.

Second, foam production and control can be a very significant problem in glass melting furnaces. The high moisture and oxygen concentrations produced in oxy/fuel combustion have been linked to higher amounts of secondary foam in glass melting furnaces than is typically present in air-fuel furnaces. Secondary foam is known to substantially restrict heat transfer between the combustion space and the glass melt, which lowers average glass temperature leading to poorer glass quality and decreases overall thermal efficiency, while increasing refractory temperature and erosion rates, thus shortening refractory lifetime. In the past, others have attempted to reduce or mitigate foam by various ad hoc methods with varying degrees of success. Some of these methods include; a) adding or removing refining agents to/from the batch, b) spraying fuel onto the surface of the glass, c) changing the burner oxygen/fuel or air/fuel ratio to more fuel-rich operation, d) reducing glass pull rate, e) increasing furnace pressure, and f) adjusting burner firing rates. Often, however, the same approach will not work in different furnaces, due for example to differences in batch chemistry, furnace temperature and flow patterns. What is therefore needed is a device and associated systematic method of foam reduction that is reliable, convenient, unobtrusive and inexpensive.

It is known that oxy-fuel combustion for glass melting has several benefits as compared to air-fuel combustion, such as lower capital cost, higher fuel efficiency, reduced $NO_x$ emissions, and higher glass quality. Oxygen staging can further increase those benefits. In particular, oxygen staging can be used to reduce $NO_x$ emissions and increase melting efficiency and product quality. "Oxygen staging" is a means of delaying combustion by diversion of a portion of oxygen away from the flame. Preferably, near-flame staging is used in which the staged oxygen stream (or streams) maintains a proximity to the flame to ensure eventual co-mixing and complete combustion of the fuel with oxygen.

The '189 patent describes an oxy-fuel burner with typical "under-staged" oxygen, and produces a flame that illustrates several key principles. The flame, being initially deprived of stoichiometric oxygen, generates soot and carbon monoxide (CO), the magnitude of which increases with the percentage of staged oxygen. The sooty region, in particular, comprises a cloud of microscopic carbonaceous particles and can be quite opaque, thereby presenting an impediment to radiation heat transfer. Conversely, due principally to the reaction of soot and staged oxygen, the under-side of the flame is very luminous, and transmits high rates of thermal radiation in the visible and near infrared regions of the electromagnetic spectrum. Since the radiation finds strong resistance in the adjacent soot cloud, the majority is directed downward to the glass surface. Melting efficiency is thereby increased relative to an un-staged flame. Moreover, as complete mixing of fuel and oxygen is delayed, the staged flame is longer than an un-staged one with the same fuel flow rate. This fact, combined with the enhanced visible and near-infrared radiation, ensures that peak flame temperatures are lower in the staged flame.

Results of computational fluid dynamics (CFD) modeling of highly staged and un-staged oxy-fuel flames have shown that peak temperatures of the highly staged flame are lower by approximately 600° C. The substantially lower temperature in combination with the oxygen-starved condition of the staged flame leads to lower rates of $NO_x$ generation. Photos of the burner of the '189 patent operating in both the non-staged and under-staged modes effectively illustrate the differences in flame structure and radiant properties produced by under-flame staging with oxygen (see the flame of FIG. 26A, without oxygen staging versus the flame of FIG. 26B with oxygen under-flame staging).

Replacing non-staged burners with under-staged burners has shown that under-staging the flame with oxygen increases glass bottom temperatures, and this contributes to stronger convection currents in the glass melt, promoting more complete elimination of impurities and, hence, fewer glass defects. In one typical case of a funnel glass furnace converted from non-staged to under-staged oxy-fuel burners, bottom glass temperatures increased by 10° C., while defects were reduced by nearly 50%. Furnace flue gas temperatures also decreased by 60° C., contributing to a reduction in specific fuel usage (energy input per unit output of glass) equal to nominally 9%.

However, there is another aspect to the oxygen staging/glass quality relationship that has not been addressed in previous implementations of oxy-fuel to glass furnaces— glass surface foam. Foam forms within both the batch melting (primary foam) and fining (secondary foam) processes due to the evolution of gases from the glass. Secondary foam, which consists principally of sulfur dioxide, water vapor and oxygen, is particularly prone to aggregate in a stable layer of bubbles that, at times, can grow to several inches in thickness. The principal deleterious effects of surface foam are its impedance of heat transfer to the glass, consequent reflection of thermal energy to the crown, and its corrosive properties with respect to furnace refractories. With respect to the lower rate of heat transfer to the glass, this lowers glass temperatures and weakens convection-driven secondary flows within the melt, interrupting the fining process and allowing more defects to persist through to the finished product.

SUMMARY

A dual-staged oxy-fuel burner is described herein that provides operational advantages over existing oxy-fuel burners for glass melting furnaces. In particular, the presently claimed burner exhibits lower specific energy consumption, decreased NOx production, and improved glass quality.

Aspect 1. An oxy-fuel burner comprising: a central burner element comprising: a central conduit having a central axis and terminating in a central nozzle; and an annular conduit terminating in an annular nozzle surrounding and coaxial with the central conduit, the annular conduit and the central conduit being separated by an annular wall; the central conduit being arranged to flow a first reactant and the annular conduit being arranged to flow a second reactant; a first staging conduit spaced apart from a side of the central burner element and terminating in a first staging nozzle; a second staging conduit spaced apart from an opposite side the central burner element and terminating in a second staging nozzle; a first mechanism arranged to apportion a flow of the second reactant into a non-zero primary flow of the second reactant directed to the annular conduit and a non-zero secondary flow of the second reactant; and a second mechanism arranged to selectively apportion the secondary flow of the second reactant between the first staging conduit and the second staging conduit; wherein one of the first and second reactants is a fuel and the other of the first and second reactants is oxygen.

Aspect 2. The oxy-fuel burner of Aspect 1, wherein the central nozzle and the annular nozzle each have a non-circular shape with an aspect ratio of greater than or equal to 2, wherein the aspect ratio is the ratio of the maximum opening dimension to the minimum opening dimension.

Aspect 3. The oxy-fuel burner of Aspect 2, wherein the staging conduits each have a non-circular shape with an aspect ratio of greater than or equal to 2, wherein the aspect ratio is the ratio of the maximum opening dimension to the minimum opening dimension, and wherein an axis defining the maximum opening dimension of the central nozzle and axes defining the respective maximum opening dimensions of each of the staging conduits are substantially parallel to each other.

Aspect 4. The oxy-fuel burner of any one of Aspects 1 to 3, wherein the first mechanism comprises a variable flow restriction to regulate the primary flow of the second reactant to the annular conduit, thereby indirectly regulating the secondary flow of the second reactant to the second mechanism in a complimentary manner.

Aspect 5. The oxy-fuel burner of any one of Aspects 1 to 4, wherein the second mechanism comprises a valve to selectively direct the flow of the second reactant between the first staging conduit and the second staging conduit.

Aspect 6. The oxy-fuel burner of Aspect 5, wherein the valve is a three-way valve configured to direct the secondary flow of the second reactant to the first staging conduit or to the second staging conduit or to a combination of the first staging conduit and the second staging conduit concurrently.

Aspect 7. The oxy-fuel burner of any one of Aspects 1 to 6, wherein the first reactant is fuel and the second reactant is oxygen.

Aspect 8. The oxy-fuel burner of any one of Aspects 1 to 6, wherein the first reactant is oxygen and the second reactant is fuel.

Aspect 9. The oxy-fuel burner of any one of Aspects 1 to 8, further comprising an apparatus for sensing conditions within a furnace into which the burner is firing, the apparatus being configured to actuate the second mechanism to direct the secondary flow of the second reactant to the first staging conduit or to the second staging conduit or to a combination of the first staging conduit and the second staging conduit concurrently, depending on the sensed condition.

Aspect 10. The oxy-fuel burner of any one of Aspects 1 to 9, further comprising a burner block having a central passage into which the central burner element exhausts, and first and second staging passages into which the first and second staging nozzles, respectively, exhaust.

Aspect 11. The oxy-fuel burner of any one of Aspects 1 to 10, further comprising: a bluff body positioned in the annular nozzle and forming an inner nozzle on one side of the bluff body proximal to the annular wall and an outer nozzle on an opposite side of the bluff body distal from the annular wall, the inner nozzle having a smaller cross-sectional area than the outer nozzle.

Aspect 12. The oxy-fuel burner of Aspect 11, wherein the inner nozzle has a non-zero cross-sectional area no more than 10% that of the outer nozzle.

Aspect 13. The oxy-fuel burner of Aspect 11, further comprising: a bluff body having a height, the bluff body being positioned on the central axis of the central conduit and upstream of the central nozzle by an axial distance of 2 to 20 times the bluff body height.

Aspect 14. The oxy-fuel burner of Aspect 13, further comprising: a splitter plate positioned along the central axis of the central conduit downstream of the bluff body, the splitter plate having a length of 1 to 10 times the bluff body height.

Aspect 15. A method of operating an oxy-fuel glass furnace containing a glass bath and comprising a melting region and a refining region, wherein a first plurality of the oxy-fuel burners of any one of Aspects 1 to 14 are positioned to fire in the melting region and a second plurality of the oxy-fuel burners of any one of Aspects 1 to 14 are positioned to fire in the refining region, wherein for each burner the first staging conduit is positioned between the central burner element and the glass bath and the second staging conduit is positioned between the central burner element and a roof of the furnace, the method comprising: flowing fuel as the first reactant and oxygen as the second reactant; operating the first plurality of oxy-fuel burners to create an oxygen-rich (oxidizing) atmosphere adjacent to the glass bath; and operating the second plurality of oxy-fuel burners to create a fuel-rich (reducing) atmosphere adjacent to the glass bath.

Aspect 16. The method of Aspect 15, where the oxidizing atmosphere is created by apportioning at least 50% of the secondary oxygen flow in the first plurality of oxy-fuel burners to the first staging conduit; and wherein the reducing atmosphere is created by apportioning at least 70% of the secondary oxygen flow to the second staging conduit.

Aspect 17. The method of Aspect 15, wherein the oxidizing atmosphere is created by operating the first plurality of oxy-fuel burners fuel-lean with a stoichiometric ratio of greater than 1; and wherein the reducing atmosphere is created by operating the second plurality of oxy-fuel burners fuel-rich with a stoichiometric ratio of greater than 1; wherein stoichiometric ratio a burner is defined as the ratio of oxygen to fuel flow through the burner divided by the ratio of oxygen to fuel flow required for theoretically complete stoichiometric combustion with zero excess oxygen.

Aspect 18. The method of any one of Aspects 15 to 17, further comprising: measuring at least one furnace parameter selected from the group of: a parameter indicating a glass surface condition, a furnace temperature profile, a furnace exit gas temperature, and a furnace gas exit composition; and for at least one of the oxy-fuel burners, controlling one or more firing rate, oxygen/fuel ratio, and distribution of secondary oxygen flow based on the at least one measured furnace parameter.

Aspect 19. The method of Aspect 18, further comprising: when the measured parameter indicates glass surface foam, switching at least one of the burners in the first plurality of oxy-fuel burners from creating an oxidizing atmosphere adjacent to the glass bath to creating a reducing atmosphere adjacent to the glass bath.

Aspect 20. An oxy-fuel burner comprising: a first burner element comprising an first inner nozzle surrounded by a first annular nozzle; a second burner element spaced apart from the first burner element and comprising a second inner nozzle surrounded by a second annular nozzle; a first staging valve configured to direct a non-zero flow of a first reactant to the first inner nozzle and the remaining flow of the first reactant to the second annular nozzle; and a second staging valve configured to direct a non-zero flow of a second reactant to the second inner nozzle and the remaining flow of the second reactant to the first annular nozzle; wherein the first staging valve and the second staging valve are configured to achieve an equivalence ratio in the first burner element of about 0.01 to about 0.5 (fuel-lean), and an equivalence ratio in the second burner element from about 2 to about 150 (fuel-rich); and wherein the first reactant is one of fuel and oxygen, and the second reactant is the other of fuel and oxygen.

Aspect 21. The oxy-fuel burner of Aspect 20, further comprising a four-way valve having a fuel inlet, an oxygen inlet, a first outlet, and a second outlet; wherein in a first position the four-way valve directs fuel to the first staging valve and oxygen to the second staging valve, and in a second position the four-way valve directs oxygen to the first staging valve and fuel to the second staging valve.

Aspect 22. The oxy-fuel burner of Aspect 21, further comprising an apparatus for sensing foaming a glass melt surface in a furnace into which the burner is firing, the apparatus being configured to actuate the four-way valve between the first position and the second position depending on the presence or absence of sensed foaming.

Aspect 23. The oxy-fuel burner of any of Aspects 20 to 22, wherein the first burner element has a flat flame configuration with the first annular nozzle having an aspect ratio of at least two defined by a major axis length divided by a minor axis length; wherein the second burner element has a flat flame configuration with the second annular nozzle having an aspect ratio of at least two defined by a major axis length over a minor axis length; and wherein the major axes of the first and second annular nozzles are substantially parallel to each other.

Aspect 24. The oxy-fuel burner of any one of Aspects 20 to 23, wherein first burner element flows reactants in the direction of a longitudinal axis; wherein the second burner element flows reactants in the direction of a longitudinal axis; and wherein the longitudinal axes of the first and second burner elements are substantially parallel to each other and are sufficiently proximal to each other such that the first-reactant-rich flame and the second-reactant-rich flame interact with each other at a distance downstream of an exit plane of the burner.

Aspect 25. The oxy-fuel burner of any of Aspects 20 to 24, wherein the first inner nozzle and the first annular nozzle of the first burner element are sized to flow an amount of second reactant through the first annular nozzle that is at least 5 times the amount required for stoichiometric combustion with the first reactant flowed through the first inner nozzle.

Aspect 26. The oxy-fuel burner of Aspect 25, wherein the first inner nozzle and the first annular nozzle of the first burner element are sized to flow an amount of second reactant through the first annular nozzle that is at least 10 times the amount required for stoichiometric combustion with the first reactant flowed through the first inner nozzle.

Aspect 27. The oxy-fuel burner of Aspect 26, wherein the first inner nozzle and the first annular nozzle of the first burner element are sized to flow an amount of second reactant through the first annular nozzle that is at least 20 times the amount required for stoichiometric combustion with the first reactant flowed through the first inner nozzle.

Aspect 28. The oxy-fuel burner of any of Aspects 20 to 27, wherein the second inner nozzle and the second annular nozzle of the first burner element are sized to flow an amount of first reactant through the second annular nozzle that is at least 5 times the amount required for stoichiometric combustion with the second reactant flowed through the second inner nozzle.

Aspect 29. The oxy-fuel burner of Aspect 28, wherein the second inner nozzle and the second annular nozzle of the first burner element are sized to flow an amount of first reactant through the second annular nozzle that is at least 10 times the amount required for stoichiometric combustion with the second reactant flowed through the second inner nozzle.

Aspect 30. The oxy-fuel burner of Aspect 29, wherein the second inner nozzle and the second annular nozzle of the first burner element are sized to flow an amount of first reactant through the second annular nozzle that is at least 20 times the amount required for stoichiometric combustion with the second reactant flowed through the second inner nozzle.

Aspect 31. The oxy-fuel burner of any of Aspects 20 to 30, further comprising: a controller programmed to control one or both of the first staging ratio and the second staging ratio by controlling the position, respectively, of one or both of the first stating valve and the second staging valve.

Aspect 32. The oxy-fuel burner of Aspect 31, further comprising: a first sensor assembly including one or more sensors selected from the group consisting of: a temperature sensor positioned to measure the temperature in the first annular nozzle, a pressure sensor positioned to measure the pressure in the first annular nozzle, and a combination of two or more of the foregoing; wherein the controller is programmed to control the position of one or both of the first staging valve and the second staging valve based on one or more of a measured temperature and a measured pressure in the first annular nozzle.

Aspect 33. The oxy-fuel burner of Aspect 32, further comprising: a second sensor assembly including one or more sensors selected from the group consisting of: a temperature sensor positioned to measure the temperature in the second annular nozzle, a pressure sensor positioned to measure the pressure in the second annular nozzle, and a combination of two or more of the foregoing; wherein the controller is programmed to control the position of one or both of the first staging valve and the second staging valve based on one or more of a measured temperature and a measured pressure in the second annular nozzle.

Aspect 34. The oxy-fuel burner of any of Aspects 20 to 33, wherein the first staging valve is configured to create an equivalence ratio in the first burner element from about 0.01 to about 0.25.

Aspect 35. The oxy-fuel burner of any of Aspects 20 to 34, wherein the second staging valve is configured to create an equivalence ratio in the second burner element from about 4 to about 150.

Aspect 36. The oxy-fuel burner of any of Aspects 20 to 35, wherein the first burner element and the second burner element are positioned in a unitary burner body.

Aspect 37. The oxy-fuel burner of any of Aspects 20 to 35, wherein the first burner element and the second burner element are positioned in separate burner bodies, and wherein the first and second staging valves each comprise separate flow control valves to independently control the flow of each of oxygen and fuel to each of the burner elements.

Aspect 38. A method of combusting fuel and oxygen into a furnace, comprising: flowing an inner stream of a first reactant surrounded by an annular stream of a second reactant into the furnace through a first burner element; and flowing an inner stream of a second reactant surrounded by an annular stream of a first reactant into the furnace through a second burner element; wherein the first reactant is one of fuel and oxygen, and the second reactant is the other of fuel and oxygen; wherein a first equivalence ratio in the first burner element is about 0.01 to about 0.5 (fuel-lean); and wherein a second equivalence ratio in the second burner element from about 2 to about 150 (fuel-rich).

Aspect 39. The method of Aspect 38, further comprising: forming a detached flame corresponding to the second burner element.

Aspect 40. The method of Aspect 38 or Aspect 39, wherein the total amount of the first reactant flowed into the furnace from the first and second burner elements is from about one-half to twice the amount required for stoichiometric combustion with the total amount of the second reactant flowed into the furnace from the first and second burner elements.

Aspect 41. The method of any of Aspects 38 to 40, further comprising: reversing the supplies of the first reactant and the second reactant such that the first reactant is flowed in the inner stream of the second burner element and the annular stream of the first burner element, and the second reactant is flowed in the inner stream of the first burner element and the annular stream of the second burner element.

Aspect 42. The method of Aspect 41, further comprising: detecting the presence or absence of an undesired condition of the charge in the furnace; and reversing the supplies of the first reactant and the second reactant in response to the detected presence or absence of an undesired condition of the charge in the furnace.

Aspect 43. The method of any of Aspects 38 to 42, wherein the annular streams of reactants are each flowed through nozzles having an aspect ratio of at least two and having major axes substantially parallel to each other; and wherein the major axes of the nozzles are positioned substantially parallel to a bottom of the furnace.

Aspect 44. The method of any of Aspects 38 to 43, wherein the first equivalence ratio is about 0.01 to about 0.25.

Aspect 45. The method of any of Aspects 38 to 44, wherein the second equivalence ratio is about 4 to about 150.

Aspect 46. The method of any of Aspects 38 to 45, further comprising: controlling the one or both of first equivalence ratio based on a parameter selected from the group consisting of: a temperature in the annular stream of the second reactant, a pressure in the annular stream of the second reactant, a temperature in the annular stream of the first reactant, a pressure in the annular stream of the first reactant, and a combination of one or more of the foregoing.

Aspect 47. An oxy-fuel burner comprising: a first burner element comprising an first inner nozzle surrounded by a first annular nozzle; a second burner element spaced apart from the first burner element and comprising a second inner nozzle surrounded by a second annular nozzle; a first staging valve configured to direct a non-zero flow of a first reactant to the first inner nozzle and the remaining flow of the first reactant to the second annular nozzle, wherein a first staging ratio of the flow through the second annular nozzle to the flow through the first inner nozzle is from about 80% to about 98%; and a second staging valve configured to direct a non-zero flow of a second reactant to the second inner nozzle and the remaining flow of the second reactant to the first annular nozzle, wherein a second staging ratio of the flow through the first annular nozzle to the flow through the second inner nozzle is from about 80% to about 98%;

wherein the first reactant is one of fuel and oxygen, and the second reactant is the other of fuel and oxygen.

Aspect 48. A method of combusting fuel and oxygen into a furnace, comprising: flowing an inner stream of a first reactant surrounded by an annular stream of a second reactant into the furnace through a first burner element; and flowing an inner stream of a second reactant surrounded by an annular stream of a first reactant into the furnace through a second burner element; wherein the first reactant is one of fuel and oxygen, and the second reactant is the other of fuel and oxygen; wherein a first staging ratio of the first reactant in the annular stream of the second burner element to the first reactant in the inner stream of the first burner element is from about 80% to about 98%; and wherein a second staging ratio of the second reactant in the annular stream of the first burner element to the second reactant in the inner stream of the second burner element is from about 80% to about 98%.

Aspect 49. The method of Aspect 48, further comprising: forming a detached flame corresponding to the outer stream of fuel containing about 80% to about 98% of the fuel and the inner stream of oxygen containing about 2% to about 20% of the oxygen.

Aspect 50. An oxy-fuel burner comprising: a first burner element comprising an first inner nozzle configured to flow a first reactant at an inner first reactant flow rate surrounded by a first annular nozzle configured to flow a second reactant at an annular second reactant flow rate; a second burner element spaced vertically apart from the first burner element and comprising a second inner nozzle configured to flow the second reactant at an inner second reactant flow rate surrounded by a second annular nozzle configured to flow the first reactant at an annular first reactant flow rate; wherein the inner first reactant flow rate, the inner second reactant flow rate, the annular first reactant flow rate, and the annular second reactant flow rate are set to achieve an equivalence ratio in the first burner element of about 0.01 to about 0.5 (fuel-lean), and wherein an equivalence ratio in the second burner element from about 2 to about 150 (fuel-rich); and wherein the first reactant is one of fuel and oxygen, and the second reactant is the other of fuel and oxygen.

Aspect 51. The oxy-fuel burner of Aspect 50, wherein at least one of the first burner element and the second burner element has a wide aspect ratio of at least 2.

Aspect 52. A method of combusting fuel and oxygen, comprising: flowing an inner stream of a first reactant surrounded by an annular stream of a second reactant into the furnace through a first burner element; and flowing an inner stream of a second reactant surrounded by an annular stream of a first reactant into the furnace through a second burner element spaced vertically apart from the first burner element; wherein the first reactant is one of fuel and oxygen, and the second reactant is the other of fuel and oxygen; wherein an equivalence ratio in the first burner element is about 0.01 to 0.5 (fuel-lean) and wherein an equivalence ratio in the second burner element is about 2 to about 150 (fuel-rich).

Aspect 53. The method of Aspect 52, further comprising forming a detached flame corresponding to the second burner element.

Aspect 54. An oxy-fuel burner comprising: a first burner element configured to provide a fuel-rich mixture, comprising an inner oxygen nozzle surrounded by an annular fuel nozzle; a second burner element spaced apart from the first burner element and configured to provide an oxygen-rich mixture, comprising an inner fuel nozzle surrounded by an annular oxygen nozzle; a first staging valve configured to direct a non-zero flow of oxygen to the inner oxygen nozzle and the remaining flow of oxygen to the annular oxygen nozzle, wherein about 80% to about 98% of the oxygen is directed to the annular oxygen nozzle of the second burner element and about 2% to about 20% of the oxygen is directed to the inner oxygen nozzle of the first burner element; and a second staging valve configured to direct a non-zero flow of fuel to the inner fuel nozzle and the remaining flow of fuel to the annular fuel nozzle, wherein about 80% to about 98% of the fuel is directed to the annular fuel nozzle of the first burner element and about 2% to about 20% of the fuel is directed to the inner fuel nozzle of the second burner element.

Aspect 55. A method of combusting fuel and oxygen in a furnace, comprising: flowing an inner stream of oxygen surrounded by an annular stream of fuel into the furnace through a first burner element; and flowing an inner stream of fuel surrounded by an annular stream of oxygen into the furnace through a second burner element spaced apart from the first burner element; wherein about 80% to about 98% of the oxygen is flowed in the annular stream of the second burner element and about 2% to about 20% of the oxygen is flowed in the inner stream of the first burner element; and wherein a about 80% to about 98% of the fuel is flowed in the annular stream of the first burner element and about 2% to about 20% of the fuel is flowed in the inner stream of the second burner element.

Aspect 56. The method of Aspect 55, further comprising: forming a detached flame corresponding to the first burner element.

BRIEF DESCRIPTION OF THE DRAWINGS

FIG. 14 is a schematic side cross-sectional view of a double staged burner showing a flame spreading rate defined by a flame spreading angle α.

FIG. 25 is a front end perspective view of a burner block as in FIG. 2 but showing a crack that can occur in the burner block.

FIG. 32A is a photographic front end view of a single-staged flat flame burner with 65% oxygen staging, fuel and 35% of the oxygen in the top port and 65% of the oxygen in the bottom port. FIG. 32B is a photographic front end view of a double-staged flat flame burner, with about 90% staged fuel surrounding about 10% of the oxygen in the top port and about 90% staged oxygen surrounding about 10% of the fuel in the bottom port. FIG. 32C is a graphic showing that the double-staged burner has both a longer flame and a greater degree of flame length control than the single-staged burner.

FIG. 43 is a side cross-sectional view of an embodiment of a double-staged oxy-fuel burner operated in Mode 1 wherein a fuel-rich burner element is positioned above a fuel-lean burner element.

DETAILED DESCRIPTION

Figure 1:
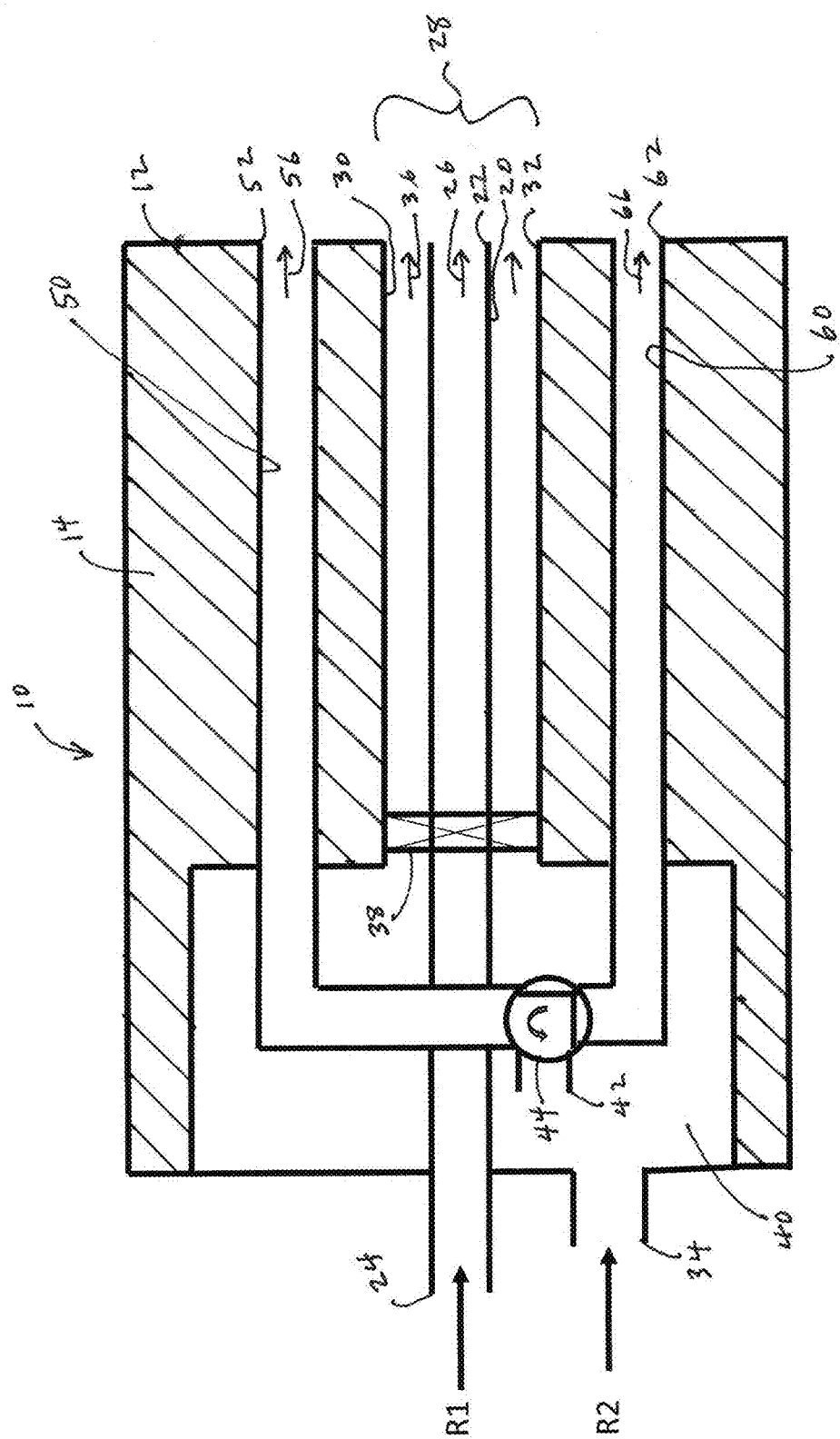
FIG. 1 is a side cross-sectional schematic view of a double-staged oxy-fuel burner.

As used herein, the term "oxygen" means an oxidant having a concentration of molecular oxygen ($O_2$) greater than that in air (i.e., greater than 20.9 mol %), and in some embodiments oxygen has at least 23 mol % $O_2$, at least 30 mol % $O_2$, at least 70 mol % $O_2$, or at least 90 mol % $O_2$.

As used herein, the term "oxy-fuel burner" means a burner combusting fuel and oxygen as defined herein.

As used herein, the term "fuel" includes any hydrocarbon mixture capable of combusting, and specifically includes gaseous, liquid, and pulverized solid fuels. All data presented herein was taken using natural gas as the fuel, but the results are believed to be generally applicable to other fuels, and particularly to other gaseous fuels.

As used herein, the term "staging" means that a portion of the staged reactant is supplied through a nozzle spaced apart from the burner element through which the other reactant is being supplied. For example, when discussing a burner element, if oxygen is staged, this means that fuel is flowed through the burner element along with an amount of oxygen that is less than the total amount of oxygen provided to the entire burner, and the remainder of the oxygen is flowed through another or secondary nozzle. If oxygen is staged at 75%, this means that 25% of the oxygen is provided to the burner element with the fuel (albeit in a different nozzle) and 75% of the oxygen is provided by a separate nozzle spaced apart from the burner element. Both fuel and oxygen can be staged. Staging can be correlated with the equivalence ratio in the burner element by knowing the total overall stoichiometry of the burner and the staging ratios.

A double-staged oxy-fuel burner is described herein. The burner achieves two objectives: (a) low NOx emissions and (b) gas atmosphere control adjacent the glass surface beneath the burner flame. Low NOx emissions are obtained by delivering fuel and oxygen in a highly staged manner, with a higher staging ratio than has been achievable in prior burners. Typically, oxygen is the staged reactant and fuel is the non-staged reactant, but it is understood that the designs herein would work equally well if oxygen were the non-staged reactant and fuel were the staged reactant. In the following descriptions, sometimes oxygen is discussed as the staged reactant and sometimes the description is more generic, but in both cases, it is understood that either fuel or oxygen could be the staged reactant.

Key factors influencing the rate of gas evolution and formation into foam include the batch composition, including the amount of sulfate added for fining, glass surface temperature, and furnace gas atmosphere. Secondary foam, which is of principal concern to glass quality, generally occurs between 1400° C. and 1500° C., with the volume of released fining gases and, hence, the severity of the foaming problem, increasing with temperature.

Concerning the gas atmosphere, a reducing environment immediately above the glass surface can mitigate a foam problem through modification of foam properties. The mechanism through which this occurs is a reducing gas, such as carbon monoxide, in contact with the foam, which acts to lower surface tension gradients at the liquid interfaces of the foam bubbles, thereby promoting accelerated drainage of foam back to the melt. This suggests the use of oxygen staging above the flame, i.e., creating a fuel-rich flame adjacent to the glass surface, as a means by which the combustion process can help to alleviate a foaming issue.

FIG. 1 shows a cross-sectional schematic of a burner 10 having a first reactant inlet 24 and a second reactant inlet 34, as well as a burner face 12 defining an exit plane of the burner 10. The first reactant inlet 24 feeds a first reactant R1 (mostly typically fuel) into a central conduit 20 that terminates in a central nozzle 22 at the burner hot face 12. The central nozzle 22 may be circular or it may be in a non-circular or wide or flat-flame configuration with an aspect ratio (maximum dimension to minimum dimension) of at least 2.

The second reactant inlet 34 feeds a second reactant R2 (most typically oxygen) into a plenum 40 that distributes the second reactant R2 between an annular conduit 30 that surrounds and is co-axial with the central conduit 20, and a staging inlet 42 from which the second reactant is delivered to one or both of a pair of staging conduits 50 and 60. The annular conduit 30 terminates in an annular nozzle 34 at the burner hot face 12. Together, the central conduit 20 and central nozzle 22, with annular conduit 30 and annular nozzle 32, form a central burner element 28.

The amount of flow apportioned between the annular conduit 30 and the staging inlet 42 is controlled by a variable flow restrictor 38 positioned at the junction of the plenum 40 and the annular conduit 30.

A first staging conduit 50 is parallel to and spaced apart from one side of the central burner element 28, and terminates in a first staging nozzle 52 at the burner hot face 12. A second staging conduit 60 is parallel to and spaced apart from an opposite side of the central burner element 28, and terminates in a second staging nozzle 62 at the burner hot face 12. A three-way valve 44 downstream of the staging inlet 42 apportions a staging flow of the second reactant between the first staging conduit 50 and the second staging conduit 60. The valve 44 may be positioned so that all of the second reactant staging flow is directed to the first staging conduit 50, or so that all of the second reactant staging flow is directed to the second staging conduit 60, or so that the second reactant staging flow is distributed with a non-zero portion being directed to the first staging conduit 50 and the non-zero balance being directed to the second staging conduit 60.

In a preferred embodiment, the first reactant is a fuel and the second reactant (which is staged) is oxygen. This embodiment is further illustrated in FIGS. 3, 4, and 5, showing the various operating modes of the burner 10.

Figure 3:
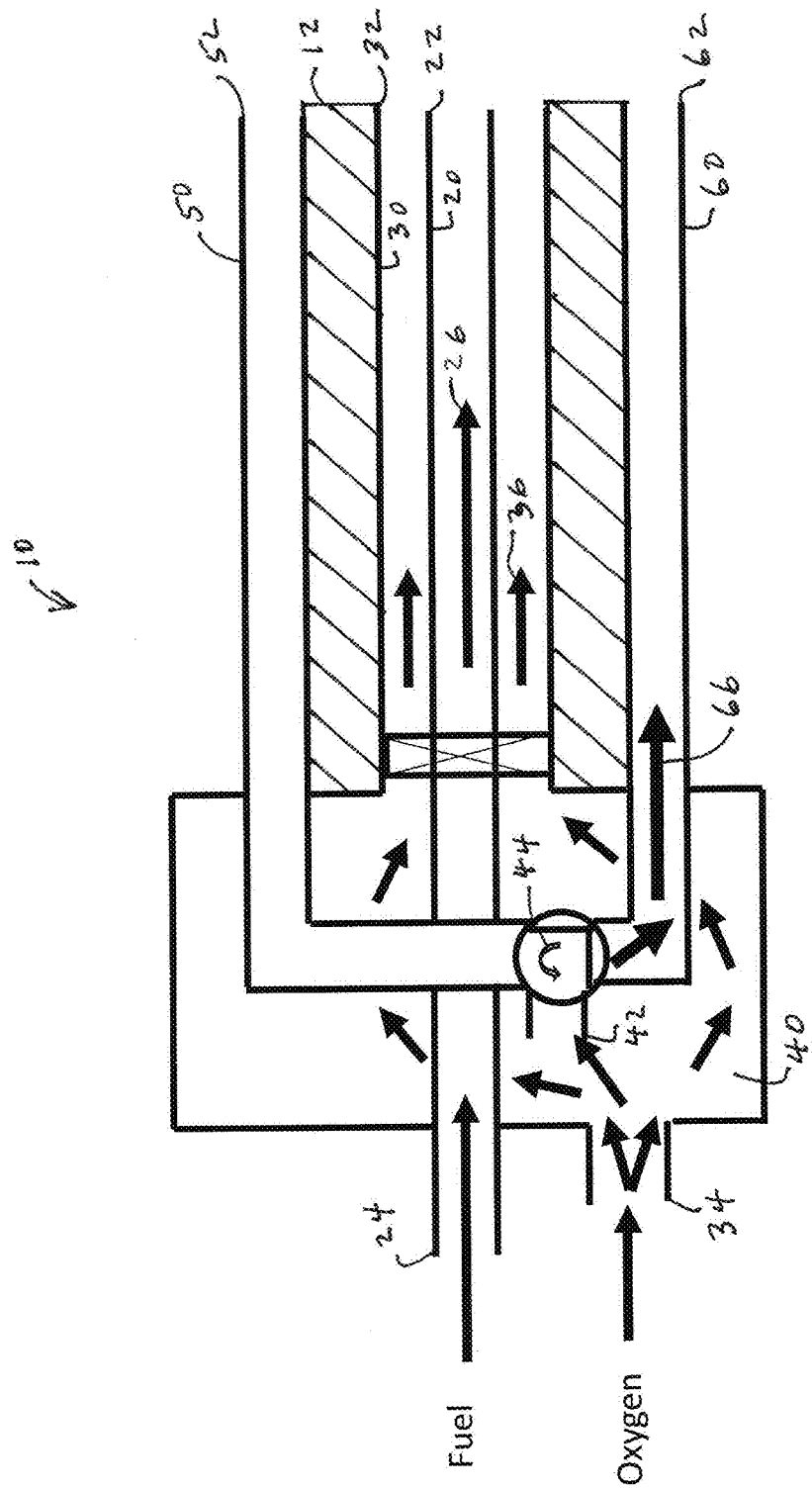
FIG. 3 is a side cross-sectional schematic view of a double-staged oxy-fuel burner as in FIG. 1, operating in an under-flame staging (under-staged) or melt mode.
Figure 6:
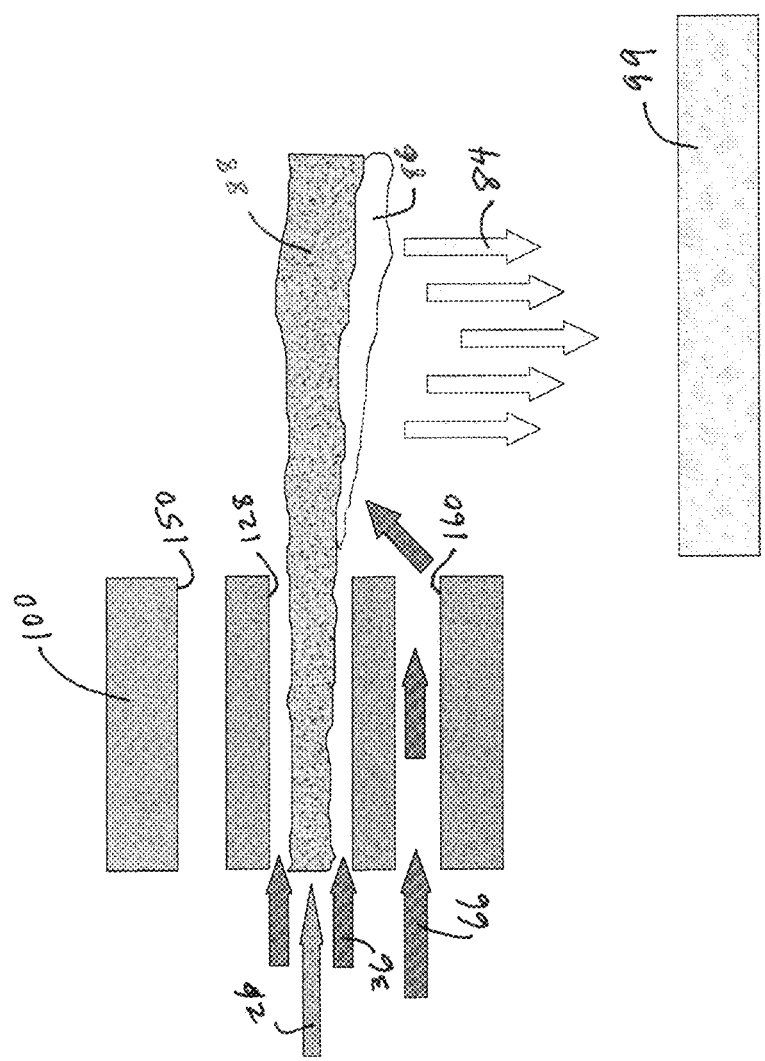
FIG. 6 is a side cross-sectional schematic view of a burner as in FIGS. 1 and 3, operating in a glass furnace in a melt mode wherein fuel is the first reactant and oxygen is the second reactant, and wherein secondary or staging oxygen is introduced below the fuel and primary oxygen port.
Figure 10:
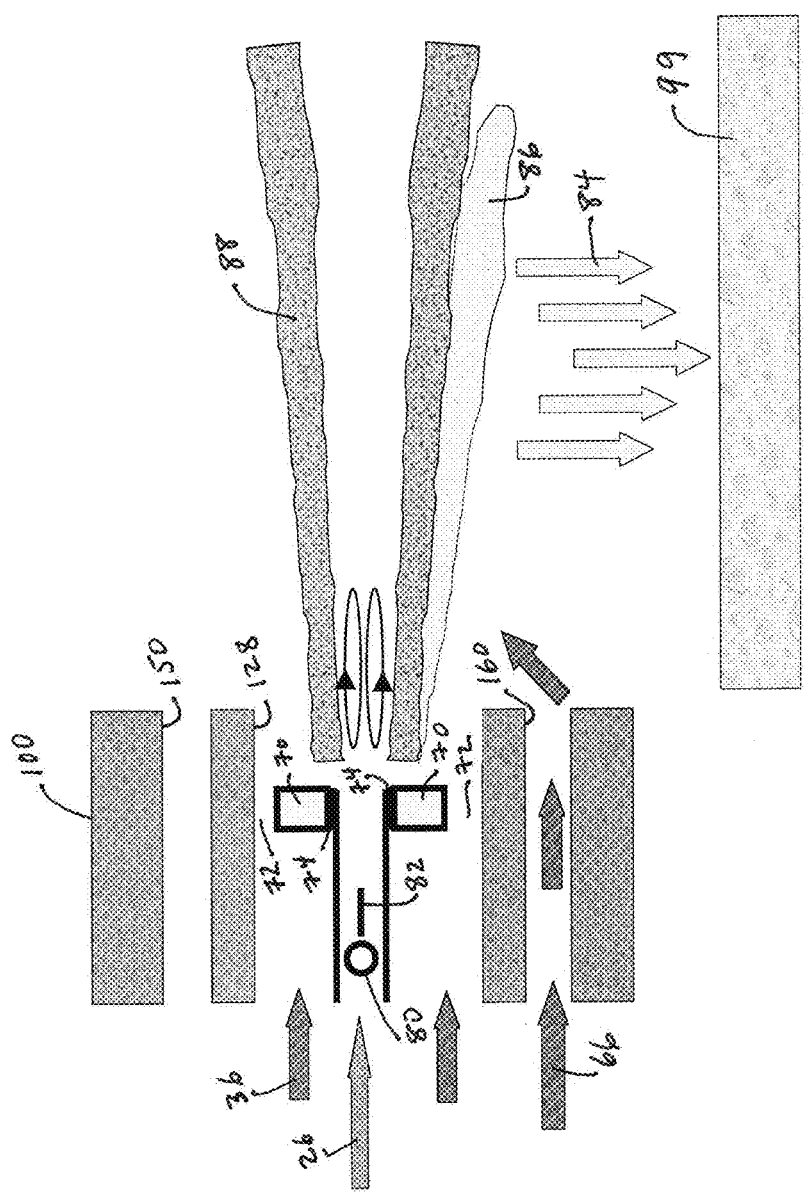
FIG. 10 is a side cross-sectional view of the operating mode as in FIG. 6, showing the flow effects of the flow divider and separator of FIG. 9 and the bluff bodies of FIGS. 8A and 8B.
Figure 12B:
FIGS. 12A-12C are photographic end views comparing the flames obtained in the operating modes of FIG. 3 (melt mode—FIG. 12A), FIG. 4 (foam control mode—FIG. 12B), and FIG. 5 (mixed mode—FIG. 12C).
Figure 12C:
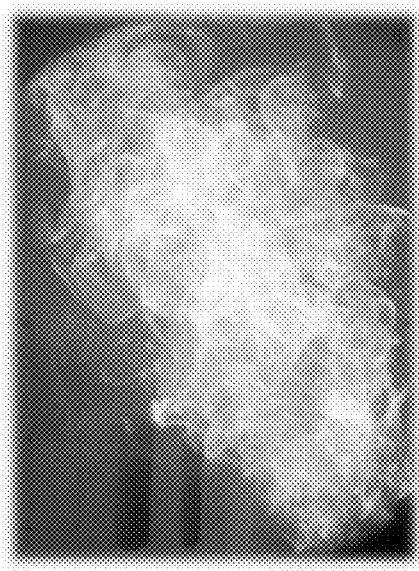
Figure 12A:
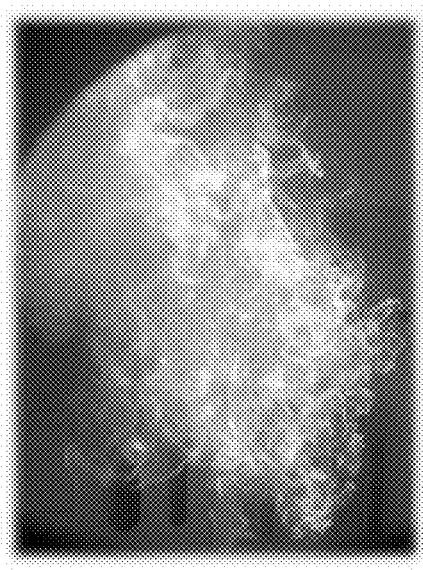

FIG. 3 shows a melt mode of operation, in which secondary oxygen is staged below the fuel and primary oxygen (under-flame staging). Secondary oxygen is directed by the valve 44 to the second staging conduit 60, such that a stream 66 of secondary oxygen flows out the second staging nozzle 62. During melt mode, as shown in FIGS. 6 and 10, the burner 10 produces a flame that has a high temperature, highly-radiative luminous underside 86 as well has a soot-laden, optically-thick fuel-rich primary upper flame 88 above the radiative underside 86. The luminous underside is effective at transmitting radiative heat 84 to the glass 99 in the furnace, with an unobstructed radiative path directly to the glass surface. The optically-thick primary upper flame 88 protects the furnace roof from overheating and directs the heat of combustion primarily downward toward the glass. A photographic end view of such a flame produced during melt mode is shown in FIG. 12A.

Figure 4:
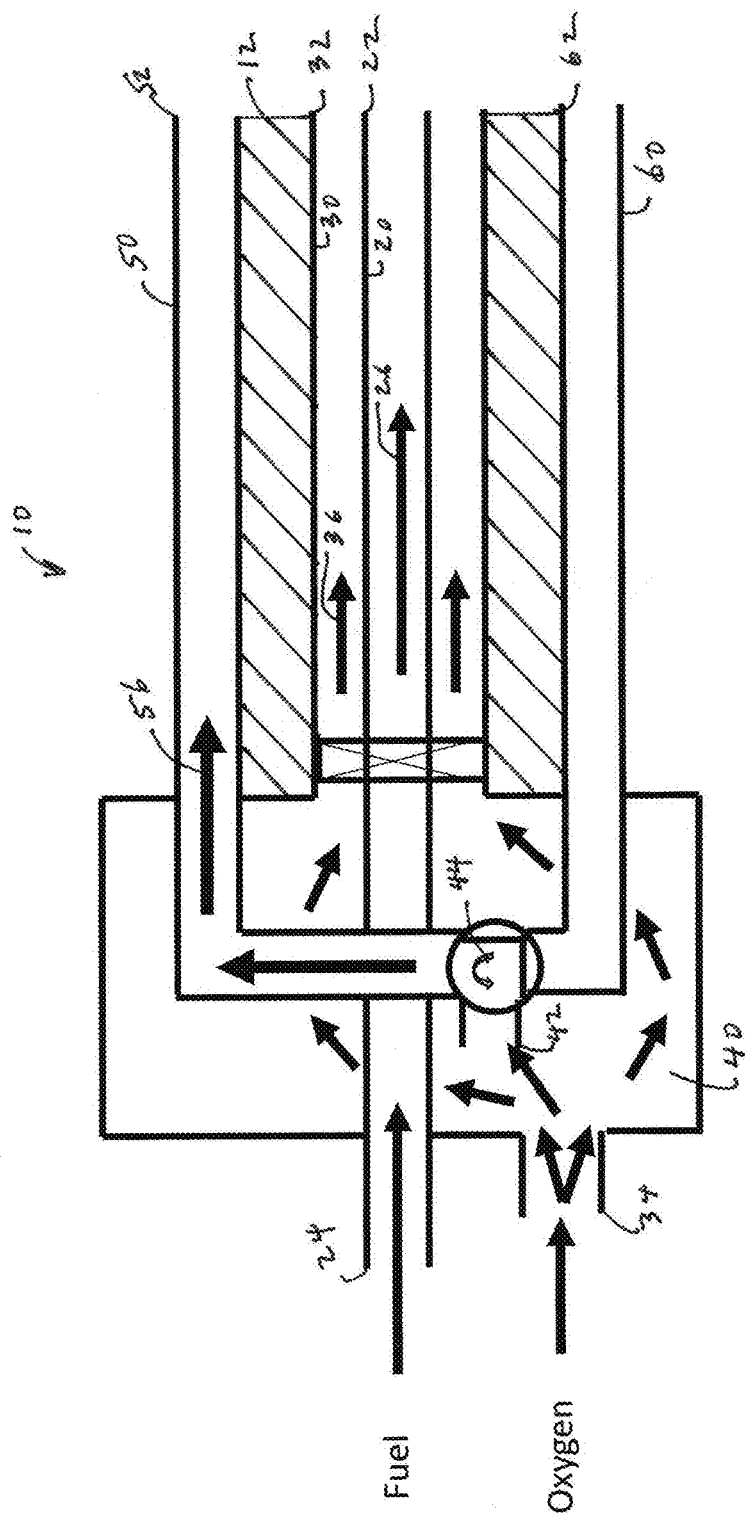
FIG. 4 is a side cross-sectional schematic view of a double-staged oxy-fuel burner as in FIG. 1, operating in an over-flame staging (over-staged) or foam control mode.
Figure 5:
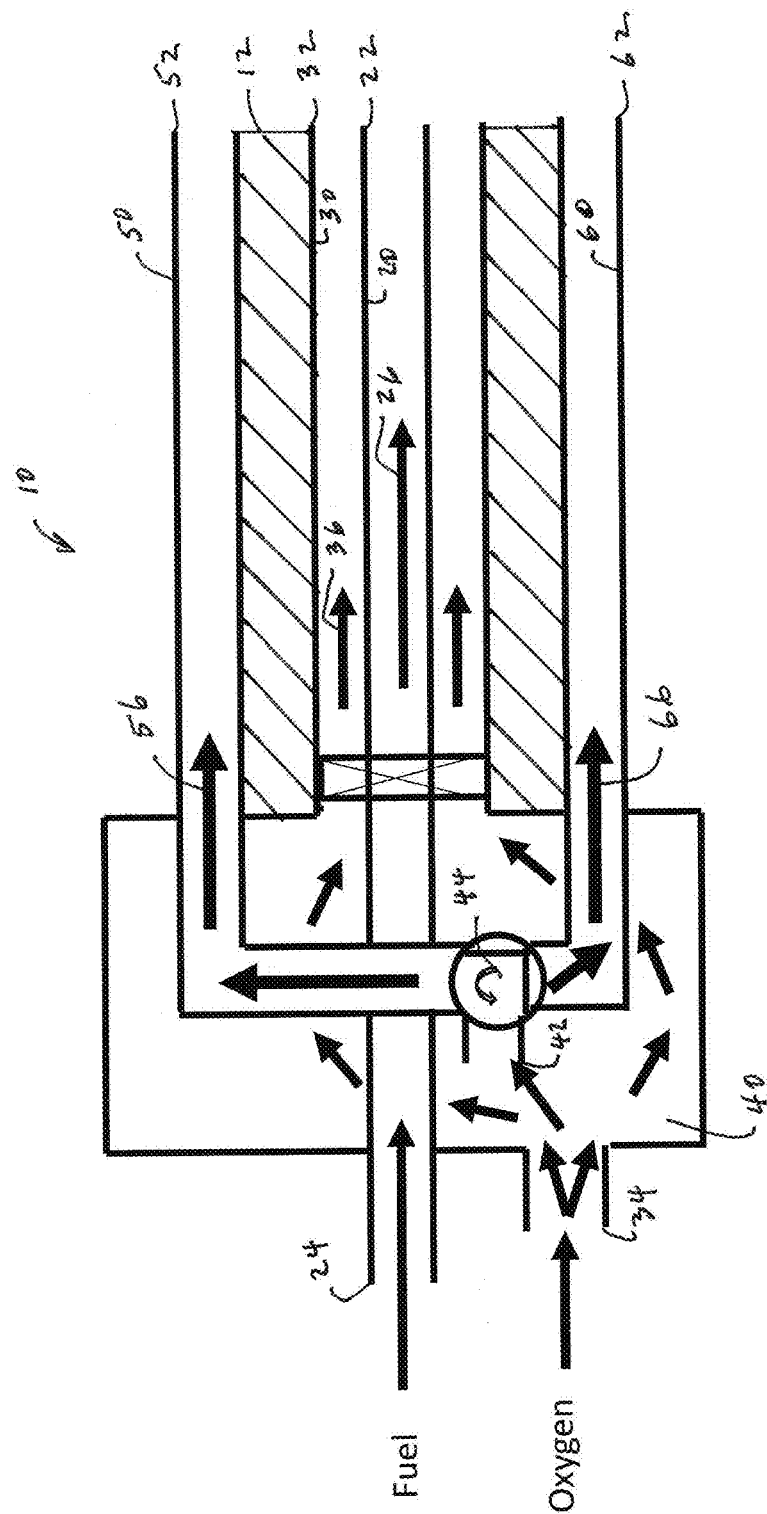
FIG. 5 is a side cross-sectional schematic view of a double-staged oxy-fuel burner as in FIG. 1, operating in an under- and over-flame staging (under- and over-staged) or mixed or split.
Figure 7:
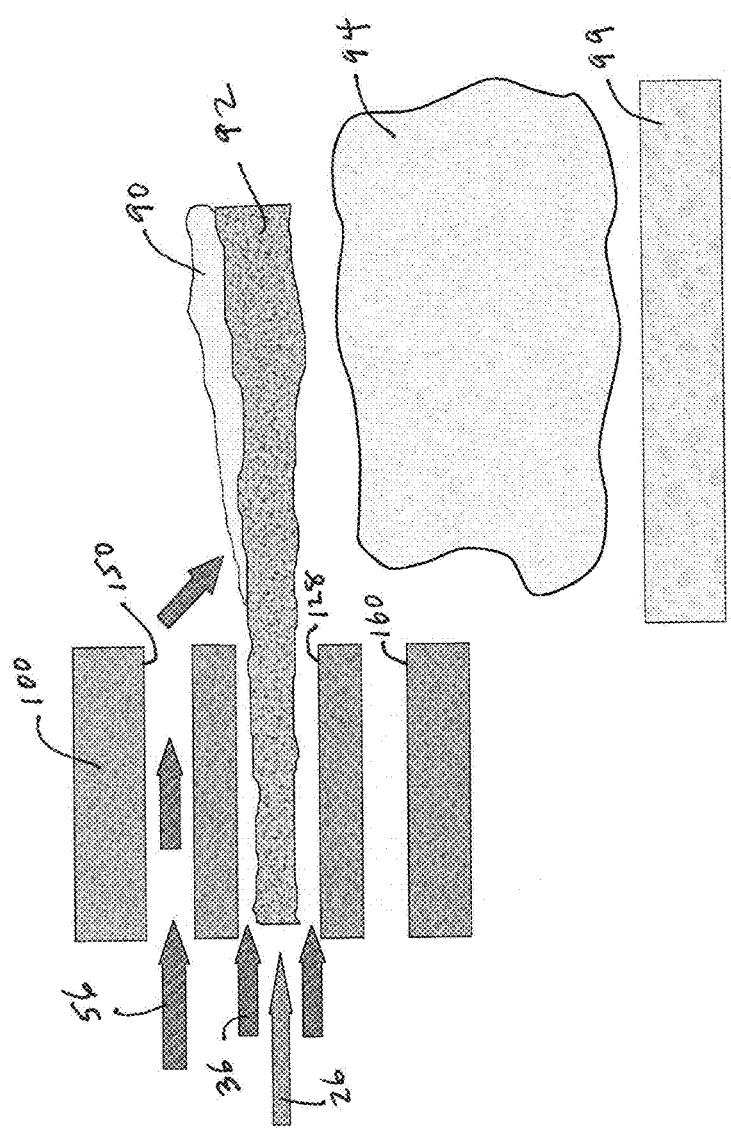
FIG. 7 is a side cross-sectional schematic view of a burner as in FIGS. 1 and 4, operating in a glass furnace in a foam control mode wherein fuel is the first reactant and oxygen is the second reactant, and secondary or staging oxygen is introduced above the fuel and primary oxygen port.
Figure 11:
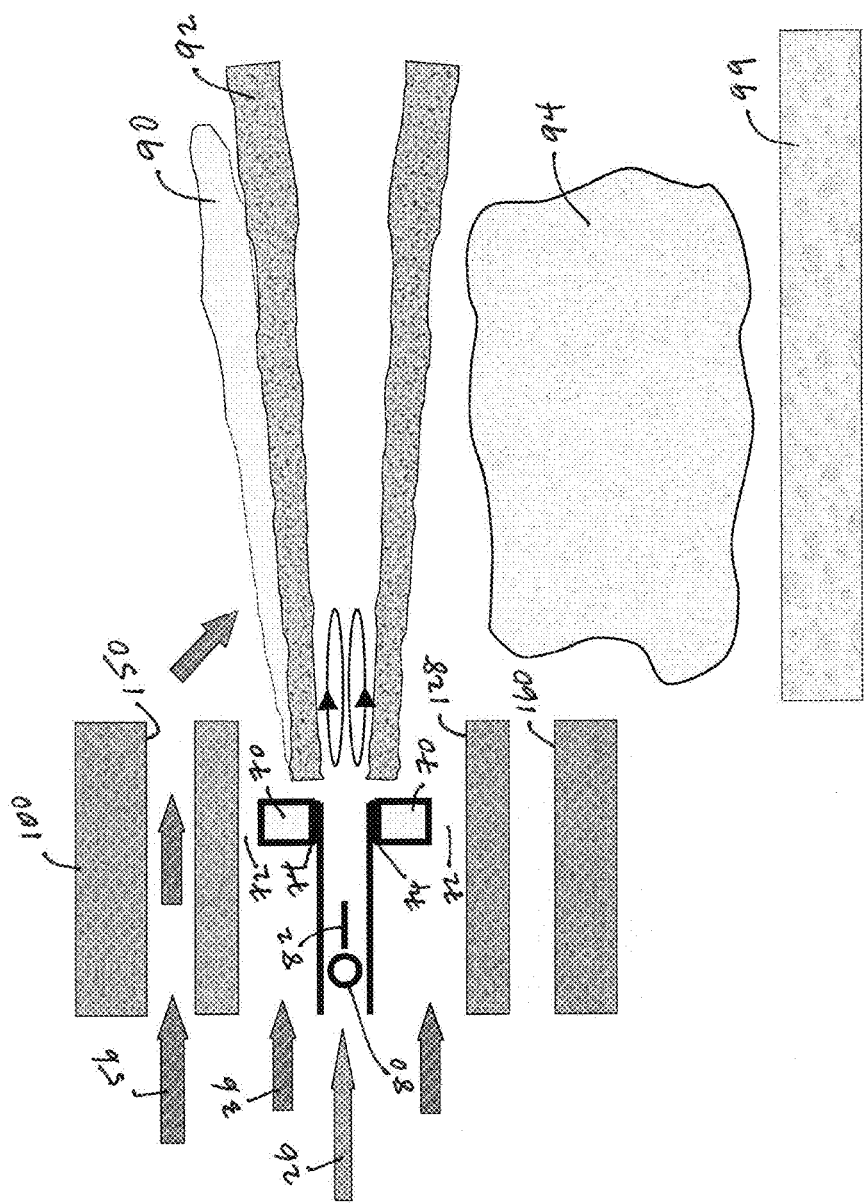
FIG. 11 is a side cross-sectional view of the operating mode as in FIG. 7, showing the flow effects of the flow divider and separator of FIG. 9 and the bluff bodies of FIGS. 8A and 8B.
Figure 17:
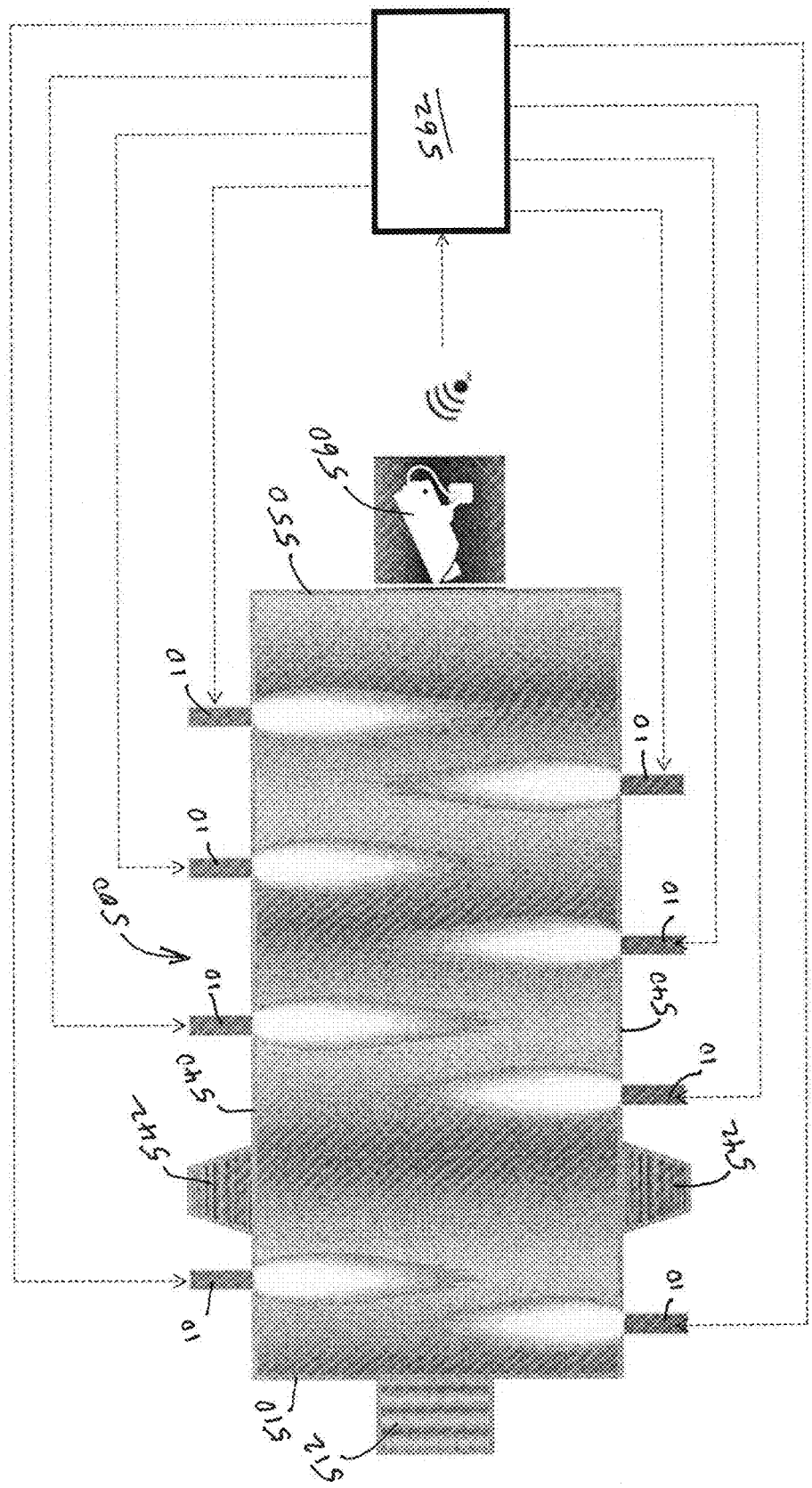
FIG. 17 is a top schematic view of a glass furnace using a plurality of burners as in FIG. 1, showing a controller adjusting each burner's mode of operation based on sensor data or a sensed condition such as foaming, and in particular based on real-time optical temperature measurement or temperature mapping data obtained by a digital camera or other type of sensor.
Figure 18:
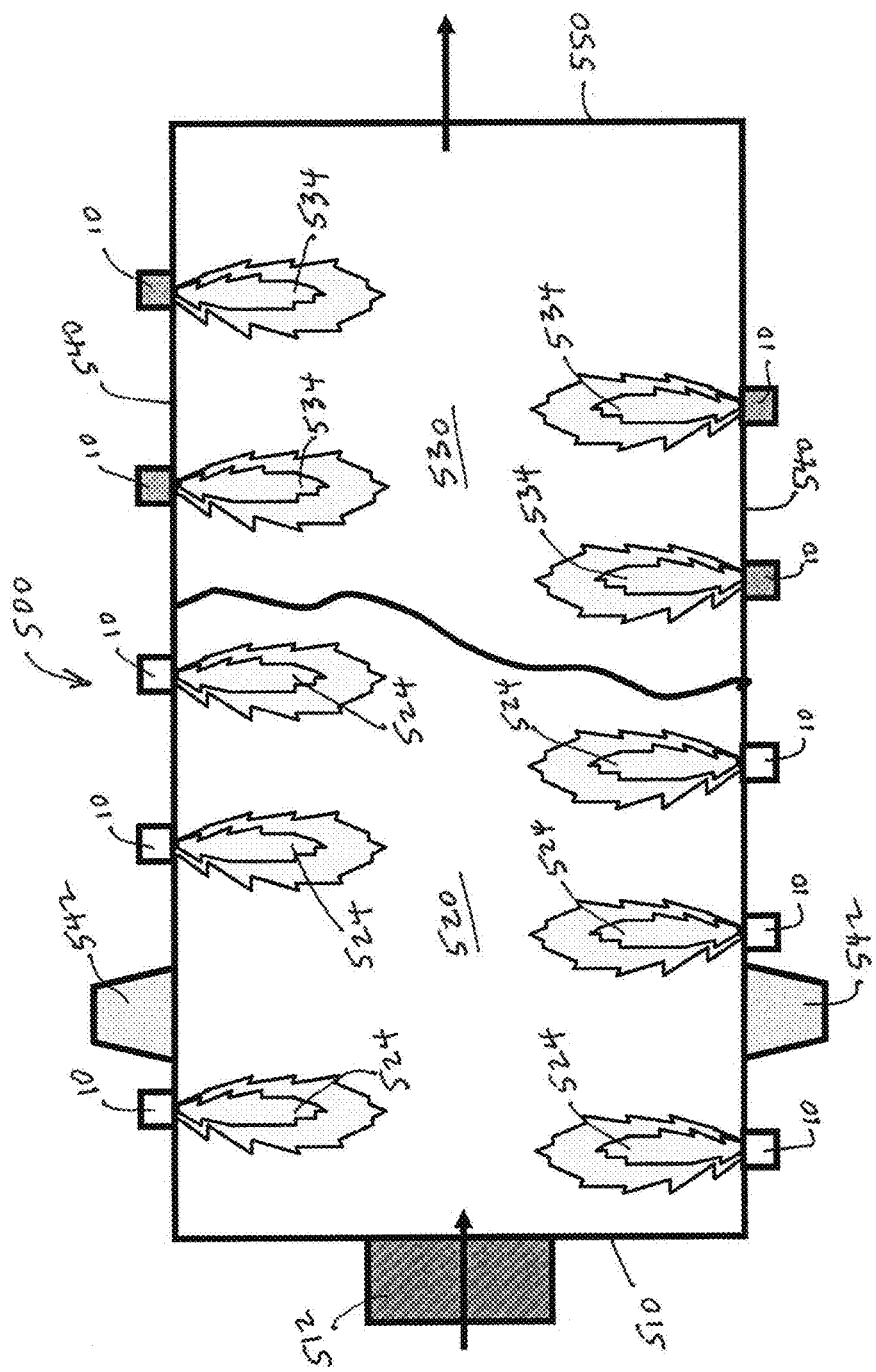
FIG. 18 is a top schematic view of a glass furnace using a plurality of burners as in FIG. 1, operated in different modes depending on the region of the furnace.

FIG. 4 shows a foam control mode of operation, in which secondary oxygen is staged above the fuel and primary oxygen (over-flame staging). Secondary oxygen is directed by the valve 44 to the first staging conduit 60, such that a stream 56 of secondary oxygen flows out the first staging nozzle 52. During foam control mode, as shown in FIGS. 7 and 11, the burner produces a flame that has a soot-laden, optically-thick fuel-rich primary lower flame 92 along with a luminous upper side 90. The fuel-rich primary lower flame 92 creates a reducing atmosphere 94 below the flame, just above the glass 99, which helps to destabilize and break up foam on the glass surface. Foam is undesirable because it reduces the ability of a flame to transfer heat to the glass, so the foam control mode can be used intermittently in combination with the melt mode to periodically break up the foam and thus enable the melt mode to be most effective at melting and heating the glass. A photographic end view of such a flame produced during foam control mode is shown in FIG. 12B FIG. 5 shows a mixed or split mode of operation, in which secondary oxygen is staged both above and below the fuel and primary oxygen. The mixed or split mode of operation is advantageous when the combination of high flame momentum and high flame luminosity is desired. This is often the case when burners are placed near the exhaust flues in the melting region of the furnace, for example as is illustrated in FIGS. 17 and 18. Burner flames in this region are typically adversely affected by proximate flow of combustion gases exiting the furnace through the flues. A high momentum flame helps to maintain flame stability in such an environment. However, those skilled in the art will appreciate that it is very difficult to achieve a high momentum flame while simultaneously producing the high flame luminosity that is needed for efficient glass melting. This is because high flame momentum ordinarily does not provide sufficient residence time for the processes of soot inception, growth, and agglomeration that are pre-requisites for achieving a highly luminous flame. The present burner overcomes these difficulties and is capable of achieving a combination high momentum and high luminosity, when operated in the mixed or split mode, by surrounding the flame with oxygen on both sides as it discharges into the furnace, which causes the fuel jet to combust and heat up much more rapidly than where oxygen staging occurs on one side only. Further, the staged oxygen on both sides of the flame constrains the flame vertical expansion within the furnace. In so doing, the more rapid fuel jet combustion and heating results principally in enhanced forward axial acceleration; hence, high flame (axial) momentum. The flame luminosity in this mode comes from operating with as low a primary oxygen as can be tolerated according to site-specific operating constraints. It has unexpectedly been found that the combination of simultaneous over- and under-oxygen staging plus a low proportion of primary oxygen to fuel flow rates advantageously provides sufficient residence time for soot inception, growth, and agglomeration, while also achieving the high flame momentum. A flame obtained during mixed mode operation is shown in an end view photograph in FIG. 12C.

In use, the burner 10 is installed in a glass furnace with one of the first and second staging conduits 50 and 60 positioned between the central burner element 28 and the glass bath and the other of the first and second staging conduits 50 and 60 positioned between the central burner element 28 and a roof of the furnace.

As result of the design of the burner 10 described herein, the burner is operated with a ratio in the central burner element 28 of first reactant in the central nozzle 22 (e.g., fuel) to second reactant in the annular nozzle 32 (e.g., oxygen) as far from stoichiometric as practical without causing damage to the burner nozzle. For example, when fuel is the first reactant and oxygen is the second reactant, the full amount of fuel supplied to the burner 10 is flowed through the central nozzle 22 while a very small proportion of oxygen supplied to the burner is flowed through the annular nozzle 32, preferably less than 20% or less than 10% or less than 5% or less than 2% or less than 1%, with the balance of the oxygen going to one or both of the first and second staging nozzles 50 and 60. This would equate, respectively to preferred staging rations of at least 80%, at least 90%, at least 95%, at least 98%, or at least 99%. These are levels of staging not previously obtainable, resulting from the structure of the central and annular nozzles.

When the burner 10 is operated with under-flame staging (i.e., melt mode, in which an oxidizing atmosphere is created above the glass melt), at least 50% of the secondary oxygen is flowed through the first staging nozzle 50 while the balance is flowed through the annular nozzle 32. In some embodiments, at least 75% or at least 90% of the oxygen is flowed through the first staging nozzle.

When the burner 10 is operated with over-flame staging (i.e., foam reducing mode, in which a reducing atmosphere is created above the glass melt), at least 70% of the secondary oxygen is flowed through the second staging nozzle 60 with the balance being flowed through the annular nozzle 32. In some embodiments, at least 80% or at least 90% of the oxygen is flowed through the second staging nozzle 60.

It should be understood that it is not desirable to operate with zero second reactant in the annular conduit 30 because that would create a void or vacuum in the annular conduit 30 that would draw in hot, corrosive furnace gases which would quickly undermine the integrity of the burner 10. Moreover, it would be undesirable to simply eliminate the annular second reactant flow 36 because that flow in the annulus 30 creates a buffer between the first reactant in the center conduit 20 and the second reactant in both the first and second staging conduits 50 and 60, so that, in the event of a burner block crack 599 between adjacent block passages as in FIG. 25, there will be no potential for uncontrolled cross-mixing of fuel and oxygen.

In practice, adding certain structural elements to the central burner element 28 has been found to minimize the amount of secondary reactant needed for the annulus (as discussed below with reference to FIGS. 8 and 9), so that it can be as low as approximately 1% of the total secondary reactant flow rate. This means the remaining up to 99% of the secondary reactant is staged through either first staging conduit 50 or the second staging conduit 60 (or possibly apportioned between both staging conduits). Comparing this to a previous generation staged burner (see U.S. Pat. No. 7,390,189, incorporated herein by reference in its entirety), which was able to stage at a maximum of 70% of the secondary reactant (oxygen), the peak primary fuel to annular oxygen ratio in the present burner is nominally 30 times greater than can be achieved in the previous generation burner (i.e., 100% fuel:1% oxygen in present burner compared to 100% fuel:30% oxygen in previous generation burner). Additional NOx reduction is also achieved by the internal nozzle staging using the nozzle design with regard to FIGS. 8 and 9.

In addition to reducing NOx, the ability of the burner to produce a primary flame far off stoichiometric, with very large amounts of staging, significantly improves the ability to control the gas atmosphere adjacent to the glass surface. But to be able to control the atmosphere adjacent to the glass surface to be, selectively, either oxidizing or reducing depending on the process circumstances, requires the ability to conveniently switch the operation of the burner to generate a reducing atmosphere or an oxidizing atmosphere adjacent to the glass, on demand, without switching burners and without significant time lag. This is accomplished by the three-way staging distribution valve 44 discussed above, which is positioned in the secondary reactant plenum 40 of the inventive burner, which functions to divert the staged portion of the secondary reactant flow from the plenum 40 to either the first staging conduit 50 or the second staging conduit 60 (or in some apportionment to both). And, as noted above, the burner 10 will be mounted in a furnace with, for example, the first staging conduit 50 positioned below the central burner element 28 (i.e., toward the glass bath) and the second staging conduit 60 positioned above the central burner 28 (i.e., toward the furnace roof).

Figure 2:
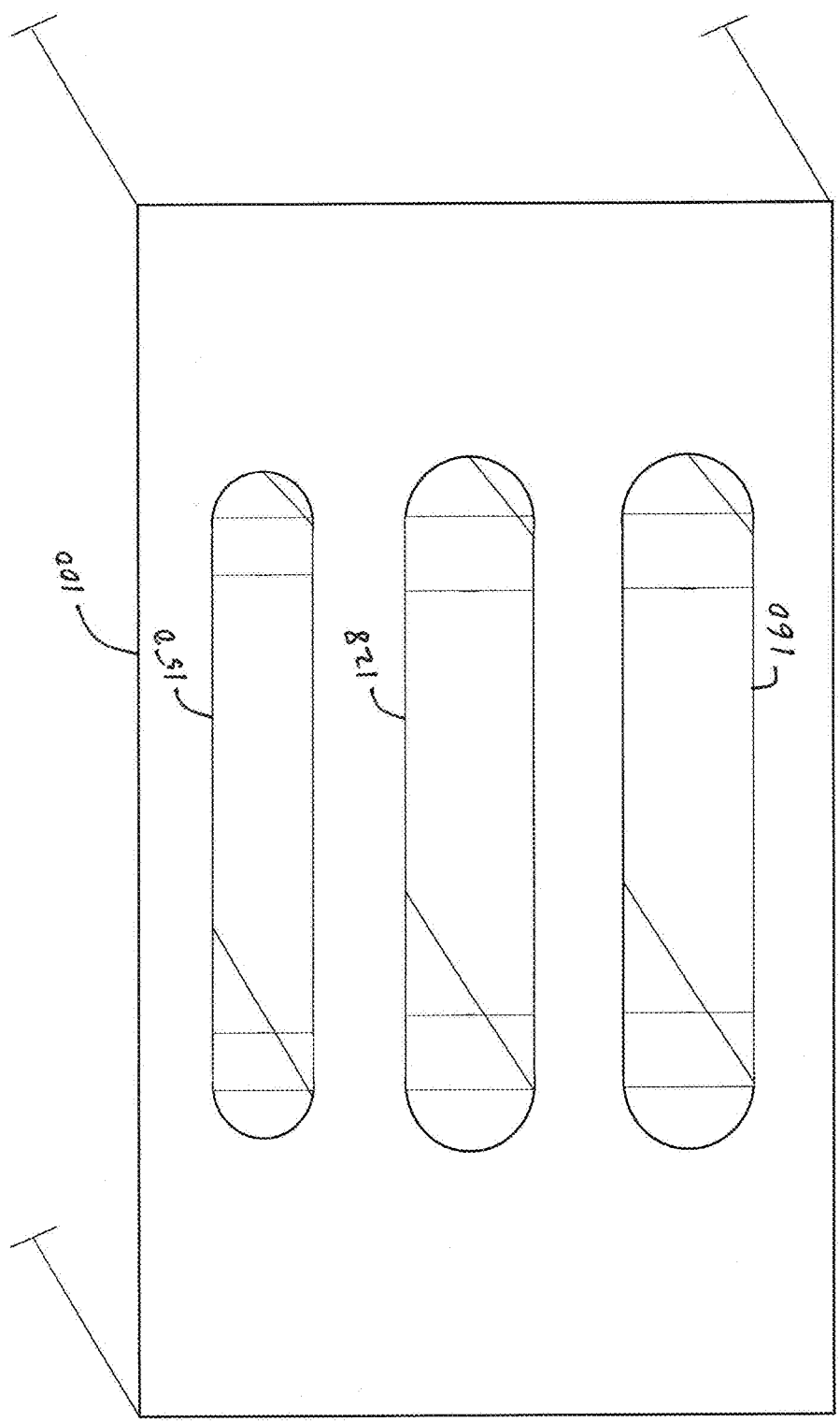
FIG. 2 is a front end perspective view of a burner block for a burner as in FIG. 1.

Preferably the burner 10 is installed in a burner block 100, which separates the burner 10 from the furnace, and also consolidates the burner's central primary fluid conduit and secondary annular conduit into a single central burner block passage 128, as depicted in the end view of FIG. 2, that enables the primary fluid and secondary annular fluid to discharge from the block to the furnace as a flame.

Figure 16:
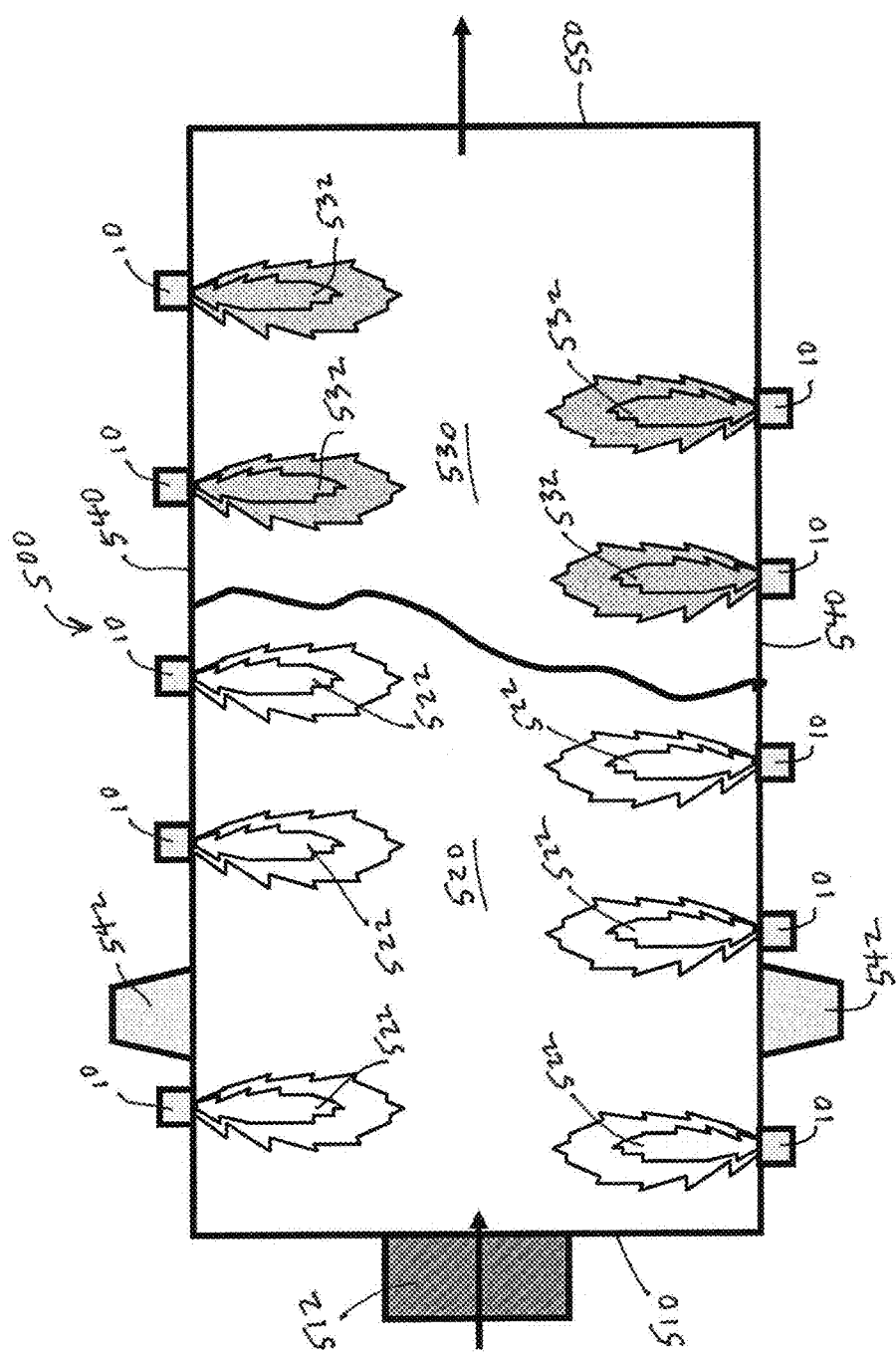
FIG. 16 is a top schematic view of a glass furnace using a plurality of burners as in FIG. 1, operated in different modes depending on the region of the furnace.

As shown in FIG. 16, a plurality of the burners 10 may be installed in a glass furnace 500, with individual burners 10 being operated differently depending on their location in the furnace 500. A typical glass furnace has a feed end 510 and a working end 550, with raw glass batch ingredients (solids) being fed into the feed end 510 by a batch feeder 512 and refined molten glass being removed from the working end 550. The furnace 500 can be described as having two sections or regions, a melting region 520 near the batch end 510, characterized by a mixture of molten glass and solid chunks of unmelted batch materials, and a refining region 530 near the working end, characterized by primarily molten glass. Sides 540 connect the feed end 510 to the working end 550. Burners 10 are positioned along both sides 540 are used to melt the batch in the melting region 520 and to refine the molten glass in the refining region 530. At least one flue 542 is positioned on one of the sides 540 and/or on one of the ends 510, 550, to remove combustion products from the furnace 500.

In the operating situation of FIG. 16, the burners 10 in the melting region 520 of the glass furnace 500 can be operated to produce a flame 522 like that shown in FIGS. 6 and 10, to maximize the radiative energy delivered to the glass batch material in the melting zone 520. This is accomplished by staging oxygen below the primary flame. This technique preferentially biases the flame radiation in the downward direction to the melt. Alternatively, or in combination with the foregoing, the burners 10 in the refining region 530 can be operated to create to produce a flame 532 like that shown in FIGS. 7 and 11, to create a reducing atmosphere adjacent the glass surface. This is accomplished by staging oxygen above the primary flame. This technique can disrupt the stability of surface foam by imparting a sudden change in surface tension and thereby causing it to rapidly drain back to the melt. Moreover, the reducing atmosphere gives rise to soot that blocks thermal radiation to the melt and thus lowers the surface temperature and, hence, the rate of evolution of foam-producing fining gases such as sulfur dioxide.

Note that foam is deleterious to glass furnace operation for the following reasons, so there can be significant operational and glass quality benefits from being able to selectively reduce foam at various times during operation or in certain portions of the furnace, as the circumstances require. First, foam severely restricts heat transfer between the furnace combustion space and the glass melt. This leads to higher glass surface and crown temperatures, while diminishing the natural convection driven secondary flows of glass in the melt phase of the glass bath. These secondary flows are critical for providing the necessary residence time of the glass in the furnace to achieve a high degree of elimination of glass impurities. Second, foam is very corrosive to furnace refractories, and can lead to accelerated refractory decay and spalling of refractory material into the glass phase leading to glass defects.

FIG. 17 depicts an alternative method of furnace operation compared to the method discussed above with regard to FIG. 16. Instead of pre-determining the distribution of the over-flame staged burners (i.e., creating a reducing atmosphere adjacent the glass bath, such as in the refining region) and under-flame staged burners (i.e., creating an oxidizing atmosphere and radiant flame adjacent the glass bath, such as in the melting region), this method utilizes one or more furnace sensors 560 to detect a sensed condition in the furnace, such as the presence of foam, and/or to detect regions of high or low temperature, and then a controller 562 adjusts the operating condition of each individual burner 10 accordingly. Foam presence can be detected by any of several types of sensors, including but not limited to thermocouples, infrared thermometers, infrared imaging cameras, and video cameras. This is particularly advantageous with the present burner 10, because the three-way switching valve 44 can easily be actuated remotely by, e.g., electrical or pneumatic means, so as to quickly redirect the staged second reactant flow to either of the staging nozzles.

In another embodiment, FIG. 18 depicts an optimal furnace configuration for minimizing NOx emissions. NOx formation in the downstream or refining region 530 of the furnace 510 is minimized by operating the burners 10 in that region sub-stoichiometrically (fuel rich) to produce a fuel-rich flame 534, while the burners 10 in the upstream or melting region 520, near the flue 542 of a typical oxy-fuel glass furnace 500) are operated super-stoichiometrically (fuel-lean) to produce a fuel-lean flame 524. In this configuration, excess oxygen from the upstream fuel-lean burner flames 524 mixes with the fuel-rich products of partial combustion from the downstream fuel-rich flames 534 to complete the combustion of the fuel-rich products prior to leaving the furnace combustion space via the flue 543. The overall stoichiometry of the burners 10 in the furnace 500—defined herein as the ratio of total oxygen molecules to total fuel molecules entering the furnace divided by the ratio theoretically needed for complete combustion with zero excess oxygen—need not be exactly 1, but overall furnace stoichiometry is closer to 1 than either the fuel-lean upstream burners or the fuel-rich downstream burners.

By operating the individual burners at off-stoichiometric conditions, some fuel-rich and some fuel lean, NOx emissions are reduced by limiting thermal NOx formation (which is the slowest of the NOx formation mechanisms). Free oxygen is required to drive the thermal NOx formation reaction. Therefore, by ensuring that the gases with the largest residence time (i.e., those at the downstream end of the furnace, farthest away from the flues), have minimal free oxygen, thermal NOx formation is reduced. Moreover, once the balance of downstream fuel and oxygen react in the region of the furnace proximate the flues, the reaction is substantially diluted by furnace exhaust gases, and therefore occurs at a lower temperature than would have otherwise been produced through reaction at the burner. This lower temperature further reduces the rate of thermal NOx formation. The furnace configuration is also advantageous from a foam reduction perspective since the fuel-rich region coincides with the refining region or zone, which further reinforces the foam reducing action of the present burners 10.

Figure 8:
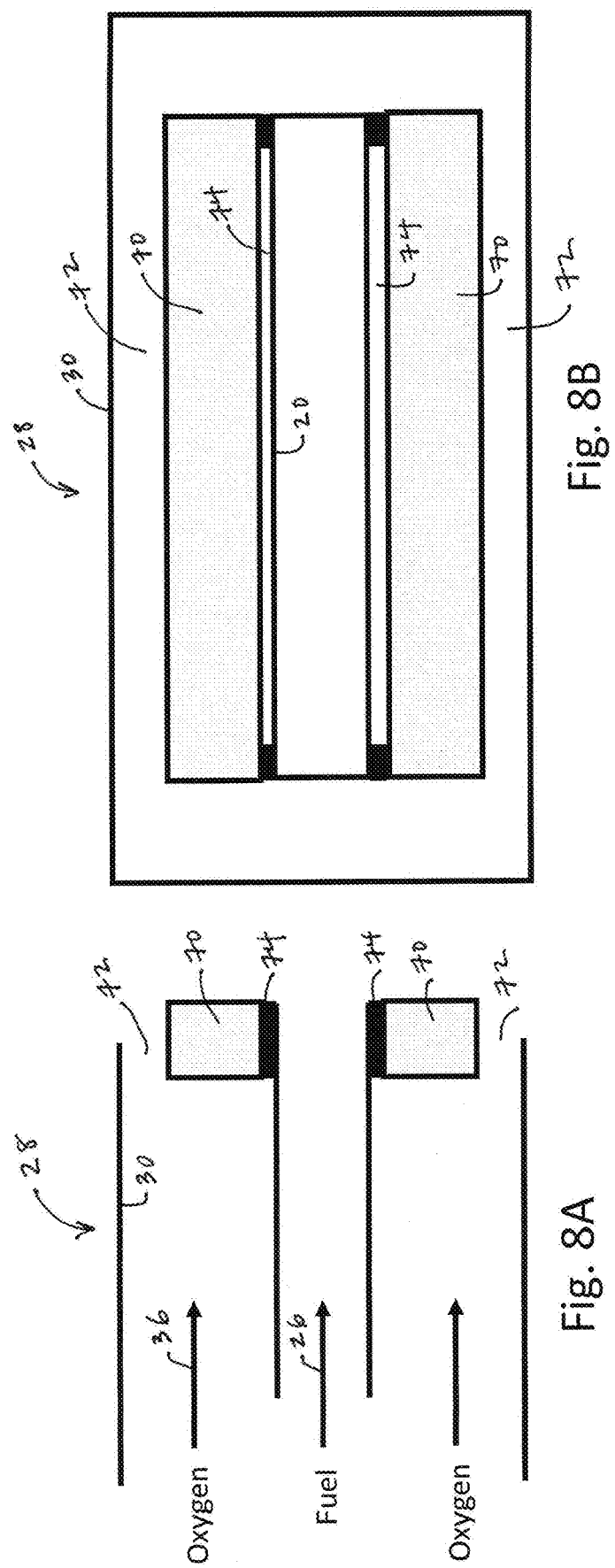
FIG. 8A is a side cross-sectional schematic view and FIG. 8B is a front end schematic view of the central port of a burner as in FIG. 1, and illustrates details of the primary oxygen nozzle surrounding the fuel nozzle, and in particular showing bluff bodies in the primary oxygen stream separated from the wall between the oxygen nozzle and the fuel nozzle by oxygen bleed slits.
Figure 9:
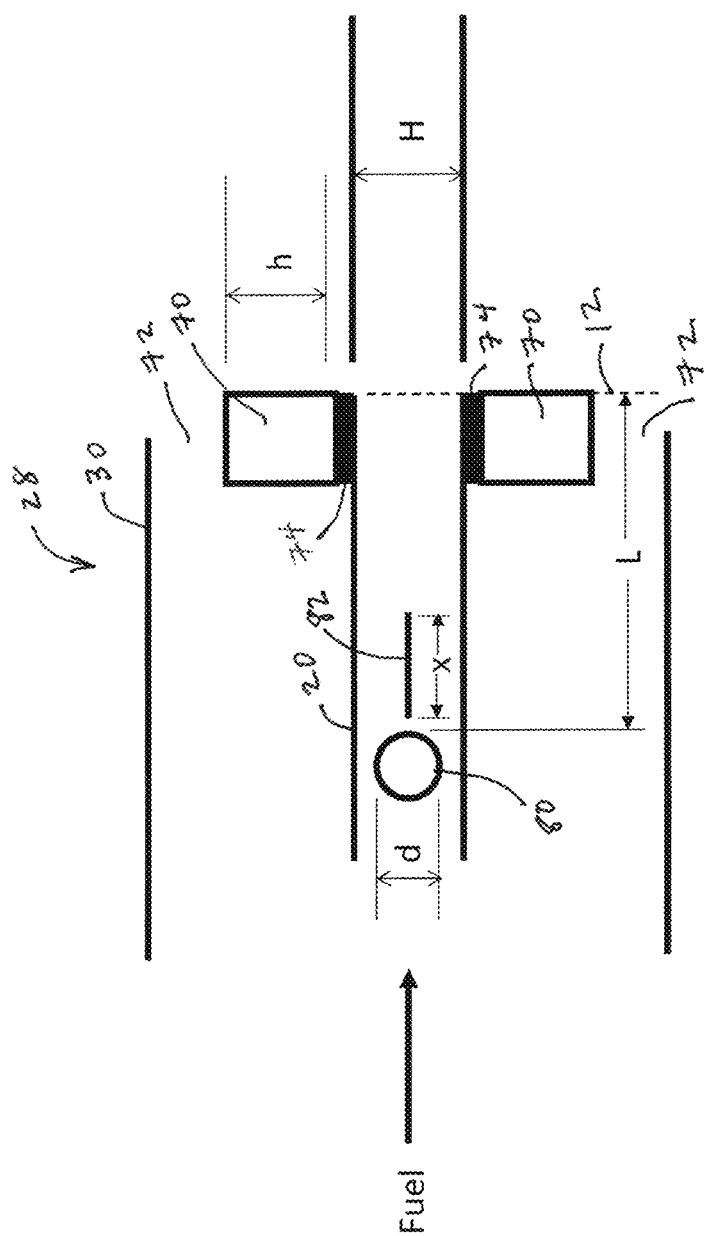
FIG. 9 is a side cross-sectional schematic view of a central port as in FIGS. 8A and 8B showing a combination of a transverse cylindrical flow divider and an axial separator plate downstream of and spaced slightly apart from the cylindrical flow divider.

Operation of the burner 10 may be enhanced by incorporating particular elements into the nozzle of the burner element 28, as shown in FIGS. 8 and 9. These elements facilitate the extremely off-stoichiometric operation of the primary flame discussed above.

First, as shown in FIGS. 8A and 8B, a bluff body 70 is positioned in the annular second reactant nozzle 32 to create two streams of second reactant (e.g., oxygen) flow, an inner stream through an inner nozzle or gap 74 and an outer stream through the outer nozzle or gap 72. The inner gap 74 is relatively small compared with the outer gap 72. In one embodiment, the inner gap 74 has a cross-sectional area that is no more than 10% the cross-sectional area of the outer gap 72. Preferably, the bluff body 70 is attached to an outer side of the central conduit 20 such that the inner gap 74 is formed as a slit in a base portion of the bluff body 70. A small slip stream of the second reactant flows through the inner gap 74 and mixes with the first reactant (e.g., fuel) at a discharge plane 12 of the burner 10. At the discharge plane 12, the small slip stream of the second reactant mixes with the first reactant discharging from the central nozzle 22 and ignites, creating a flame sheet or flame jet at the boundary of the central nozzle discharge stream (of the first reactant).

It is known by those skilled in the art that, in contrast to a non-reacting jet, the rate of entrainment of surrounding gases into the jet is significantly reduced in the case of a reactive jet flame. We have further discovered that, in the case of the bluff body 70 with inner gap 74 and outer gap 72 described above, the entrainment rate of the flame generated by this system is smaller than that generated in the absence of said bluff body. While it is experimentally very difficult to measure entrainment rate, it is known that for a central jet of fixed nozzle discharge flow rate, entrainment rate is directly related to the rate of jet spreading.

FIG. 14 shows a quantification of the flame spreading rate of a flame sheet 180 (denoting the boundaries of the primary flame) emerging from the central burner block passage 128 of a double-staged burner 10, as measured by the spreading angle $\alpha$, such that a flame spreading rate can be characterized by the tangent of angle $\alpha$.

Figure 15:
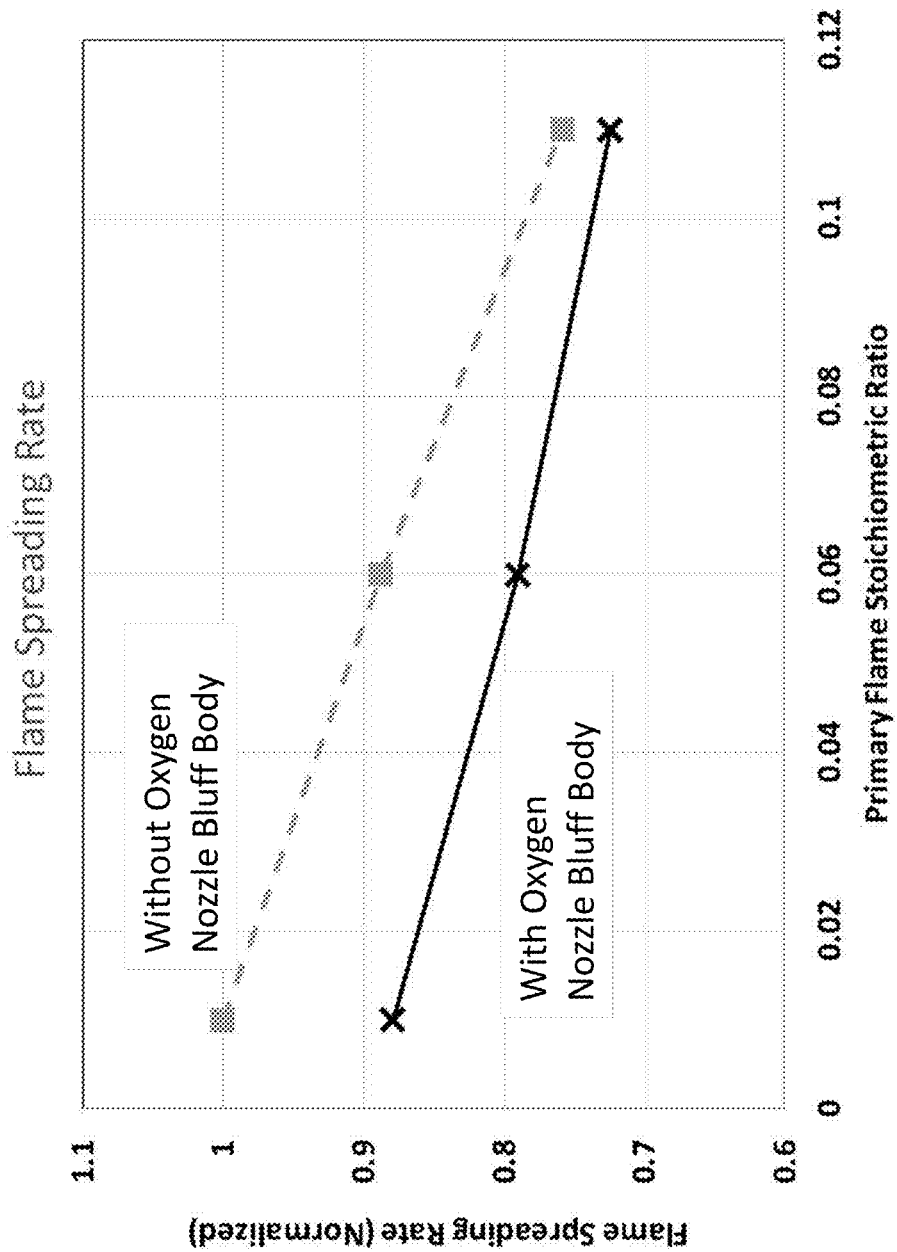
FIG. 15 is a graphic showing data comparing the flame spreading rate of a nozzle without an oxygen nozzle bluff body (version depicted in the photograph of FIG. 13A) and with an oxygen nozzle bluff body (version depicted in the photograph of FIG. 13B).

FIG. 15 compares flame spreading rate data from flames generated with two nozzles. The lower solid line (cross data points) on the graph depicts the flame spreading rate of a burner having a nozzle with the features shown in FIGS. 8A and 8B, i.e., with the bluff body 70, the inner gap 74, and the outer gap 72 described herein. The upper dashed line (square data points) depicts the flame spreading rate of a burner having the same basic nozzle but without the bluff body and gaps. The vertical axis in FIG. 15 is the relative flame spreading rate (non-dimensional tan(a)), while the horizontal axis denotes the primary flame stoichiometric ratio, i.e., the stoichiometric ratio based on the central first reactant (fuel or natural gas) and the annular second reactant (oxygen) flowing through the primary burner nozzle. Note how the flame spreading rate produced by the nozzle having the bluff body and gaps is significantly lower than the flame spreading rate produced by the same nozzle without the bluff body and gaps. Moreover, the difference between the two flame spreading rates grows as the primary flame stoichiometric ratio is lowered (i.e., as the proportion of staging oxygen increases). This is of particular significance since, as previously noted, the benefits of the inventive burner increase as the proportion of staging oxygen increases.

Figure 13B:
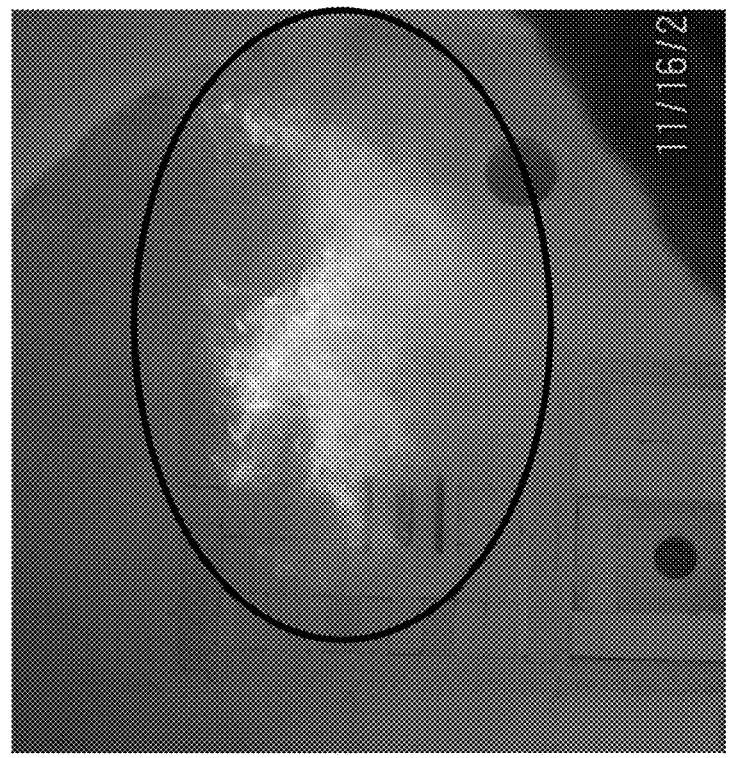
FIGS. 13A and 13B are a photographic end view comparison between the flames of a double staged oxy-fuel burner operated in an over-staged mode, with a conventional straight nozzle (FIG. 13A) and a nozzle having bluff bodies and oxygen bleed slits as in FIGS. 8 and 9 (FIG. 13B).
Figure 13A:
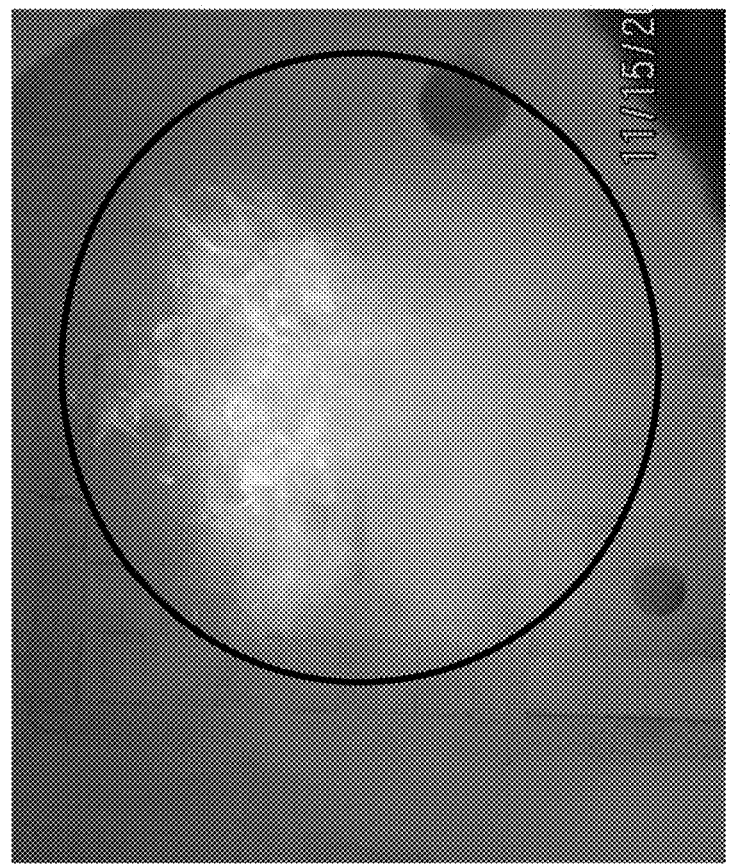

FIGS. 13A and 13B show a comparison of a burner as described herein with and without the nozzle features shown in FIGS. 8A and 8B, and in particular illustrate the relative spreading rates of flames with, respectively, higher and lower entrainment rates. In the photograph of FIG. 13A, a straight nozzle was employed and the resultant flame spreads relatively quickly in the vertical direction, entraining significant amounts of furnace gases. In comparison, in the photograph of FIG. 13B, a nozzle incorporating the features of FIGS. 8A and 8B was employed and the resultant flame spreads relatively slower in the vertical direction, entraining less amounts of furnace gases.

While not wishing to be held to any theory, it is believed that the reduced flame spreading rate attained with the burner nozzle having the bluff body and gaps derives from two factors. One is the small amount of secondary annular fluid, in this case oxygen, that is admitted through the inner gap 74 to mix with the primary fluid (natural gas). This mixture creates a relatively cool, weak flame that is anchored at the nozzle tip. The anchoring of the flame at the nozzle tip ensures the presence of flame reactions that impede the growth of vorticity and, hence, reduce the rate of radial mixing within the shear layer between fuel and oxygen streams. Moreover, the relatively weak, cool nature of the flame means that initial rates of reaction rates are reduced; therefore initial, combustion-induced, volumetric expansion of the flame sheet is minimized. The second factor is that the bluff body 70 creates a physical separation between the initial contact of fuel and oxygen flowing through the inner gap 74 with the balance of annular oxygen flowing around the bluff body through the outer gap 72. This further delay in oxygen-fuel mixing prolongs the low initial volumetric expansion rate of the flame sheet.

Preferably, the bluff body 70 has a height (h) that is 50% to 150% of the height (H) of the primary reactant central nozzle 22, as depicted in FIG. 9. In addition, as shown in FIG. 9, a bluff body 80 may also be positioned in the central first reactant conduit 20 upstream of the nozzle 22. The bluff body 80 preferably has a transverse dimension (d) such that it occupies from 25% to 75% of the central conduit cross-sectional area, and a recess length, L, from the burner discharge plane 12 that is between 2 and 20 times the transverse dimension (d). The fluid-mechanical effect of the bluff body 80 is to separate the primary reactant in the central conduit 20 into two outer high velocity streams and an axial low velocity core or wake. The principal advantage of this separation is that, as the flame jet emerges into the furnace, the segregation of the primary reactant from the staging secondary reactant flow is increased beyond what it would be without this separation. For example, if oxygen (as the second reactant) is staged above the flame, the high velocity portion of the fuel (as the first reactant) that flows on the lower portion of the central nozzle is more substantially buffered from mixing with the upper-staged oxygen. Conversely, if oxygen is staged beneath the flame, the high velocity portion of the fuel that flows on the upper portion of the central nozzle is more substantially buffered from mixing with the lower-staged oxygen. These scenarios are illustrated in FIGS. 10 and 11.

However, the bluff body 80 positioned in the primary reactant conduit 20 may be prone to create the shedding of vortices in its wake. These vortices can substantially increase the rate of mixing between the first and second reactants near the burner discharge plane 12, leading to more rapid combustion and higher NOx emissions. To mitigate this potential effect, a trailing edge splitter plate 82 may be added along the centerline axis of the central conduit 20 downstream of the bluff body 80. Preferably the splitter plate 82 is spaced slightly apart from the bluff body 80 to allow for pressure equalization on the downstream side of the bluff body 80, and the splitter plate preferably has a length (x) that is equal to or greater than the dimension (d) of the bluff body 80, and more preferably has a length (x) that is between 1 and 10 times the transverse dimension (d). The trailing edge of the splitter plate must, however, never extend beyond the burner discharge plane 12.

The actual effect of placing a bluff body 80 plus splitter plate 82 along the centerline of the central conduit 20 is presented in FIGS. 13A and 13B, which are photographic images taken, respectively, of flames with and without the combination of bluff body 80 plus splitter plate 82. The bluff body occupied 50% of the flow cross-sectional area of the central conduit, had a recess dimension, d/L, equal to 14 and a splitter plate having length dimension, x/d, equal to 5. The photographs were taken from downstream of the flame along the flame axis, with nominally 90% of the burner oxygen introduced through the upper staging plenum 56 (balance through the annular conduit 36). The opaque region beneath the flame represents a soot cloud, and is a measure of the size of the under-flame reducing zone that is active in dissipating secondary foam. It is evident from comparison of these photographs that the size of the soot-filled reducing region is substantially larger in the case of the nozzle with bluff body 80 plus splitter plate 82.

As described herein, a double-staged oxy-fuel burner, which enables the option to choose either under-staging (secondary oxygen below the primary flame) or over-staging (second oxygen above the primary flame), provides the benefits of oxygen staging for higher melting efficiency and lower $NO_x$ emissions, as well as the ability to reduce foaming. The presently claimed burner enables users to control both the magnitude and location of oxygen staging. As described above, burner is equipped with three passages: a primary port that houses the burner fuel and oxygen nozzles, upper and lower oxygen ports for introducing staged oxygen, and two valves to control the direction and flow rate of oxygen among the three passages.

Figure 19:
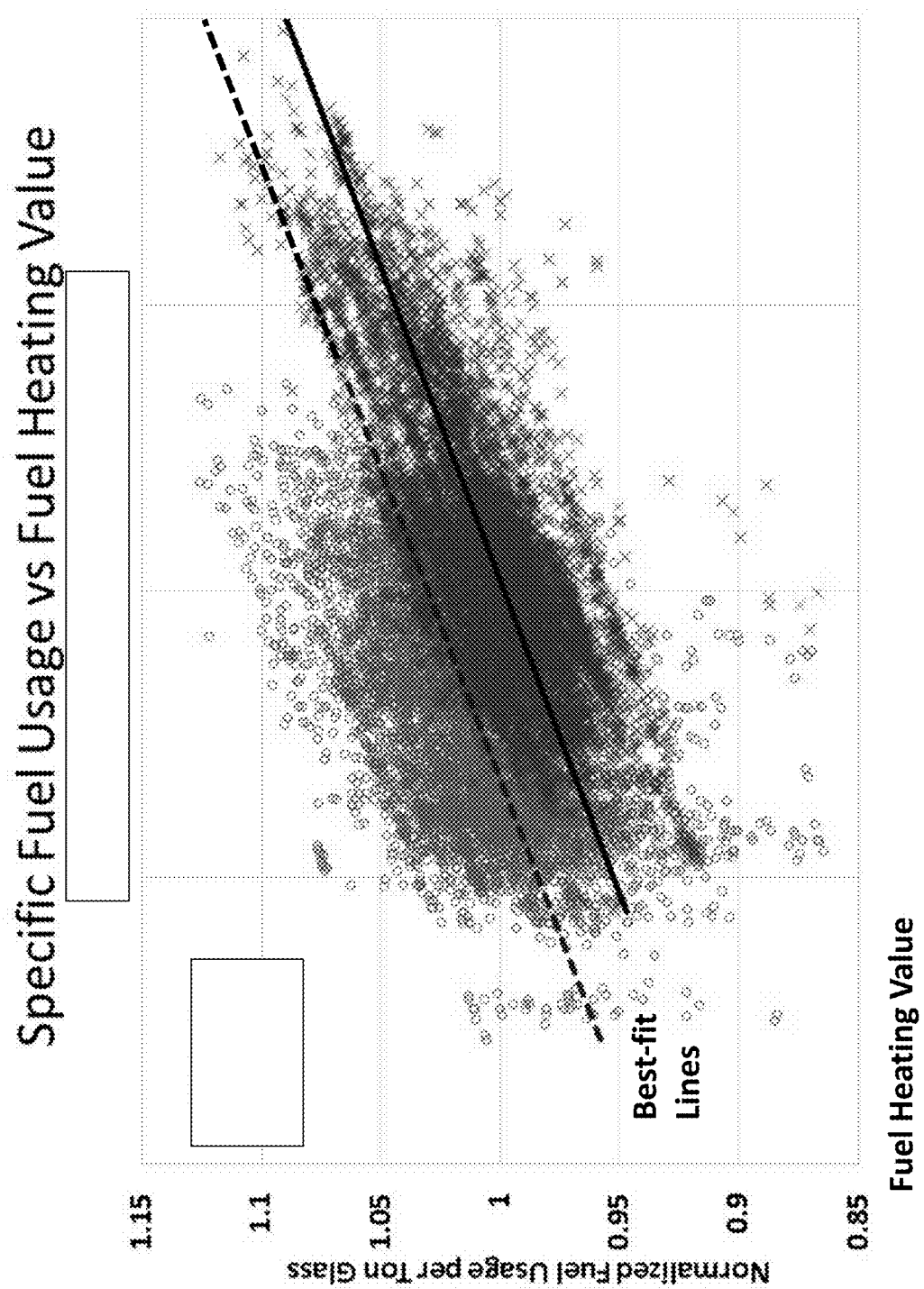
FIG. 19 is a graph comparing the specific fuel usage versus heating value for a prior art burner as in the '189 patent (circular points, dashed line) and for a double-staged burner as described herein (cross points, solid line), showing a 3.2% reduction in specific fuel consumption over a wide range of heating values with the present burner.
Figure 20:
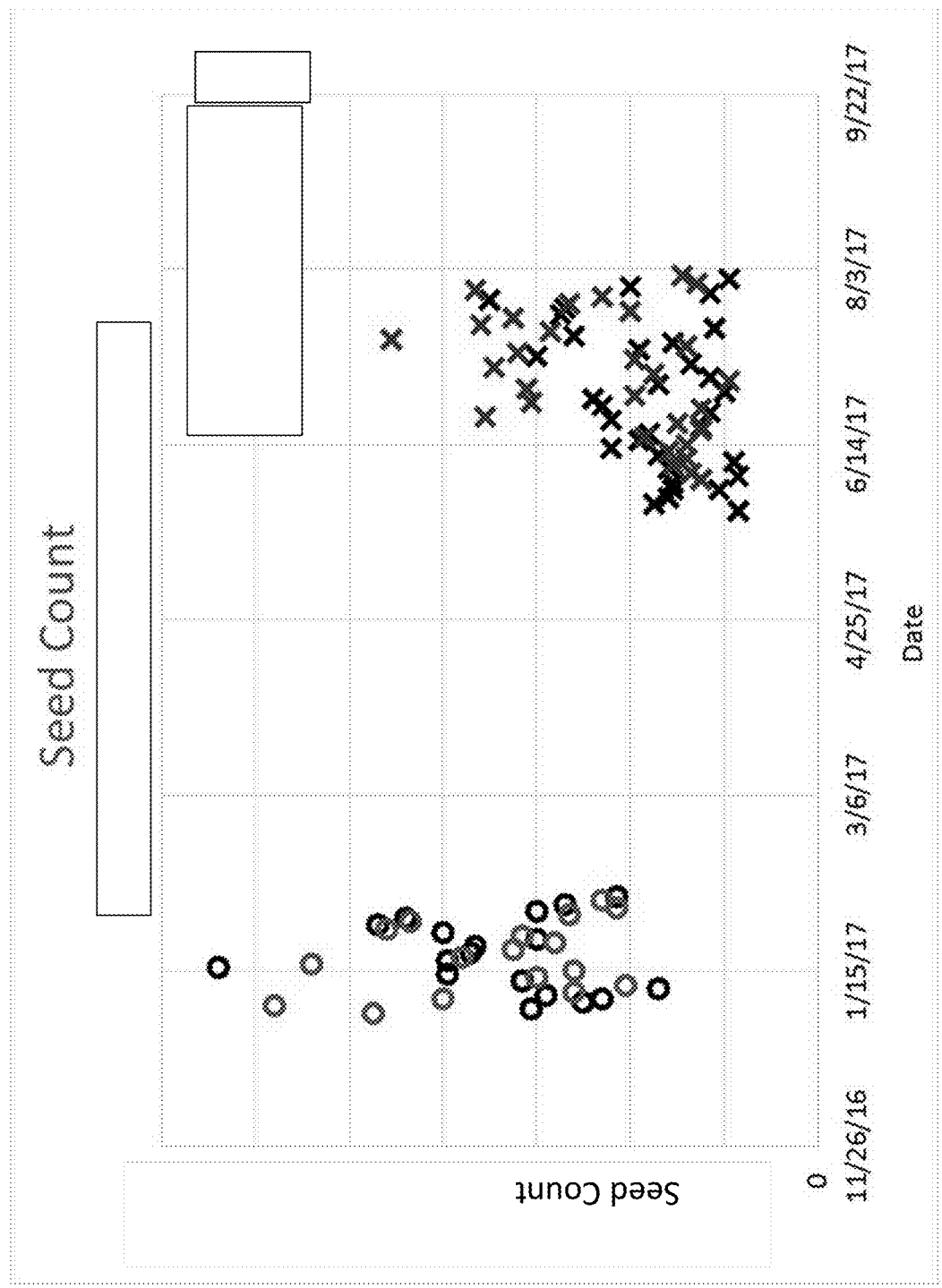
FIG. 20 is a graph comparing the seed count (an indicator of glass defects) for a prior art burner as in the '189 patent (circular points to the left) and for a double-staged burner as described herein (cross points to the right), showing a 43% reduction in seeds with the present burner.
Figure 21:
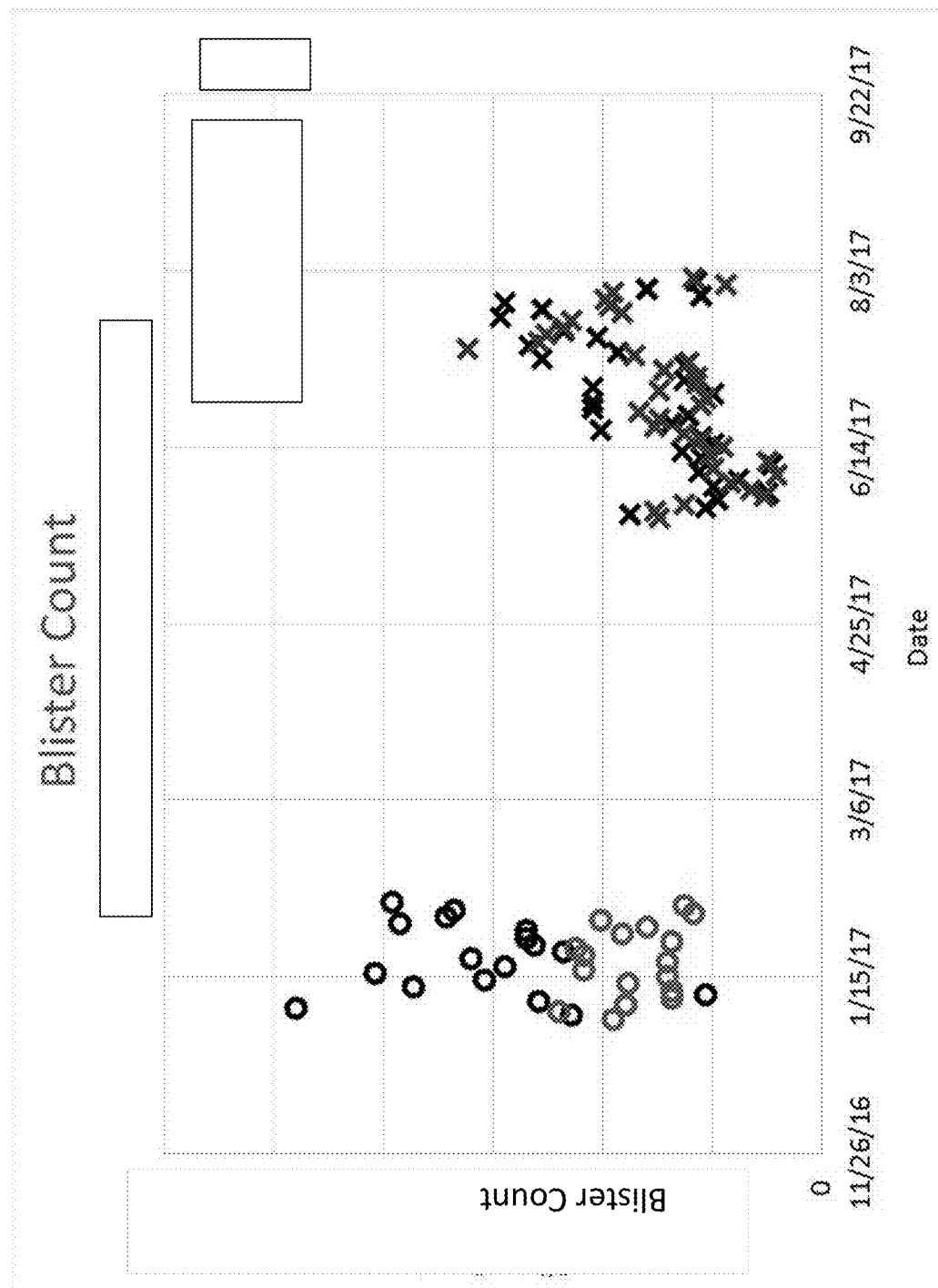
FIG. 21 is a graph comparing the blister count (an indicator of glass defects) for a prior art burner as in the '189 patent (circular points to the left) and for a double-staged burner as described herein (cross points to the right), showing a 38% reduction in blisters with the present burner.
Figure 22:
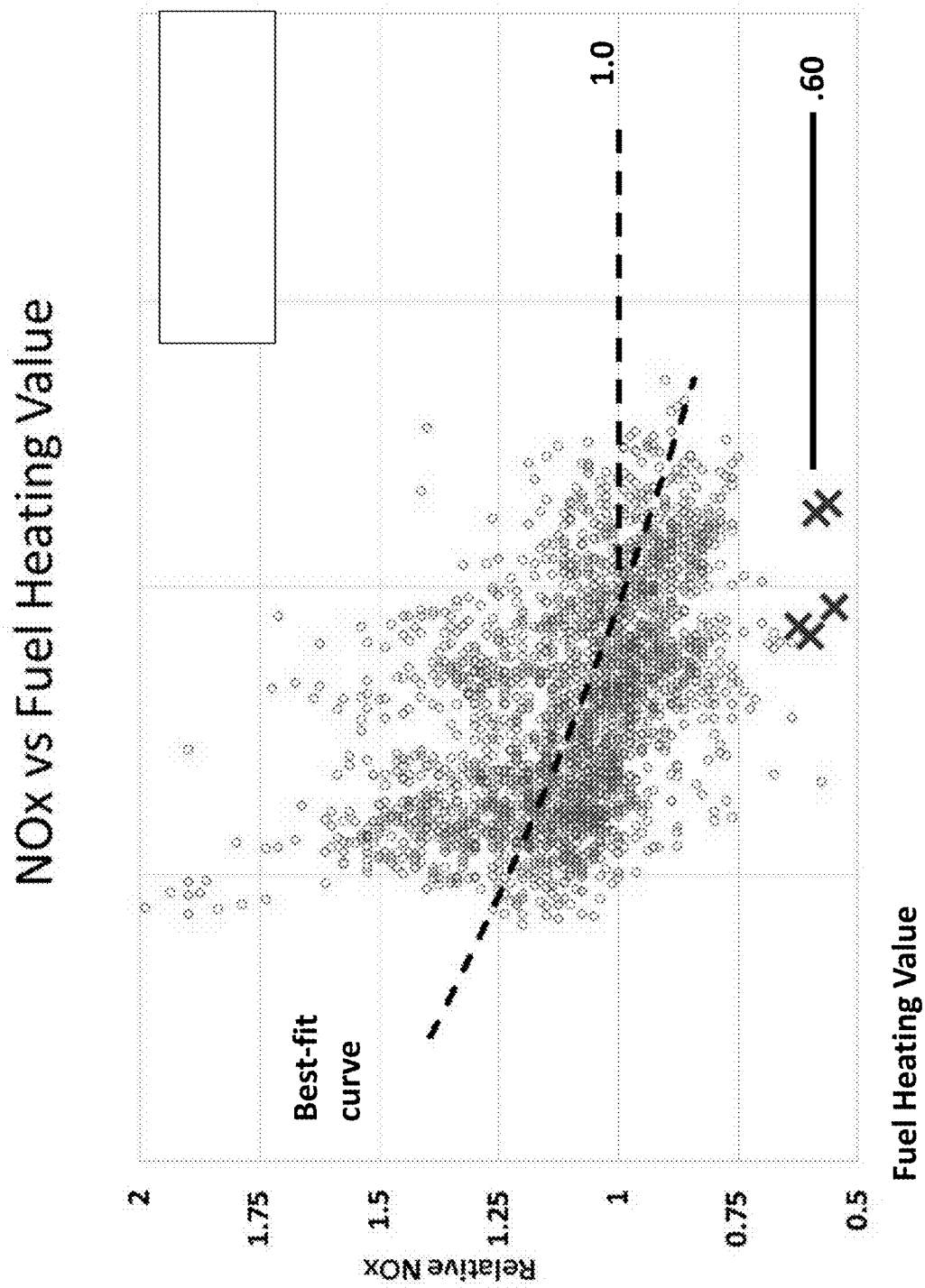
FIG. 22 is a graph comparing the relative NOx (normalized to 1 for the prior art burner) for a prior art burner as in the '189 patent (circular points, upper dashed lines) and for a double-staged burner as described herein (cross points, lower solid line), showing a 40% reduction in relative NOx over a range of heating values for the present burner.
Figure 23B:
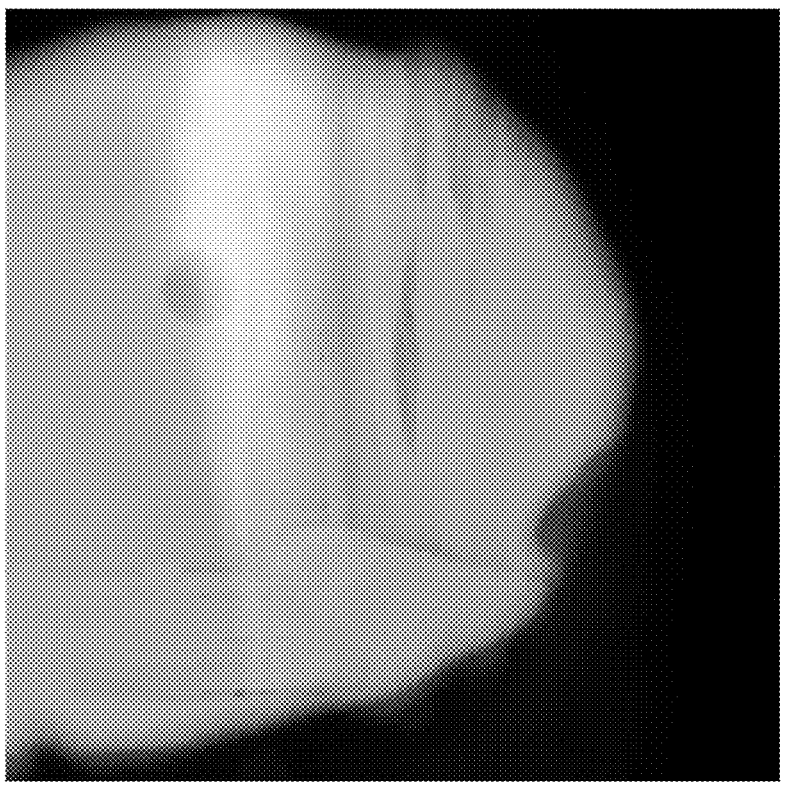
FIGS. 23A and 23B are a photographic comparison showing secondary foam in the refining zone of a glass furnace (FIG. 23A) and a mirrored surface in the same refining zone as a result of the foam-reducing mode of an embodiment of a burner described herein (FIG. 23B).
Figure 23A:
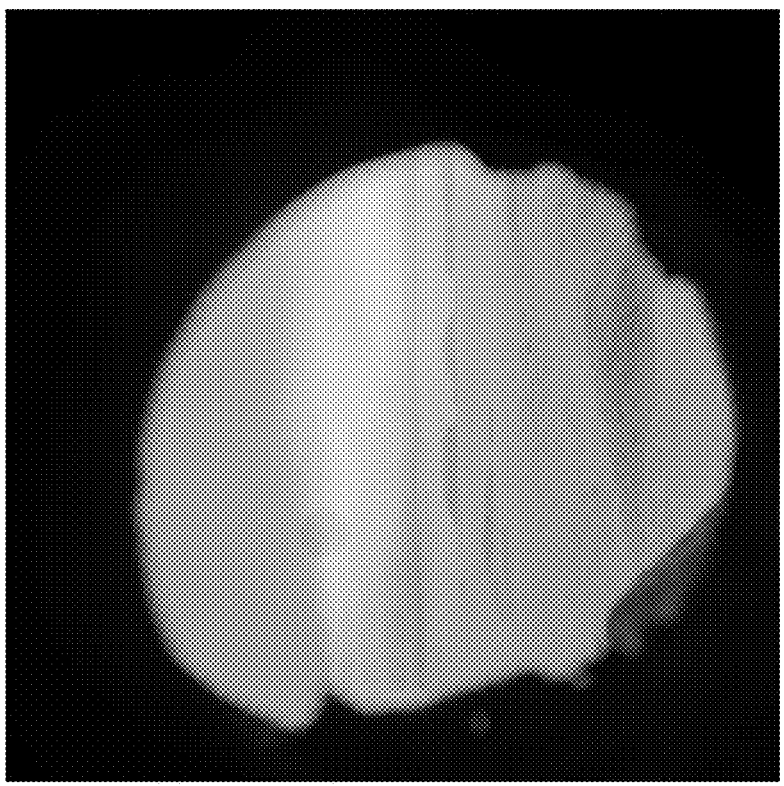

Compared to the prior art burner of the '189 patent, where oxygen (under) staging is limited to 70% of the incoming oxygen, the presently claimed burner is able to safely operate with oxygen staging in excess of 95%. In testing results in one container glass furnace where the presently claimed burners replaced the prior art '189 patent burners specific energy consumption, glass defects, and NOx emissions were all reduced. Specifically, as shown in FIG. 19, specific energy consumption was lowered by 3%. And defects, in the form of seeds and blisters, were lowered by about 40% (43% less seeds and 38% less blisters, as shown in FIGS. 20 and 21, respectively). Additionally, NOx emissions were reduced by 40% (see FIG. 22). Without being bound by theory, these beneficial effects are believed to result from both the ability to increase the staging ratio beyond that previously achievable in prior art burners and the ability to break up foam during the melting operation. That is, it is thought that lower $NO_x$ emissions result from a higher proportion of staged oxygen made possible by the present burner design, while the reduction in defects was due to the use of over-staged oxygen in the fining region that resulted in clearing of secondary foam (see FIGS. 23A and 23B; note appearance of mirrored surface with presently claimed burner). As for the reduced fuel consumption, this was enabled by both aforementioned factors.

Figure 24B:
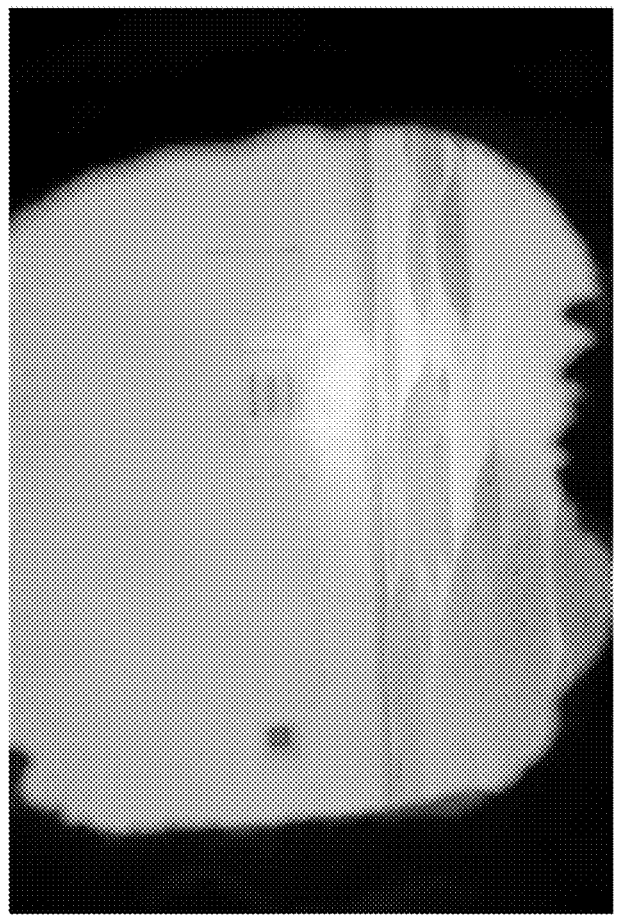
FIGS. 24A and 24B are a photographic side-view comparison between the flame of a prior art oxy-fuel burner unstaged (FIG. 24A) and under-staged (FIG. 24B).
Figure 24A:
Figure 26A:
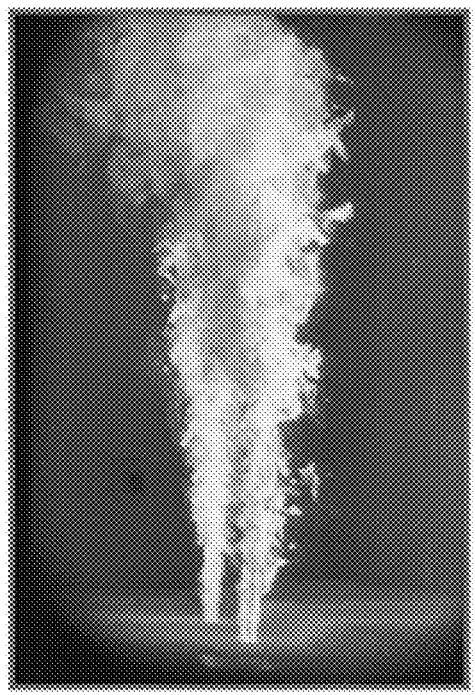
FIGS. 26A and 26B are a photographic comparison showing the radiance of a prior art under-staged burner (FIG. 26A) versus an embodiment of a burner described herein (FIG. 26B).
Figure 26B:
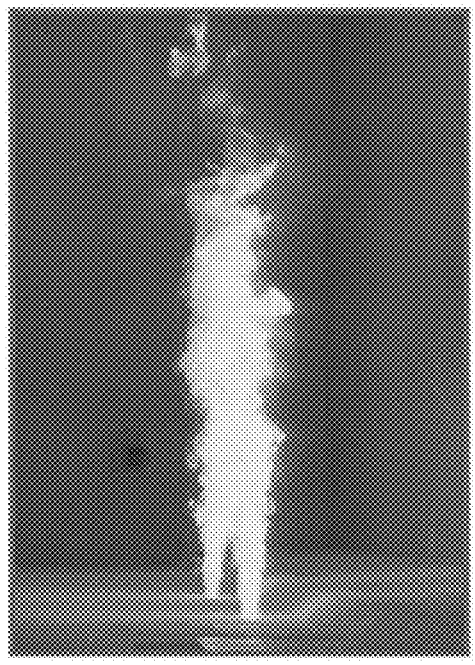

It is clear the reduction of foam in the refining region not only reduced defects but also lowered the resistance of heat transfer to the glass, thereby contributing to the higher fuel efficiency. Further, when applied to burners in the batch melting region, the increased under-staging resulted in increased luminosity of the presently claimed burner flames relative to those of the prior art '189 burners. See, for example, FIGS. 24A and 24B, noting the variation in contrast between brightness of flame and breast wall for the two burners—the present burner flame in FIG. 24B with under-flame oxygen staging is much more luminous that the present burner flame in FIG. 24A with no staging (note that the camera taking the images auto-corrects for overall brightness, so it is the contrast of the flame in FIG. 24B that really stands out as compared with the flame in FIG. 24A that almost blends into the background of the hot furnace wall). This increased the rate of radiant heat transfer to the glass in that region of the furnace.

Also described herein, with reference to FIGS. 27-48, is a second embodiment of a double-staged oxy-fuel burner using two vertically-stacked flat (i.e., wide or flat) oxygen-fuel burner elements. Each burner comprises two separate fluid passages and nozzles, one configured to deliver oxygen into a combustion space and the other configured to deliver fuel into the combustion space. However, one of the burner elements always delivers a mixture of fuel and oxygen whose fuel-oxygen equivalence ratio is less than one (fuel-lean), and the other always delivers a mixture of fuel and oxygen whose fuel-oxygen equivalence ratio is greater than one (fuel-rich). Mechanisms are provided in or in conjunction with the burner to modulate the equivalence ratio of each burner element within these fuel-lean/fuel-rich constraints. Separate mechanisms may also be provided to abruptly switch the reactant flows in each of the nozzles such that the following two basic operating states or modes can be realized: Mode 1, in which the top burner element operates fuel-rich and the bottom burner element operates fuel-lean; and Mode 2, in which the top burner element operates fuel-lean and the bottom burner element operates fuel-rich.

In either mode, the resultant combustion produces three flames, or at least three stages of flames. Simultaneously, a primary flame is generated by the fuel-rich burner element and a secondary flame is generated by the fuel-lean burner element, and then downstream of the primary and secondary flames, a tertiary flame with highly desirable characteristic is generated to combust the excess fuel from the primary flame burner element with the excess oxygen from the secondary flame burner element.

The flame produced in Mode 1 has been shown in the laboratory to generate extremely high visible and near infrared radiation, particularly in the downward direction, which is advantageous for many continuous glass melting processes. The flame produced in Mode 2 has been shown to generate a reducing atmosphere beneath the flame, which is advantageous for foam reduction and control in many continuous glass melting furnaces. Both modes are capable of producing very low NOx emissions.

The presently described burner and method delivers two vertically separated mixtures of fuel and oxygen into a combustion space. The conditions of these two mixtures are as follows. First, one of the mixtures has a ratio of oxygen to fuel that is greater than theoretically required for stoichiometric combustion (fuel-lean, equivalence ratio less than 1), while the other mixture has an oxygen fuel ratio that is less than that theoretically required for stoichiometric combustion (fuel-rich, equivalence ratio greater than 1). Second, a mechanism is provided to adjust the equivalence ratio of each mixture.

In practical terms, each mixture is delivered by a burner element having two flow passages or nozzles—one nozzle for fuel and the other nozzle for oxygen. Preferably, the burner element is constructed so that the nozzles are concentric, i.e., the burner element comprises an inner nozzle surrounded by an annular nozzle. In this embodiment, the reactant having the larger flow is flowed through the annular nozzle while the reactant having the smaller flow is flowed through the inner nozzle. Therefore, for a fuel-lean mixture with an equivalence ratio of less than 1, fuel is flowed through the inner nozzle and oxygen is flowed through the annular nozzle. Conversely, for a fuel-rich mixture with an equivalence ratio greater than 1, oxygen is flowed through the inner nozzle and fuel is flowed through the annular nozzle.

Figure 42B:
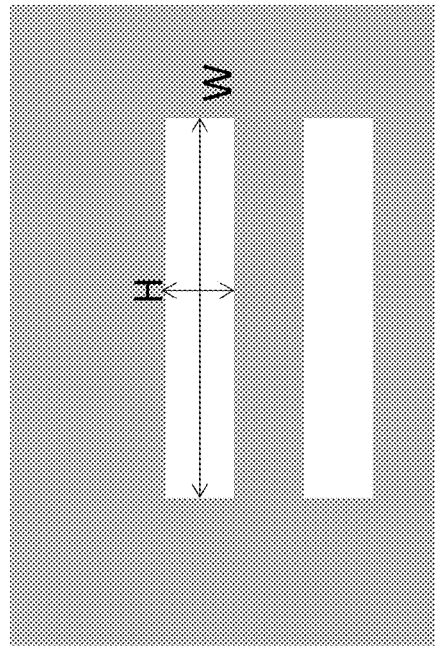
FIG. 42B is a front end view schematic showing an embodiment of a double-staged burner having rectangular nozzles.
Figure 42C:
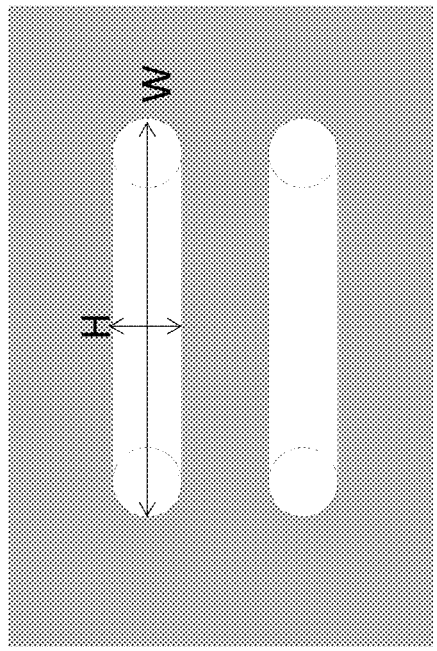
FIG. 42C is a front end view schematic showing an embodiment of a double-staged burner having oblong or ovalized nozzles.
Figure 42A:
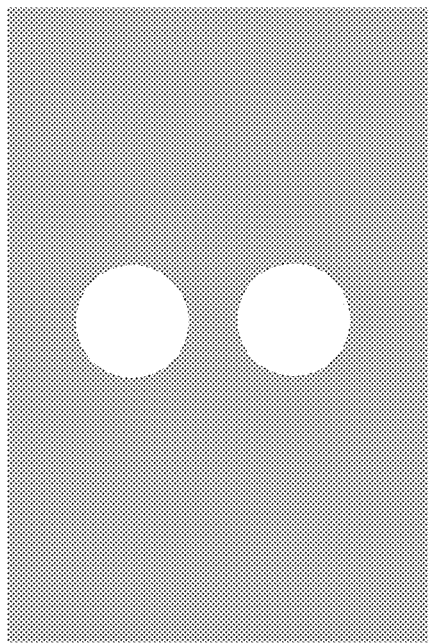
FIG. 42A is a front end view schematic showing an embodiment of a double-staged oxy-fuel burner having circular nozzles.

The burner elements may be circular, for example as shown in FIG. 42A. Preferably, the burner elements are configured to deliver the reactants through a "wide" or "flat" nozzle having an aspect ratio (width divided by height), in a plane nominally perpendicular to the plenum's flow axis, which is greater than or equal to about 2, for example as shown in FIG. 42B or 42C. Further, each burner element may have a different geometry, for example, one round burner and one wide burner element with an aspect ratio of equal to greater than about 2.

A double-staged oxy-fuel burner as described herein may be operated as follows. The equivalence ratio of one of the two flowing mixtures (the fuel-lean or simply "lean" one) is from about 0.01 to about 0.5, while the equivalence ratio of the other of the two flowing mixtures (the fuel-rich or simply "rich" one) is from about 2 to about 150. For clarity, an equivalence ratio of 0.01 means that the amount of oxygen supplied is 100 times that needed for stoichiometric or theoretically complete combustion of the amount of fuel supplied, and an equivalence ratio of 0.5 means that twice the stoichiometrically necessary oxygen is supplied, while an equivalence ratio of 2 means that half the stoichiometrically necessary oxygen is supplied (or the fuel is twice the stoichiometrically necessary amount for that amount of oxygen), and an equivalence ratio of 150 means 0.67% of the stoichiometrically necessary oxygen is supplied (or the fuel is 150 times the stoichiometrially necessary amount for that amount of oxygen). Preferably, the equivalence ratio for the lean mixture is from about 0.01 to about 0.25, and the equivalence ratio for the rich mixture is from about 4 to about 150. For the purpose of the examples and data herein, natural gas may be approximated as 100% methane, and thus the equivalence ratio of an oxygen-natural gas flowing mixture may be approximately calculated as two times the molar flow rate of natural gas divided by the molar flow rate of oxygen. Functionally, the equivalence ratio and the stoichiometric ratio are inverses of each other.

Figure 41:
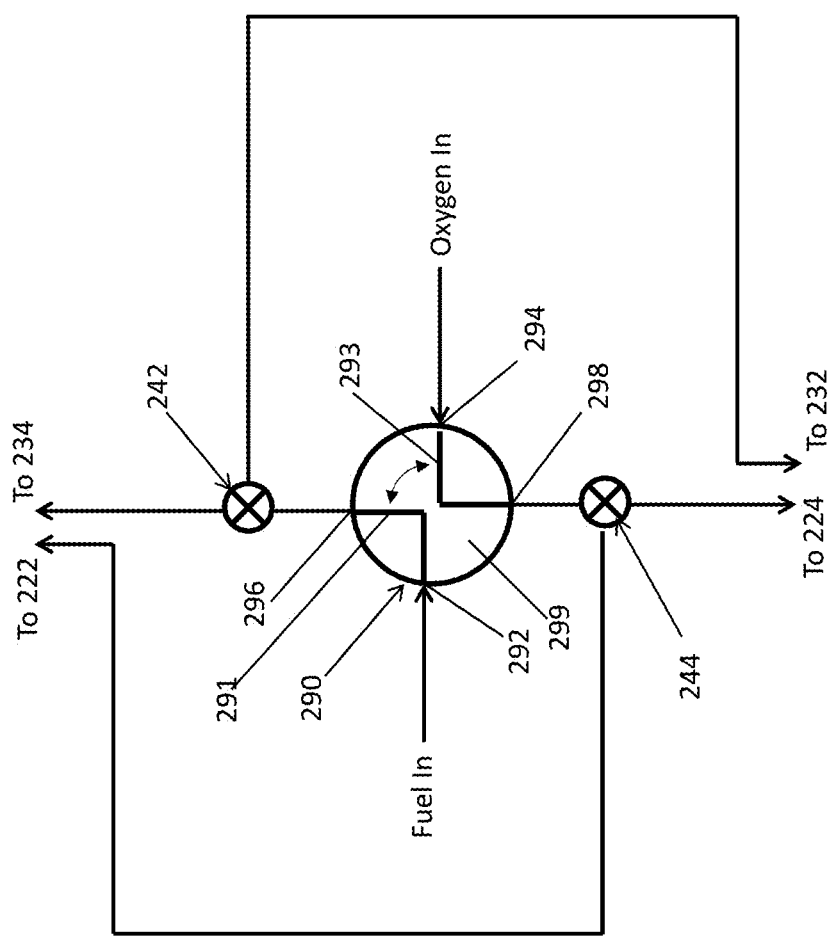
FIG. 41 is a schematic showing a four-way valve for switching the burner of FIG. 27 between first and second modes of operation by switching the reactants supplied to the various flow paths.

In addition to the above described features, the double-staged burner preferably also includes a mechanism for switching the composition of the top and bottom mixtures from fuel-rich on the top and fuel-lean on the bottom, to fuel-lean on the top and fuel-rich on the bottom. One such mechanism is shown in FIG. 41 and described in further detail below. Note that this mechanism operates independently of the staging or trim valves that are used to vary the equivalence ratio for each individual burner element.

Figure 27:
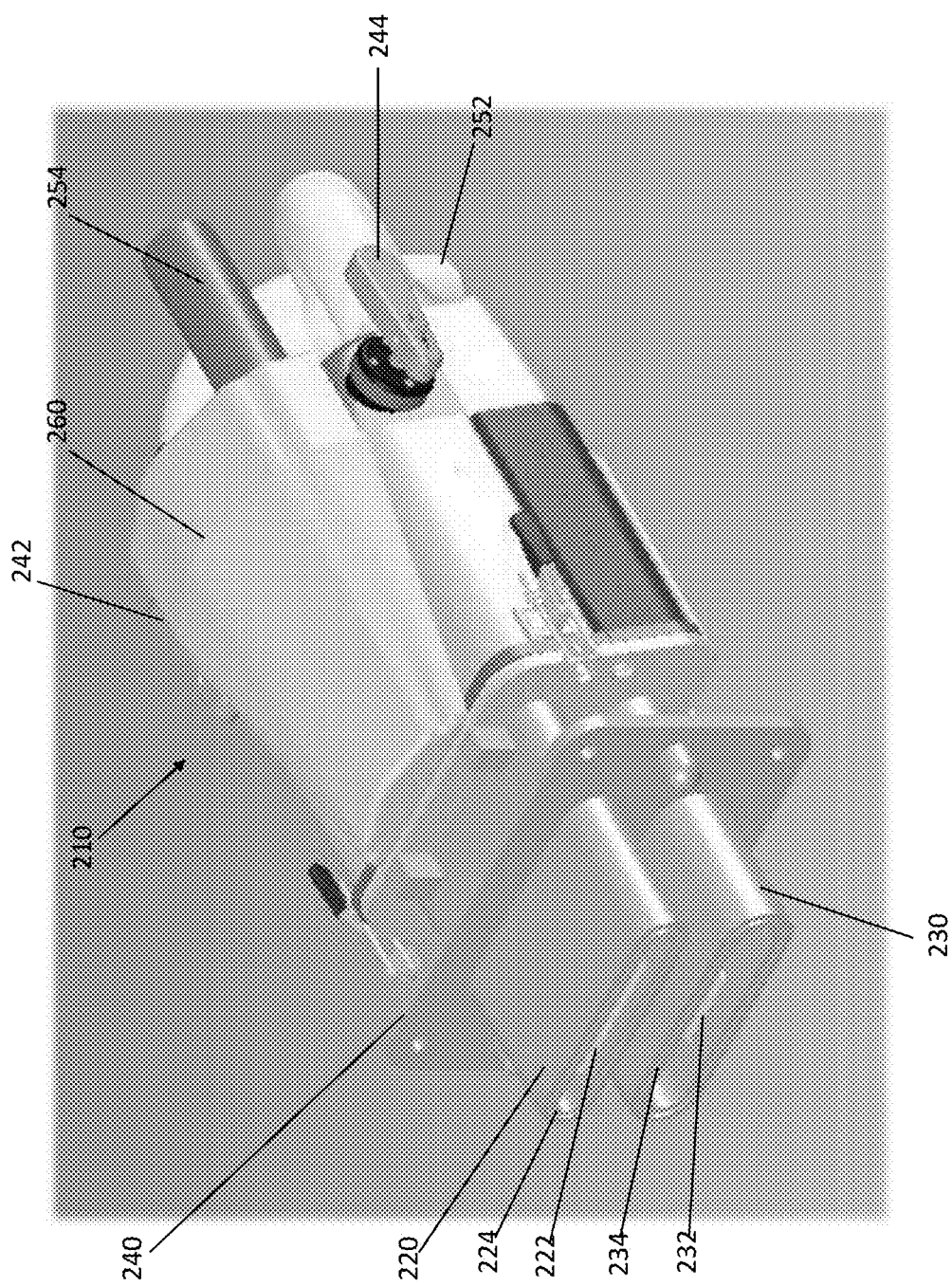
FIG. 27 is a front perspective view of another embodiment of a double staged-flame oxy-fuel burner.
Figure 28:
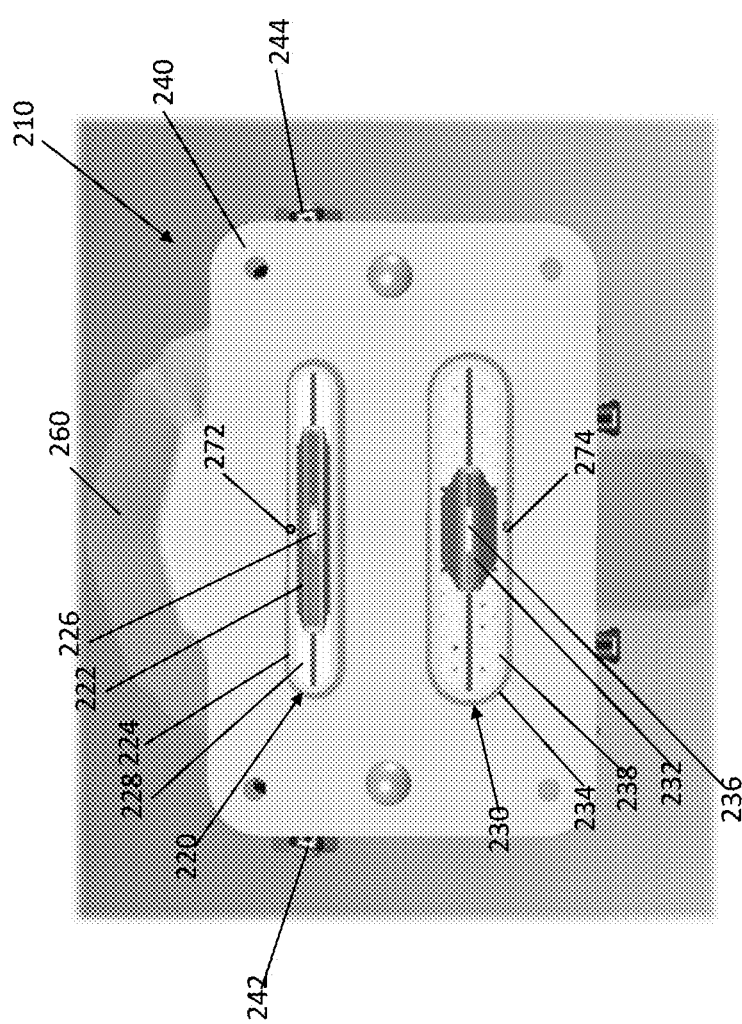
FIG. 28 is a front end view of the burner embodiment of FIG. 27.
Figure 29:
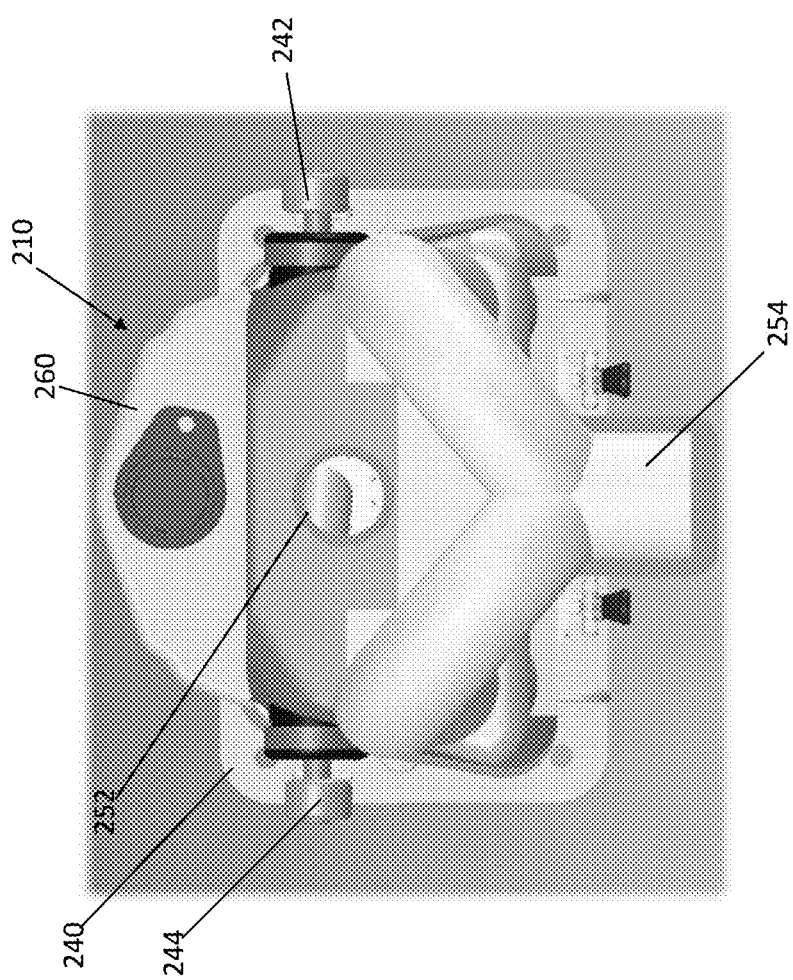
FIG. 29 is rear end view of the burner embodiment of FIG. 27.

An embodiment of a double-staged flat-flame oxy-fuel burner 210 is shown in FIGS. 27-29. The burner 210 includes a first burner element 220 spaced apart at a fixed distance from a second burner element 230. In the depicted embodiment, the first burner element 220 and the second burner element 230 are each configured as flat-flame burner elements characterized by an aspect ratio of at least 2. The aspect ratio for flat-flame or elongated an burner element is determined by dividing the length of the burner element along its major axis by the length of the burner element along its minor axis. For a more detailed discussion of flat-flame burner elements and their geometry, see U.S. Pat. No. 5,611,682.

Figure 47:
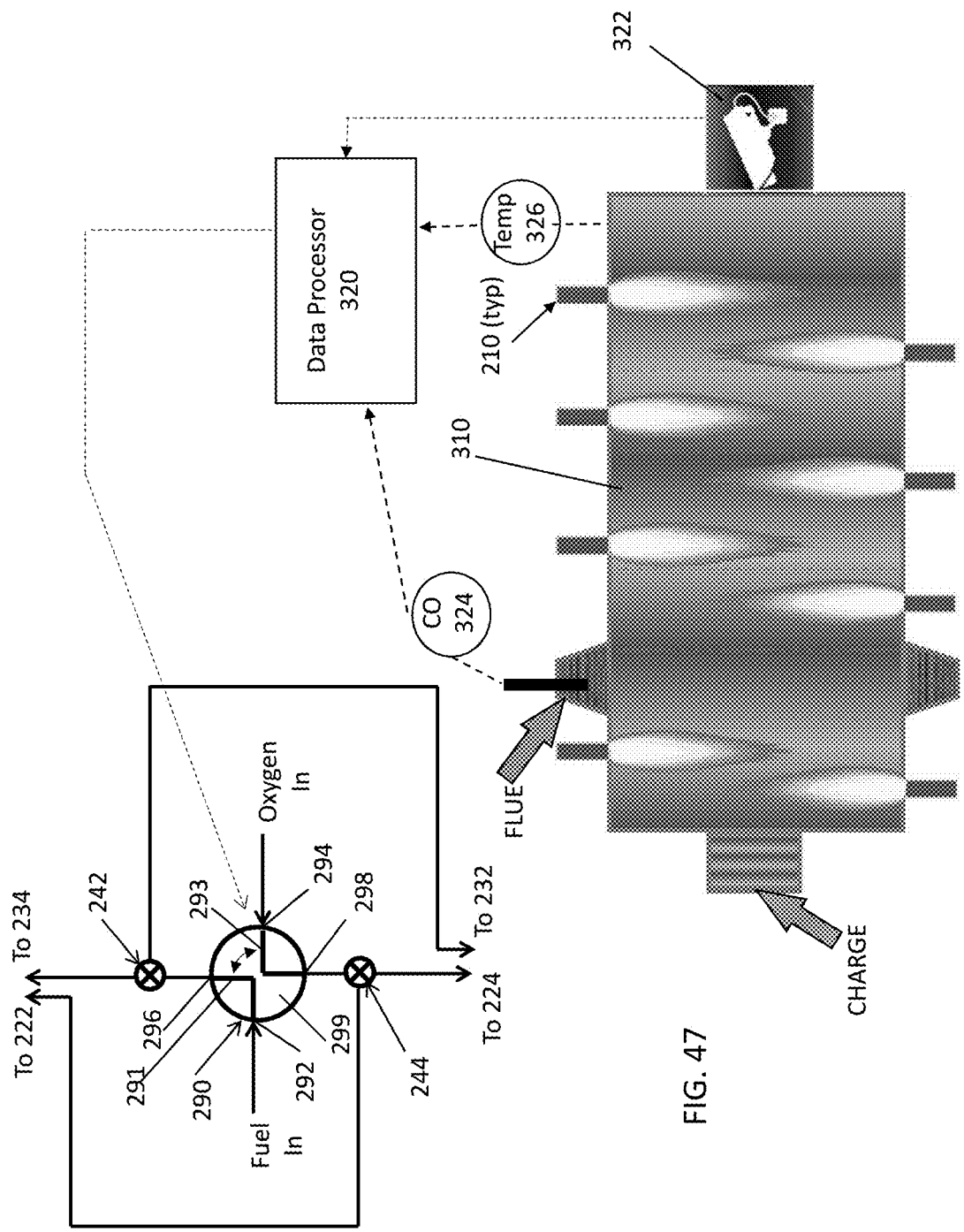
FIG. 47 is a schematic showing operation of a foam reducing system utilizing the four-way valve as in FIG. 41 in combination with sensors to detect foam on a glass bath surface and change burner operation from Mode 1 to Mode 2 as desired.
Figure 48:
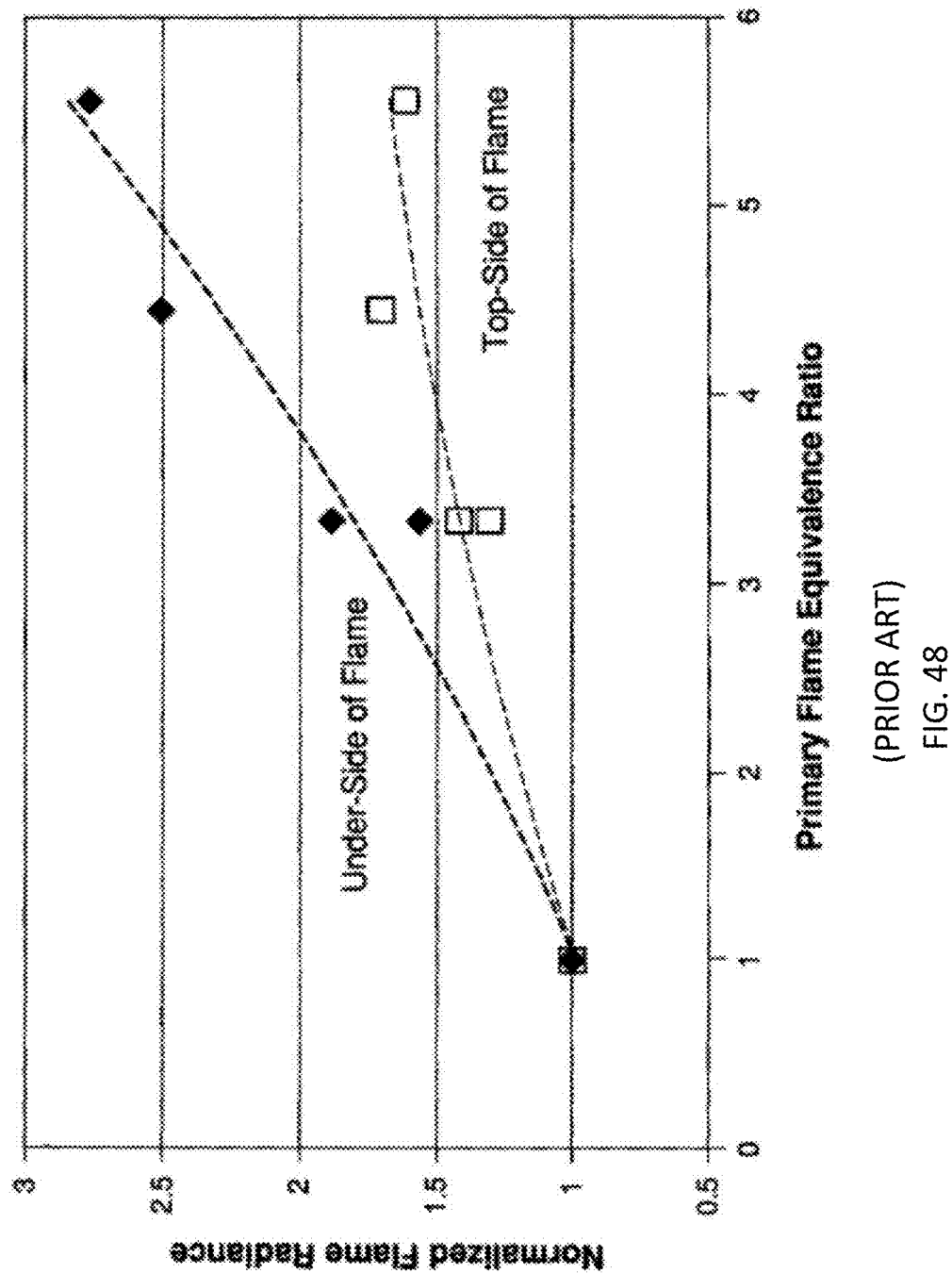
FIG. 48 is a prior art graph showing the effects on flame radiance of oxygen staging in a single-staged oxy-fuel burner with varying degrees of oxygen staging.

The burner 210 includes a mounting plate 240 for securing the burner to the outer wall of a furnace into which the burner 210 is installed, so that flames emitted from the burner elements 220 and 230 are projected into the furnace. A non-limiting example of a furnace 310 is shown in FIG. 47.

The first burner element 220 includes a first inner nozzle 222 surrounded by a first annular nozzle 224, thereby creating an first inner flow passage 226 within the inner nozzle 222 for flow of a first reactant and a first annular flow passage 228 between the inner nozzle 222 and the annular nozzle 224 for flow of a second reactant. The second burner element 230 includes a second inner nozzle 232 surrounded by a second annular nozzle 234, thereby creating a first inner flow passage 236 within the inner nozzle 232 for flow of a second reactant and a second annular flow passage 238 between the inner nozzle 232 and the annular nozzle 234 for flow of a first reactant. The reactants for a combustion reaction are fuel and oxygen, such that the first reactant is one of fuel and oxygen and the second reactant is the other of fuel and oxygen.

The burner 210 includes a first reactant conduit 252 through which the first reactant is supplied to the burner 210, and a second reactant conduit 254 through which the second reactant is supplied to the burner 210. A first staging valve 242 apportions the first reactant between the first inner nozzle 222 and the second annular nozzle 234, while a second staging valve 244 apportions the second reactant between the second inner nozzle 232 and the first annular nozzle 224. A first staging ratio is defined as the percentage of the first reactant flow that is apportioned to the second annular nozzle 234. For example, at a first staging ratio of 75%, 25% of the first reactant flow is apportioned to the first inner nozzle 222 and 75% of the first reactant flow is apportioned to the second annular nozzle 234. Alternatively, this could be describe as a flow ratio of 3:1 between the second annular nozzle 234 and the first inner nozzle 222. Similar, 80% staging would be a flow ratio of 4:1, 90% staging would be a ratio of 9:1, and 95% staging would be a ratio of 19:1. Similarly, a second staging ratio is defined as the percentage of the second reactant flow that is apportioned to the first annular nozzle 224.

One or more sensors 272 may be mounted in the first annular passage 228 for measuring one or more of temperature and pressure in the second reactant flow through that passage. Similarly, one or more sensors 274 may be mounted in the second annular passage 238 for measuring one or more of temperature and pressure in the first reactant flowing through that passage. Data from the sensors 272 and 274 is transmitted to a controller (not shown) positioned in a data unit 260, and based on that data, the controller may adjust the position of the first staging valve 242 and/or the second staging valve 244 to improve or optimize operation of the burner 210.

Operation of the burner 210 (designated as "Burner B" in some of the figures) was tested at various firing rates and staging conditions, and was compared with operation of a single-staged (oxygen staging) oxy-fuel burner as described in U.S. Pat. No. 5,611,682 (designated as "Burner A" in some of the figures). Overall, Burner B generally exhibited a wider, longer, more luminous flame with broader flame length control, substantially higher bottom temperatures measured in the furnace (i.e., more heat transmitted to the charge), and lower NOx emissions. Those results are discussed in further detail below.

Figure 45:
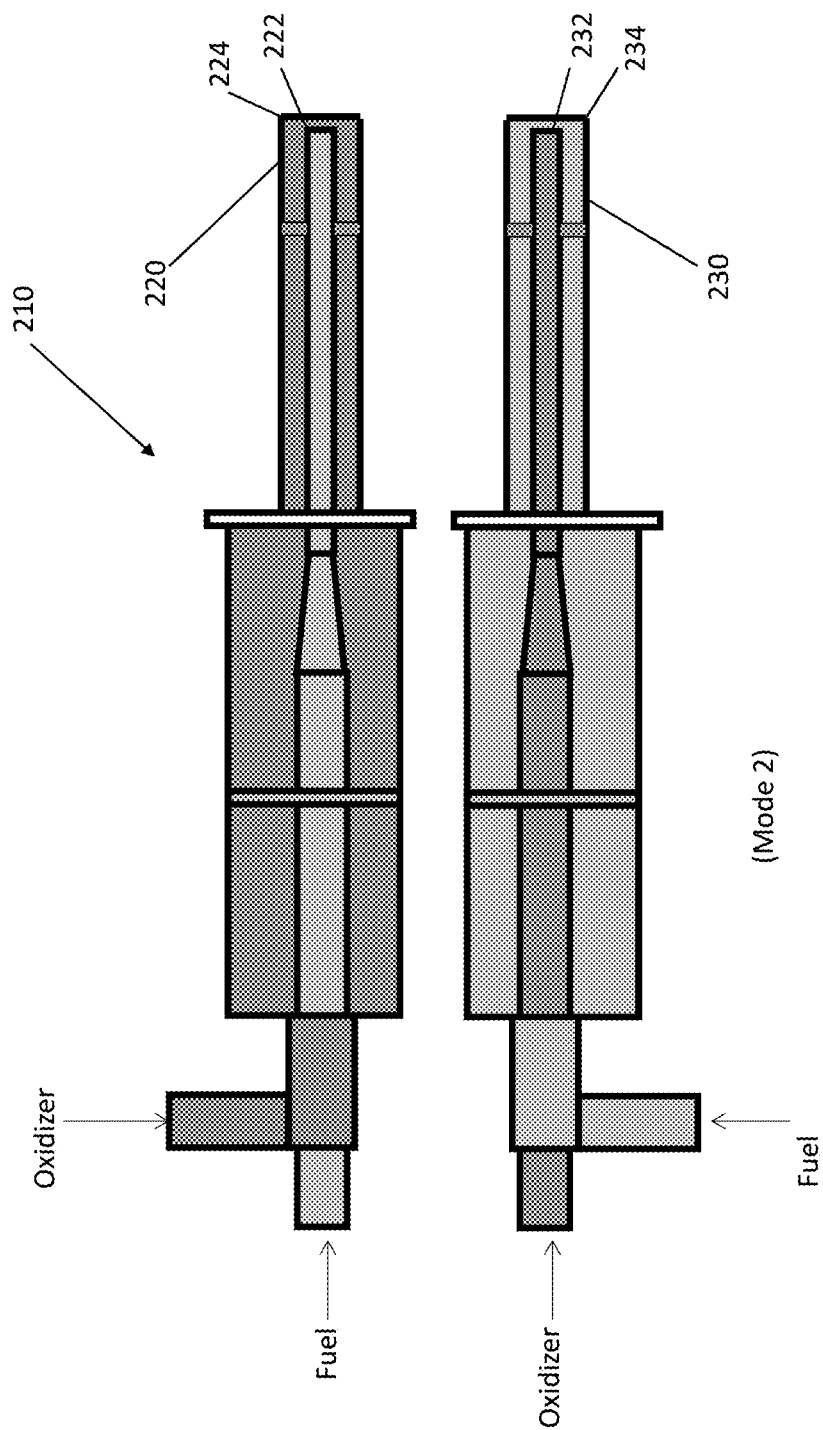
FIG. 45 is a side cross-sectional view of an embodiment of a double-staged oxy-fuel burner operated in Mode 2 wherein a fuel-lean burner element is positioned above a fuel-rich burner element.
Figure 46:
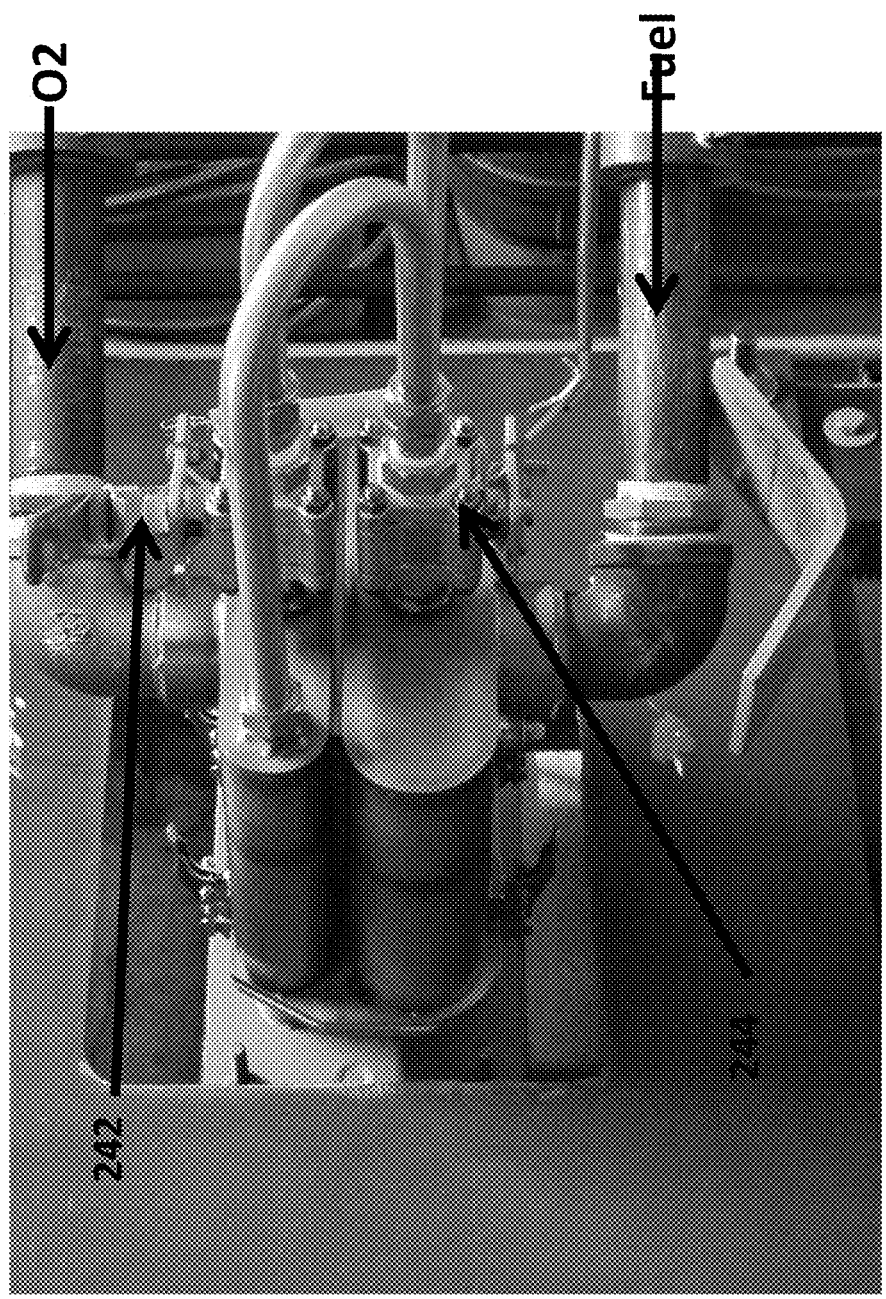
FIG. 46 is a rear photograph of a burner incorporating the two burner elements of the embodiment of FIG. 45 into a single burner.

An additional operational aspect of a double-staged oxy-fuel burner 210 is to selectively control through which burner element the fuel-rich and fuel-lean mixtures are delivered. In a first mode of operation, a fuel-rich mixture is flows through the top burner element 220 while a fuel-lean mixture is flowed through the bottom burner element 230. In an second, alternate, mode of operation, a fuel-lean mixture is flowed through the top burner element 220 and a fuel-rich mixture is flowed through the bottom burner element 230. The second mode of operation is expected to be advantageous in areas of the furnace where the glass surface is prone to foam formation, for reasons previously described. There are several means of enabling this second ("inverted") operating mode. One is to simply decide in advance which burner(s) should undergo inverted operation and connect the oxygen and fuel as illustrated in FIGS. 45 and 46. Another is to connect the fuel and oxidizer to an external switching valve, as previously described and exemplified in FIG. 41.

Then, activation of the switching valve enables switching between the first ("normal") and second ("inverted") operating modes.

This activation between the first and second modes can be manual or automatic. One automatic mechanism of actuation of particular interest is through the use of a glass surface sensor and transmitter, for example as shown in FIG. 47. The glass surface sensor may for example be a video camera 322 with a data processor 320, or a radiometer which is calibrated to detect the particular emission characteristic of foam on the glass surface in the vicinity of the glass melting furnace in proximity to the inventive burner of interest. Signals obtained from one or more furnace temperature sensors 326 and/or one or more flue gas CO sensors 324 may also be used by the data processor 320 to analyze the condition of the furnace and adjust operation of the burner 210 accordingly. In this particular arrangement, the switching between the first and second operating modes (and vice versa) is incorporated into the control system associated with the burner, as illustrated in FIG. 47.

In particular, in the first mode of operation, the burner 210 is fired flowing oxygen as the first reactant through the first inner nozzle 222 and the second annular nozzle 234, and fuel as the second reactant through the second inner nozzle 232 and the first annular nozzle 224, and the burner is oriented in a furnace so that the first burner element 220 is above the second burner element 230 (so that the second burner element 230 is closer to the charge in the bottom of the furnace). Both reactants are staged at high levels. For example, oxygen is preferably staged from about 75% to about 98%, and in some embodiments at 80%, 90%, 95%, or 98%, meaning that that only about 2% to about 25% of the oxygen is provided to the first burner element 220. This results in a very fuel-rich flame from the first burner element 220, with a large amount of fuel surrounding a small amount of oxygen—just enough oxygen to support combustion and create a sooty, highly-radiant primary flame. Similarly, fuel is preferably staged from about 75% to about 98%, and in some embodiments at 80%, 90%, 95% or 98%, meaning that only about 2% to about 25% of the fuel is provided to the second burner element 230. This results in a very fuel-lean flame from the second burner element 230, with a large amount of oxygen surrounding a small amount of fuel—just enough fuel to form a luminous secondary flame. Important, the excess fuel from the first burner element 220 and the excess oxygen from the second burner element 230 mix and combust further downstream from the primary and secondary flames, forming a voluminous and highly radiant tertiary flame. It is this tertiary flame that provides the most significant benefits from the burner 210.

In the mode of operation described above, an oxidizing atmosphere is created proximal to the charge in the furnace. However, in some cases, particularly in a glass furnace, foam may form on the surface of the glass, which greatly reduces heat transfer into the glass. It has been found that creating a reducing atmosphere above the surface of the glass (charge) can control and diminish this foam, thereby improving heat transfer into the glass. Therefore, the burner 210 may also be operated in a second mode of operation wherein the reactants are switched so that the first burner element 220 flows fuel through the first inner nozzle 222 and oxygen through the first annular nozzle 224 to form a fuel-lean flame away from the charge, and the second burner element 230 flows oxygen through the second inner nozzle 232 and fuel through the second annular nozzle 224 to form a fuel-rich flame proximal to the charge.

To enable switching back and forth between the first and second modes of operation, a four-way valve 290 may be provided upstream of the first staging valve 242 and the second staging valve 244, as shown schematically in FIG. 41. The four-way valve has an inlet for each reactant, an inlet 292 for fuel and an inlet 294 for oxygen. The four-way valve has two outlets, a first outlet 296 connected to the first staging valve 242 and a second outlet 298 connected to the second staging valve 244. A valve plug 299 within the valve 290 has two flow paths 291 and 293, and rotates between two positions. In a first position, the flow path 291 connects the fuel inlet 292 with the first outlet 296, while the flow path 293 connects the oxygen inlet 294 with the second outlet 298. In a second position, the flow path 291 connects the fuel inlet 292 with the second outlet 298, while the flow path 293 connects the oxygen inlet 294 with the first outlet 296.

Figure 30A:
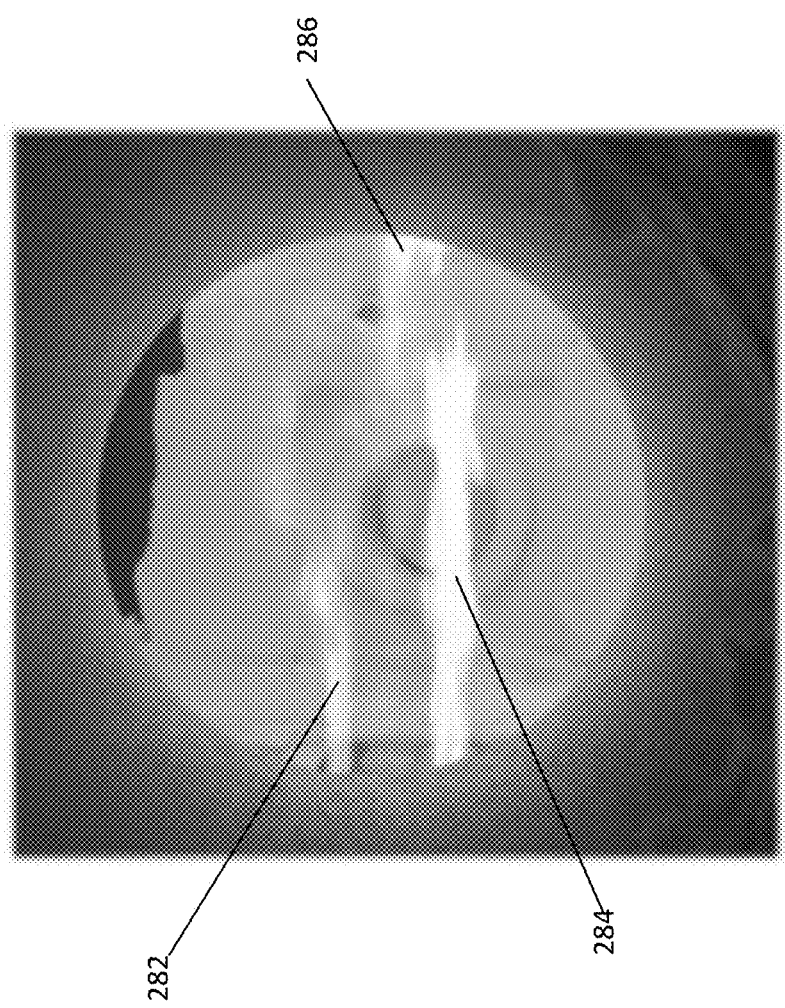
FIG. 30A is an exemplary photographic side view of oxy-fuel combustion using a burner embodiment as in FIG. 27, with the top burner element having an attached flame and operating fuel-rich with an oxygen staging ratio of about 80% to about 95% (i.e., only about 5% to about 20% of the total oxygen is supplied in an inner nozzle, surrounded by fuel in an annular nozzle), and with the bottom burner element operating fuel lean with a fuel staging ratio of about 80% to about 90% (i.e., only about 10% to about 20% of the total fuel is supplied in an inner nozzle, surrounded by oxygen in an annular nozzle).
Figure 30B:
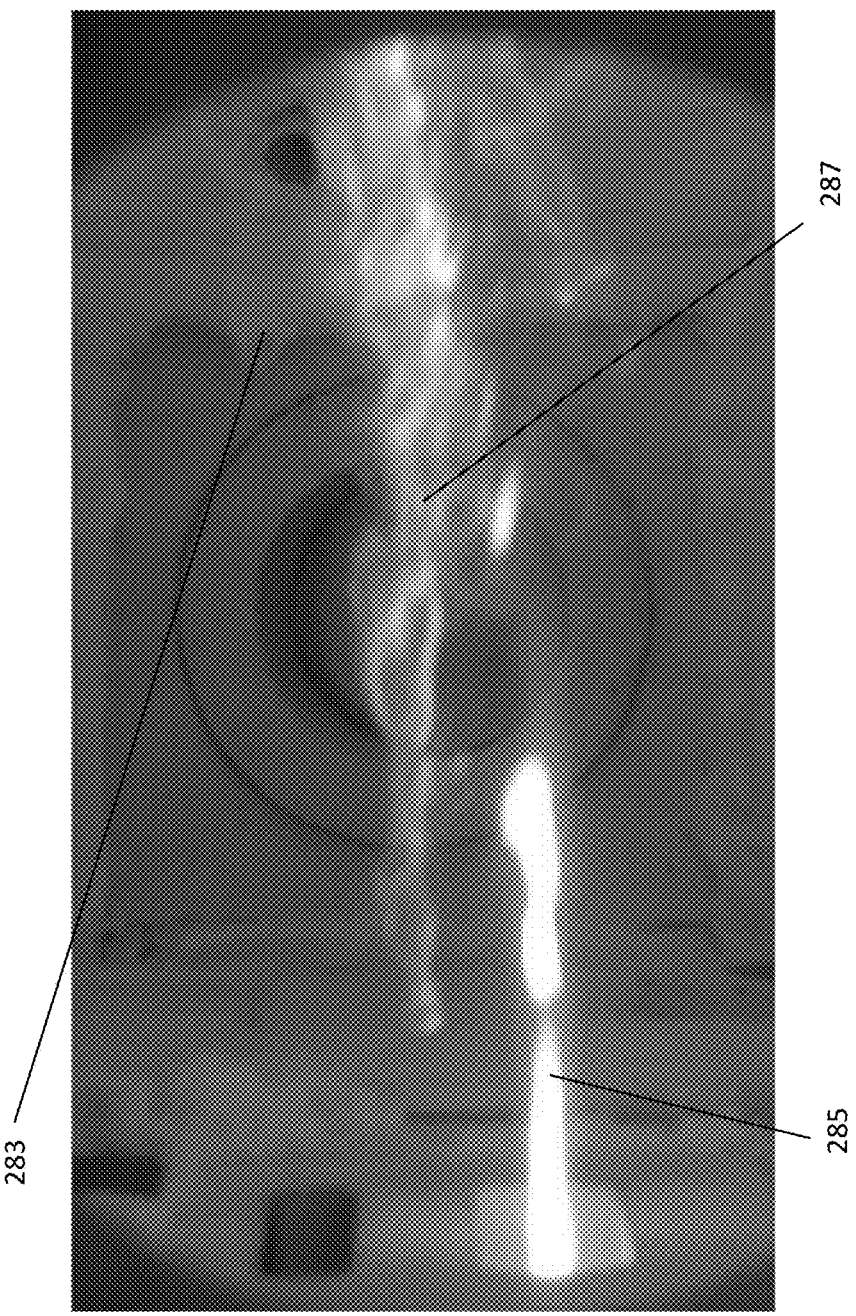
FIG. 30B is an exemplary photographic side view of oxy-fuel combustion using a burner embodiment as in FIG. 27, with the top burner element having a detached (lifted) flame and operating at similar staging conditions as in FIG. 30A, but exhibiting a desirable wake flame at the interface between the two discharge mixture streams from the top and bottom burner elements.

In one example, as shown in FIG. 30A, the burner 210 was operated in a furnace in the first mode at a fuel staging ratio of 90% (i.e., 90% of the fuel in the first annular nozzle 224 and 10% in the second inner nozzle 232) and an oxygen staging ratio of 95% (i.e., 95% of the oxygen in the second annular nozzle 234 and 5% in the first inner nozzle 222). As can be seen, an attached primary fuel-rich flame 282 is formed at the outlet of the first burner element 220, a secondary fuel-lean flame 284 is formed at the outlet of the second burner element 230, and a tertiary flame 286 is formed downstream in the furnace. In contrast, under similar staging ratios, the burner 210 was operated to achieve a detached flame, as shown in FIG. 30B. As can be seen, a primary fuel-rich flame 283 takes very long to develop luminosity, and is detached from the exit plane of the burner, while the oxygen-rich flame 285 remains attached, and a long wake flame 287 is formed at the interface between the fuel-rich mixture emanating from the top burner element and the fuel-lean mixture emanating from the bottom burner element.

Figure 31B:
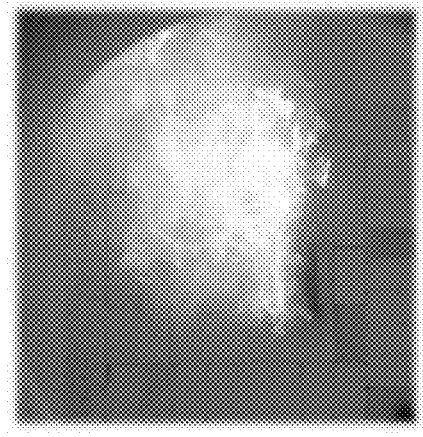
FIG. 31B is a photographic front end view of a single-staged flat flame burner with 65% oxygen staging, fuel and 35% of the oxygen in the top port and 65% of the oxygen in the bottom port.
Figure 31C:
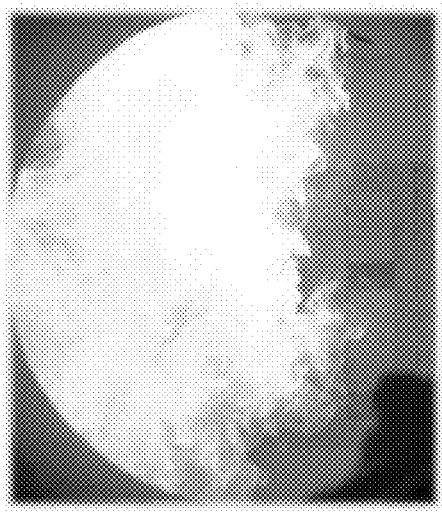
FIG. 31C is a photographic front end view of a double-staged flat flame burner, with staged fuel surrounding oxygen in the top port and staged oxygen surrounding fuel in the bottom port, with both fuel and oxygen staged at about 85% to 98%.
Figure 31A:
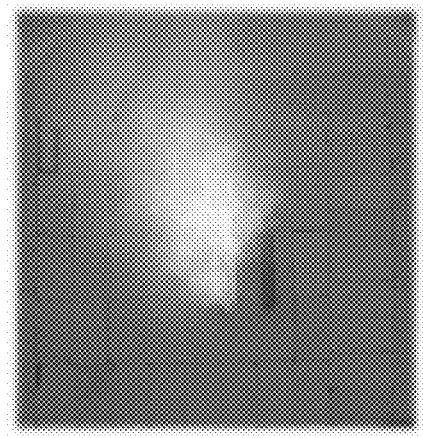
FIG. 31A is a photographic front end view of a flat flame burner firing with 5% oxygen staging, with 95% of the oxygen surrounding fuel in the top port.

FIGS. 31A-3123C compare operation of a flat flame burner with no staging (Burner A, 5% oxygen staging) in FIG. 31A, a single-staged flat flame burner with full oxygen staging (Burner A, 65% oxygen staging) in FIG. 31B, and a double-staged flat flame burner with 90% fuel staging and 95% oxygen staging (Burner B) in FIG. 31C, all fired at 6 MMBtu/hr. As is already well-known, Burner A with 65% oxygen staging produce a more luminous and voluminous flame than Burner A with 5% staging. But surprisingly, Burner B produces a dramatically more luminous and voluminous flame than Burner A with 65% staging—a very large effect resulting from keeping a small amount of oxygen in the first burner element 220 and providing a small amount of fuel to the second burner element 230.

FIGS. 32A-32B substantiate this effect at a firing rate of 6 MMBtu/hr, wherein FIG. 32A shows Burner A with 65% oxygen staging and FIG. 32B shows Burner B with fuel staging of 90% and oxygen staging of 90%. In addition, as shown in FIG. 32C, Burner B exhibits both a longer flame length and a greater degree of flame length control (by adjusting one or both of the staging ratios) than does Burner A.

Laboratory tests were conducted in a test furnace to validate improved performance of a double-staged oxy-fuel burner (Burner B with fuel and oxygen staging) as compared with an existing single-staged oxy-fuel burner (Burner A with oxygen staging), as well as an existing non-staged flat flame burner (Burner A with no staging). Measurements included UV & near IR radiation on the underside of the flame with a spectral radiometer and bottom-of-furnace temperatures using a standard thermocouple array comprising seventeen thermocouples, plus furnace exit gas temperature, as shown schematically in FIG. 34.

Figure 33A:
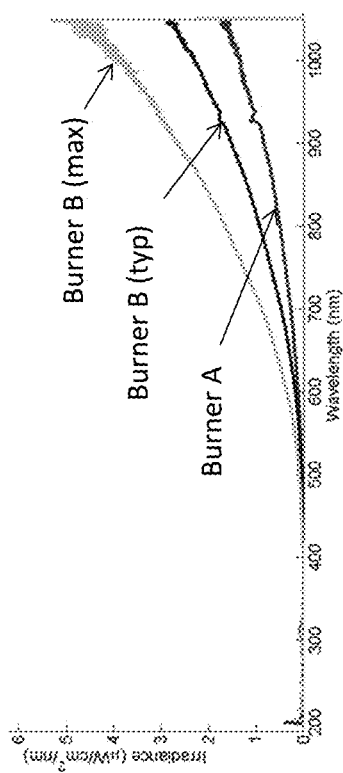
FIG. 33A is a graph comparing the irradiance at 4 feet downstream of the burner outlet plane of a single-staged flat flame burner with about 65% oxygen staging so that the top port is flowing 100% of the fuel and 35% of the oxygen, and the bottom port is flowing 65% of the oxygen (Burner A); a typical double-staged flat flame burner over a range of firing conditions producing a detached top (fuel-rich) flame (Burner B (typ)), nominally about 95% (91% to 96%) oxygen staging to the bottom burner element and about 5% (4% to 9%) to the top burner element, combined with about 90% (89% to 95%) fuel staging to the top burner element and about 10% (5% to 11%) to the bottom burner element; and a double-staged flat flame burner producing a detached top (fuel-rich) flame with both fuel and oxygen staging adjusted for maximum heat flux (Burner B (max)), nominally about 85% oxygen staging to the bottom burner element and about 15% to the top burner element, combined with less than or about 100% fuel staging to the top burner element and greater than or about 0% fuel to the bottom burner element.
Figure 33B:
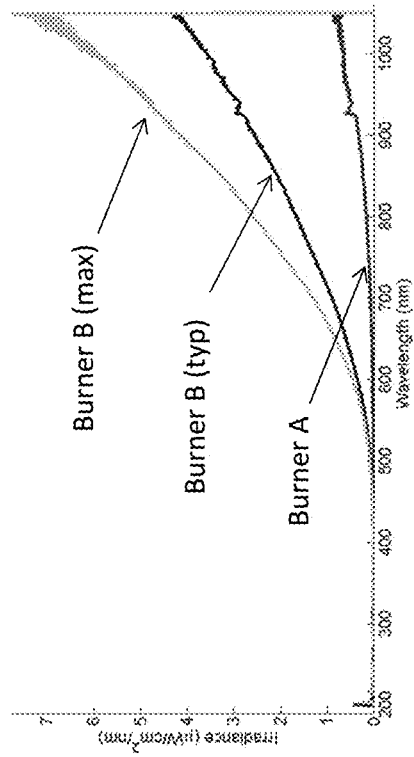
FIG. 33B is a graph comparing the irradiance at 8 feet downstream of the burner outlet plane of a single-staged flat flame burner with full staging (Burner A), an typical double-staged flat flame burner staged over a range of firing conditions producing a detached top (fuel-rich) flame (Burner B (typ)), and double-staged flat flame burner producing a detached top (fuel-rich) flame with both fuel and oxygen staging adjusted for maximum heat flux (Burner B (max)).
Figure 34:
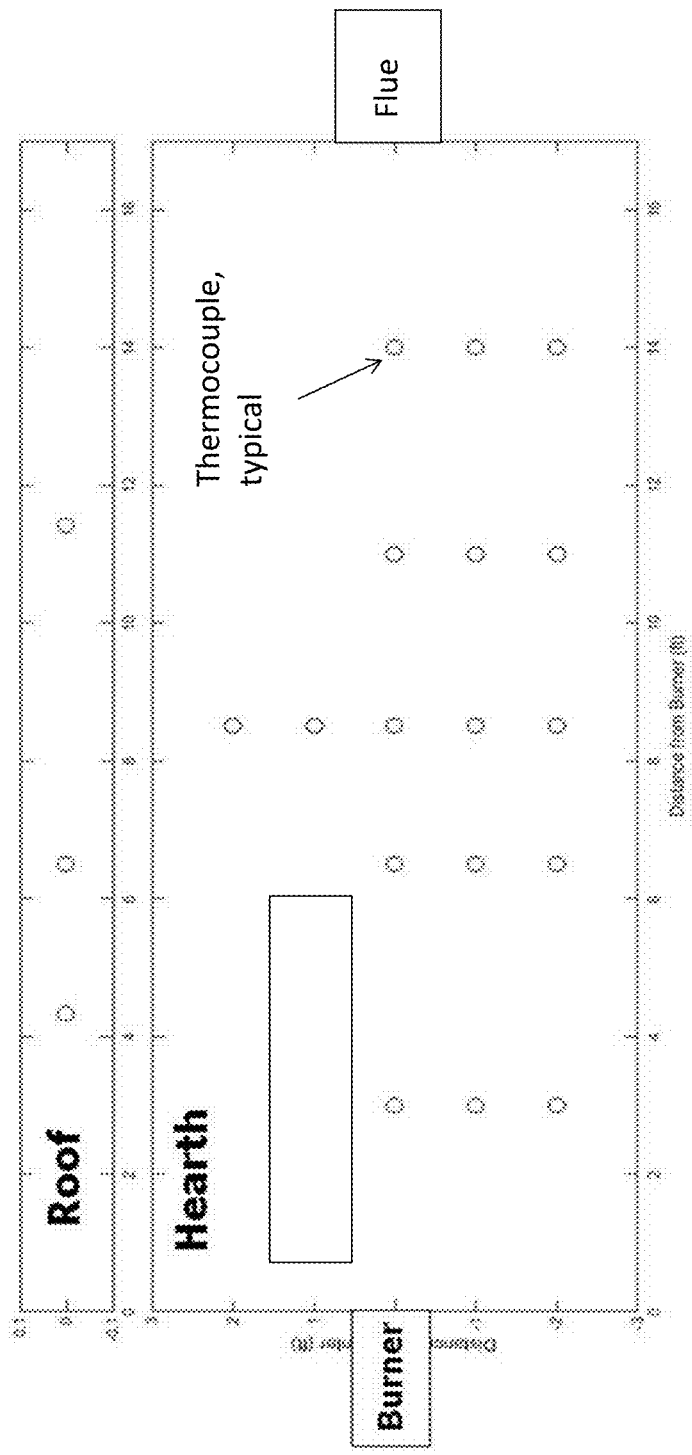
FIG. 34 is a graphic showing the positioning of thermocouples for measuring heat flux and hearth temperature during firing of burners described herein.

FIGS. 33A-33B show a comparison of spectral radiation measurements at a firing rate of 6 MMBtu/hr between Burner A with 65% oxygen staging, Burner B (typ) with a detached flame and about 90% fuel staging and about 95% oxygen staging, and Burner B (max) with a detached flame and nearly 100% fuel staging and about 85% oxygen staging. Note that for the Burner (B) max conditions, adjusting the fuel staging ratio between about 85% and 100% primarily affects flame length and not luminosity as long as the fuel-rich flame remains in the detached state, so that a heat flux graph for 85% fuel staging and 85% oxygen staging would yield approximately the same results as shown in the upper data line in the graphs of FIGS. 33A and 33B. These radiometric results show the flame produced by Burner B has a spectral radiation intensity that is several times larger than that produced with Burner A. It is important to note that the measured wavelength band of the spectrum is almost entirely attributable to soot radiation. Hence, these measurements give indirect, but compelling validation of the higher soot production of Burner B.

FIG. 33A shows the incidence of visible and near infrared radiation at a distance of 4 feet downstream of the burner outlet plane, and FIG. 33B shows the incidence of visible and near infrared radiation at a distance of 8 feet downstream of the burner outlet plane. This incident radiation is indicative of the amount of heat transfer from the flame to a charge in the furnace, wherein a higher incident radiation indicates greater heat transfer and more efficient operation. Two trends are immediately evident. First, Burner B (typ) shows consistently higher incident radiation than Burner A, and Burner B (max) shows consistently higher incident radiation than Burner B (typ), across the entire measured spectrum. Second, while incident radiation increases further away from the burner plane for both Burner B (typ) and Burner B (max), the incident radiation actually decreases further away from the burner plane for Burner A.

As discussed above, FIGS. 30A and 30B visually illustrate the difference between an attached top (fuel-rich) flame as in FIG. 30A and a detached or lifted top (fuel-rich) flame as in FIG. 30B.

Figure 35:
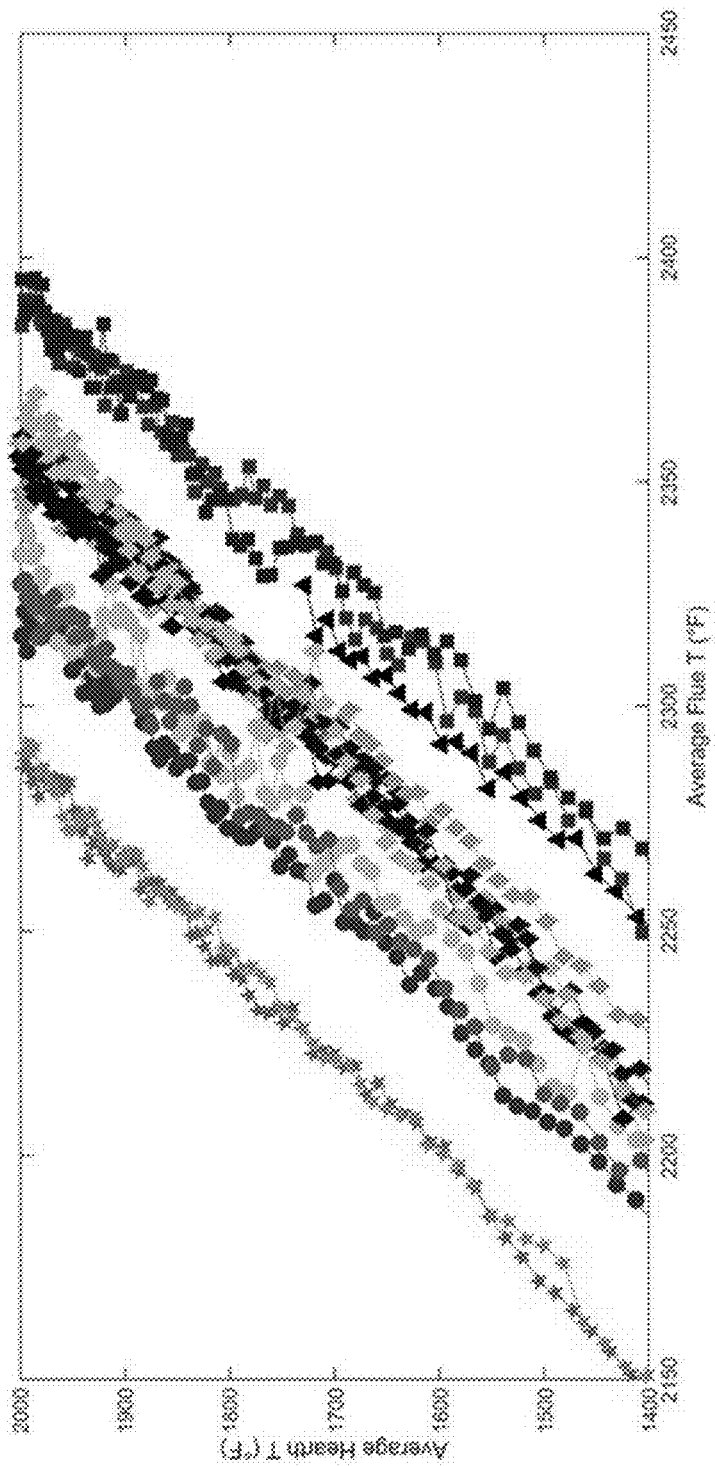
FIG. 35 is a graph of average hearth temperature versus average flue temperature for various burner configurations, wherein a higher hearth temperature for the same flue temperature indicates greater efficiency of heat transfer into a charge in the furnace: Square data points show Burner A with about 5% oxygen staging; Triangle data points shown Burner A with about 65% oxygen staging, which yields increased hearth temperatures for the same flue temperatures; Diamond data points show Burner B with an attached flame over a range of conditions including oxygen staging of about 85% to about 98% and fuel staging of about 85% to about 98% (i.e., the top burner element flowed about 85% to 98% of the fuel and about 2% to 15% of the oxygen, while the bottom burner element flowed about 85% to 98% of the oxygen and about 2% to 15% of the fuel), which yields further increased hearth temperatures for the same flue temperatures; Circle data points show Burner B with a detached or lifted flame and about 90% oxygen staging and about 90% fuel staging (i.e., the top burner element flowed about 90% of the fuel and about 10% of the oxygen, and the bottom burner element flowed about 10% of the fuel and about 90% of the oxygen), which yields further increased hearth temperatures for the same flue temperatures; Star data points show Burner B with a detached or lifted flame and about 85% oxygen staging and 85% fuel staging, which yields further, which yields further increased hearth temperatures for the same flue temperatures.

Furnace bottom temperature data are plotted versus furnace exit gas temperature in FIG. 35 for the several staging ratios of Burner B as compared with Burner. For a given furnace exit gas temperature, and constant burner energy input rate, the data show a very substantial increase in furnace bottom temperature with the present invention, once again giving confirming evidence of higher rates of beneficial downward radiation versus the prior art technology. Specifically, FIG. 35 shows a graphical correlation of average hearth temperature (i.e., temperature indicative of heating a charge in the furnace) with average flue temperature (i.e., temperature indicative of how much heats is lost out the flue and thus is not delivered to the charge). For the same flue temperature, Burner B (a double-staged burner) consistently yields higher hearth temperatures than Burner A (a single-staged burner with oxygen staging), or stated different, for the same hearth temperature, Burner B consistently yields lower flue temperatures than Burner A, meaning that Burner B delivers more heat to the charge and wastes less heat out the flue than Burner A. Moreover, as the staging ratios are increased, the performance of Burner B improves. Specifically, improved hearth temperatures were achieved by moving up through the following conditions: Burner A with 65% oxygen staging (square data points); Burner A with 5% oxygen staging (triangle data points); Burner B with an attached fuel-rich (top) flame under staging ranges 85% to 98% oxygen staging and 85% to 98% fuel staging (diamond data points); Burner B with a detached fuel-rich (top) flame under about 90% oxygen staging and about 90% fuel staging (circle data points); and Burner B with a detached fuel-rich (top) flame under about 85% oxygen staging and about 85% fuel staging (star data points). Note that under attached flame conditions, at least 2% oxygen is required in the fuel-rich burner element to keep the flame from detaching and to keep the fuel-rich flame from sooting too much.

Figures 36A, 36B, 36C:
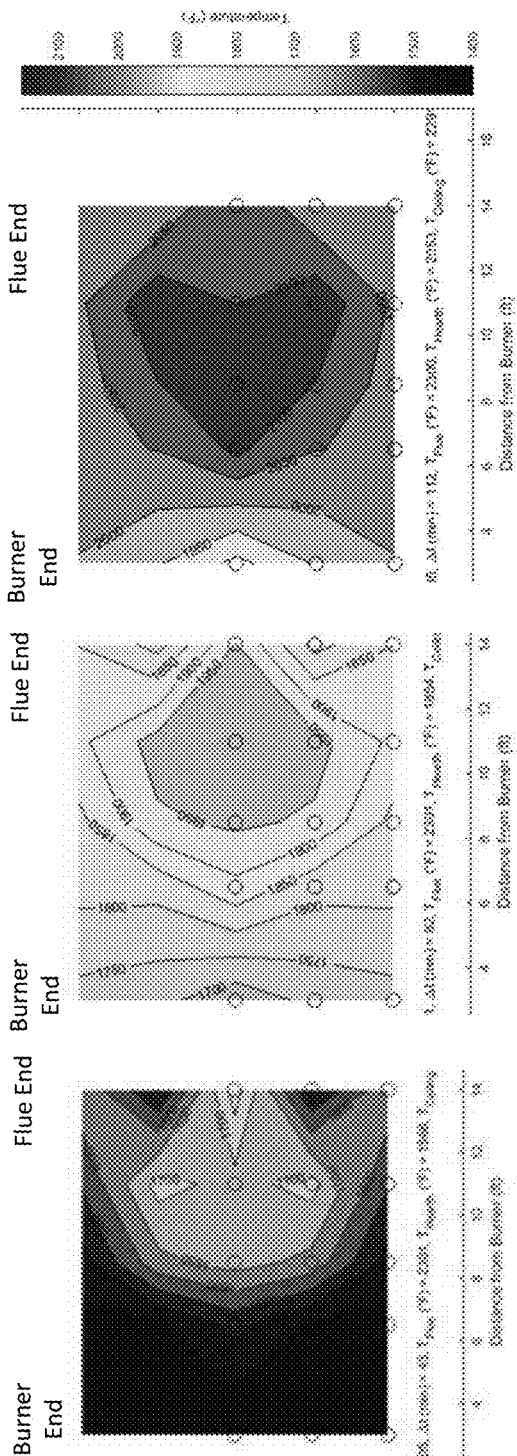
FIGS. 36A-36C are temperature maps comparing the temperature distribution in a furnace resulting from Burner A with 65% oxygen staging (FIG. 36A), Burner B under typical conditions, which may include both attached and detached top (fuel-rich) flames under various staging ratios of both oxygen and fuel (FIG. 36B), and Burner B under maximized heat transfer conditions which produce a detached flame under various staging ratios (FIG. 36C).

FIGS. 36A-36C show similar results as FIG. 35, in a different form. For burners fired at 6 MMBtu/hr, with a 2300° F. flue temperature, the temperature distribution in the furnace is shown. In FIG. 36A, Burner A with 65% oxygen stating exhibits peak temperatures toward the flue end of the furnace of about 1700° F. and trough temperatures near the burner end of the furnace of about 1400° F. In FIG. 36B, Burner B with typical staging exhibits peak temperatures toward the flue end of the furnace of about 1950° F. and trough temperatures near the burner end of the furnace of about 1800° F. In FIG. 36C, Burner B with preferred staging exhibits peak temperatures in about the center of the furnace of about 2100° F., with temperatures uniformly at or above about 2000° F. in most of the furnace, and trough temperatures very close to the burner end of the furnace of about 1950° F.

Figure 37B:
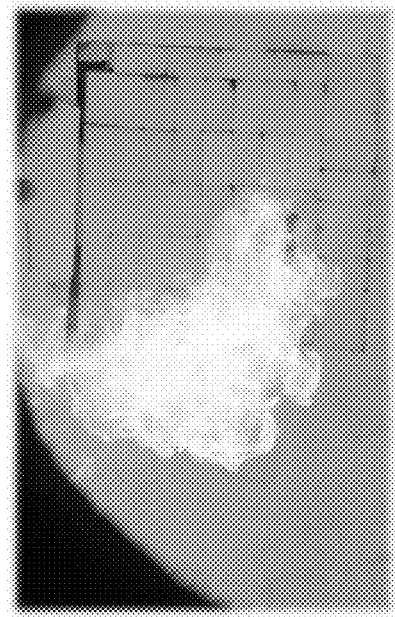
FIGS. 37A-37C are photographic front end views comparing the flames in a furnace resulting from Burner A with about 5% oxygen staging (FIG. 37A), Burner A with about 65% oxygen staging (FIG. 37B), and Burner B with detached fuel-rich flame and both oxygen and fuel staging of at least about 80% (FIG. 37C).
Figure 37C:
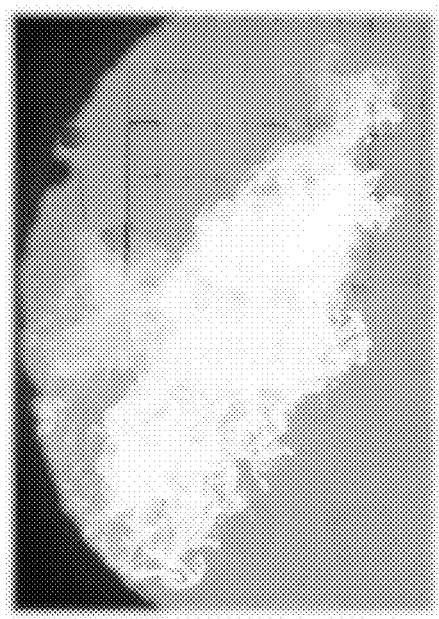
Figure 37A:
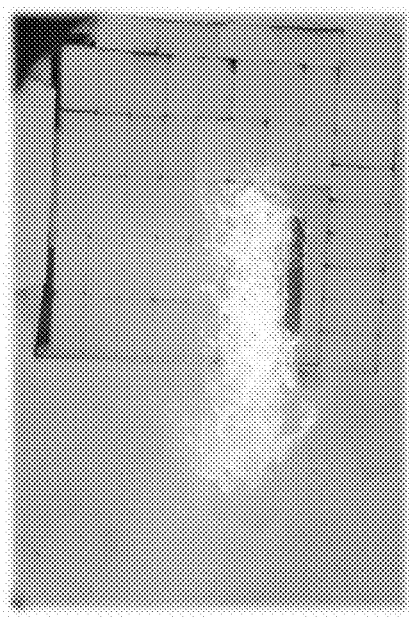

FIGS. 37A-37C show similar comparative results to FIGS. 31A-31C but at a lower firing rate of 4 MMBtu/hr. FIG. 37A shows the flame from a flat flame burner with no staging (Burner A, 5% oxygen staging), FIG. 37B shows a more luminous and voluminous flame from a single-staged flat flame burner with oxygen staging (Burner A, 65% oxygen staging), and FIG. 37C shows a far more luminous and voluminous flame from a double-staged burner at preferred conditions (Burner B with detached fuel-rich (top) flame).

Figure 38B:
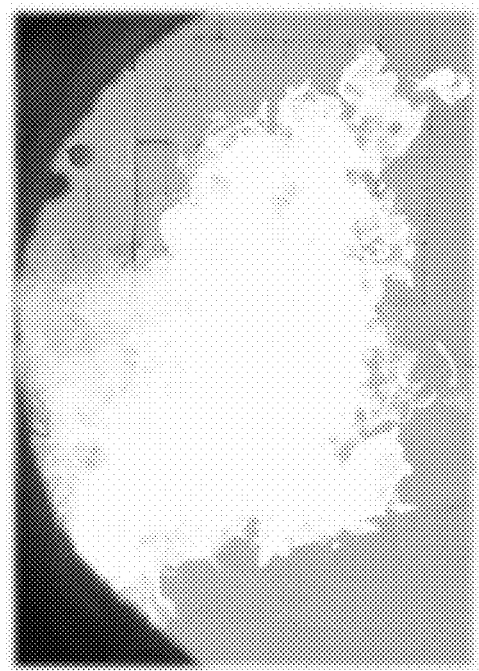
FIGS. 38A-38B are photographic front end views comparing the flames in a furnace resulting from Burner A with 65% oxygen staging (FIG. 38A) and Burner B with detached fuel-rich flame and both oxygen and fuel staging at greater than 80% (FIG. 38B), at a higher firing rate than FIGS. 29B and 29C.
Figure 38A:
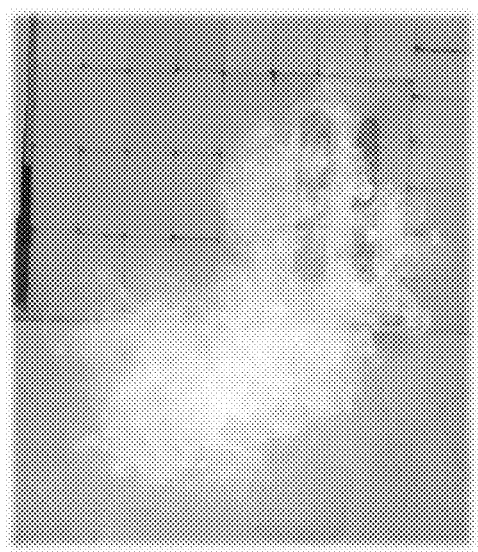

FIGS. 38A and 380B show similar comparative results to FIGS. 37B and 37C, but at a higher firing rate of 6 MMBtu/hr. FIG. 38A shows the flame from a single-staged flat flame burner with oxygen staging (Burner A, 65% oxygen staging) and FIG. 38B shows a far more luminous and voluminous flame from a double-staged burner at optimum conditions (Burner B with detached fuel-rich (top) flame).

Figure 39A:
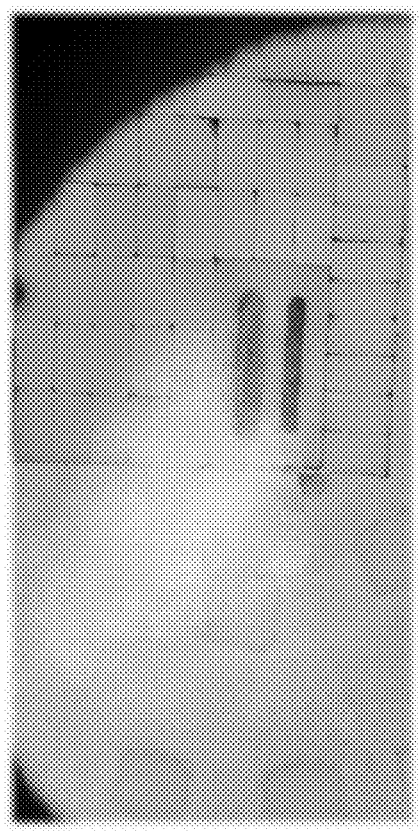
FIGS. 39A-39B are photographic front end views comparing the flames in a furnace resulting from Burner A with 65% oxygen staging (FIG. 39A) and Burner B with detached flame and both oxygen and fuel staging at greater than 80% (FIG. 39B), at a higher firing rate than FIGS. 32A and 32B.
Figure 39B:
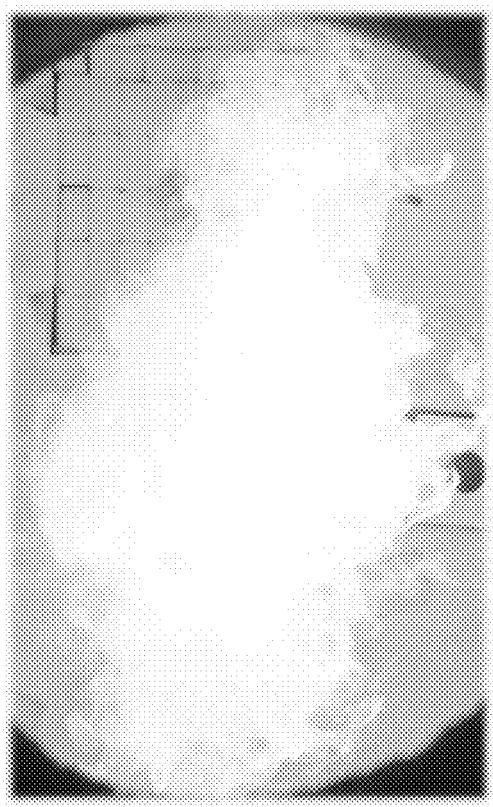

FIGS. 39A and 39B show similar comparative results to FIGS. 38A and 38B, but at a higher firing rate of 10 MMBtu/hr. FIG. 39A shows the flame from a single-staged flat flame burner full oxygen staging (Burner A, 65% oxygen staging) and FIG. 39B shows a far more luminous and voluminous flame from a double-staged burner at preferred conditions (Burner B with detached fuel-rich (top) flame).

Figure 40:
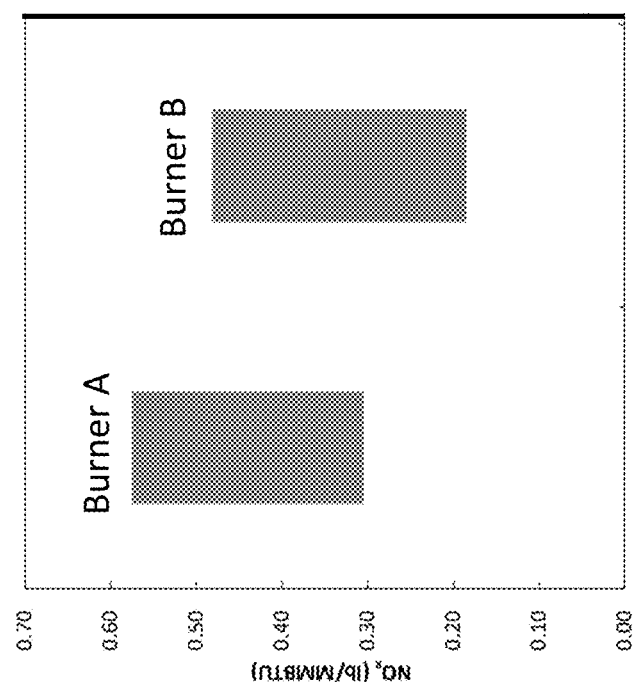
FIG. 40 is graphic comparing the NOx emissions of Burner A with 65% oxygen staging and Burner B with detached flame and both oxygen and fuel staging at greater than 80%, as shown in FIGS. 37B and 37C, showing an approximate 25-30% reduction of NOx with Burner B.

FIG. 40 shows a comparison of NOx production for the burners compared in FIGS. 37B and 37C, 38A and 38B, and 39A and 39C (i.e., 65% oxygen staged Burner A and double staged Burner B with detached fuel-rich flame over a range of firing rates and preferred staging of both oxygen and fuel). Burner B with preferred staging produces 25-30% less NOx over a range of firing rates than Burner A with 65% oxygen staging.

In operation of an embodiment of a double-staged oxy-fuel burner 10 as shown in FIGS. 27 to 29, a flowing fuel-rich mixture is introduced via a wide nozzle into a combustion space atop a flowing fuel-lean mixture, also introduced via a wide nozzle into a combustion space or furnace. In practice, the inventors have unexpectedly found that the fuel-rich mixture typically proceeds unreacted from its nozzle into the combustion space, while the fuel-lean mixture enters the combustion space as a relatively short, high temperature flame containing excess oxygen. Hence, the fuel-lean mixture serves to ignite the underside of the fuel-rich mixture, forming a very high temperature flame interface that propagates across the combustion space, while soot is formed throughout the remainder of the fuel-rich mixture flowing atop the newly-formed very high temperature flame interface. Due to the wide nature of the flame cross-section, radiation is predominantly emitted in the vertical direction, either upwards or downwards. Upwards radiation serves to heat and ignite the optically-thick soot region, and is thus largely blocked from direct penetration through the soot to the furnace crown, thereby keeping the crown relatively cool. By contrast, the downward radiation has a clear path to the bottom of the furnace where it can efficiently deliver heat to the glass melt in an unobstructed manner.

For optimum performance of the burner, it is preferred that the top fuel-rich mixture enters the combustion space in an un-reacted state, since this enables the fuel-rich mixture a substantial amount of preheating prior to ignition. Measurements and observations taken during testing of the double-staged burner 210 strongly suggest that soot is largely formed during this preheating step. Hence, it is important to maintain the fuel-rich mixture concentration in a desired range of equivalence ratio. For example, if the mixture is too rich (not enough oxygen present), while ignition is suppressed, and soot is indeed formed during preheating, combustion of the flame after ignition is relatively weak and diluted, leading to unsatisfactory control of the combustion process. However, if the equivalence ratio of the fuel rich mixture is too low (too much oxygen present), the fuel rich mixture either combusts too rapidly after ignition, or ignites immediately upon exiting the upper nozzle. The latter situation is particularly deleterious for combustion performance since combustion of the fuel rich mixture occurs too rapidly for soot to sufficiently form.

Importantly, the present inventors have discovered that the change of state from a "detached" (i.e., delayed ignition, a preferred operating state) to "attached" (i.e., ignition at nozzle discharge, a not-preferred operating state) of the fuel rich mixture is accompanied by a rapid and simultaneous increase in nozzle tip temperature and fuel pressure entering the nozzle. Hence, one convenient method of detecting this change of state of the flame that is incorporated into the burner 210 is through measurement of these two operating parameters. Examples of such sensors 272 and 274 are shown in FIG. 28, mounted in the first burner element 220 and the second burner element 230, respectively. There are many alternate and equivalent mechanism that could be devised based on current and yet to be developed technology for accomplishing the same objective. For example, detecting the change from an un-reacted to a reacted state could be accomplished by using a UV sensor, or a local electrical current transducer, or other means to detect the presence of ionic flame radical species at the nozzle tip, or the use of an on-line photo image of the flame. Hence, all of these sensors and accompanying methods are incorporated as potential means of detection.

Once an undesirable change from the un-reacted to reacted state is verified by a data processing system, a corrective action should be activated. This corrective action may consist of an alarm, plus either a manual or automatic momentary closure of the oxygen staging valve 244, thus extinguishing the fuel-rich flame at the burner element nozzle. When the oxidizer is re-admitted to the nozzle, the mixture naturally returns to the un-reacted state at the nozzle tip, provided an appropriate equivalence ratio is set within the above-stated range.

Figure 44:
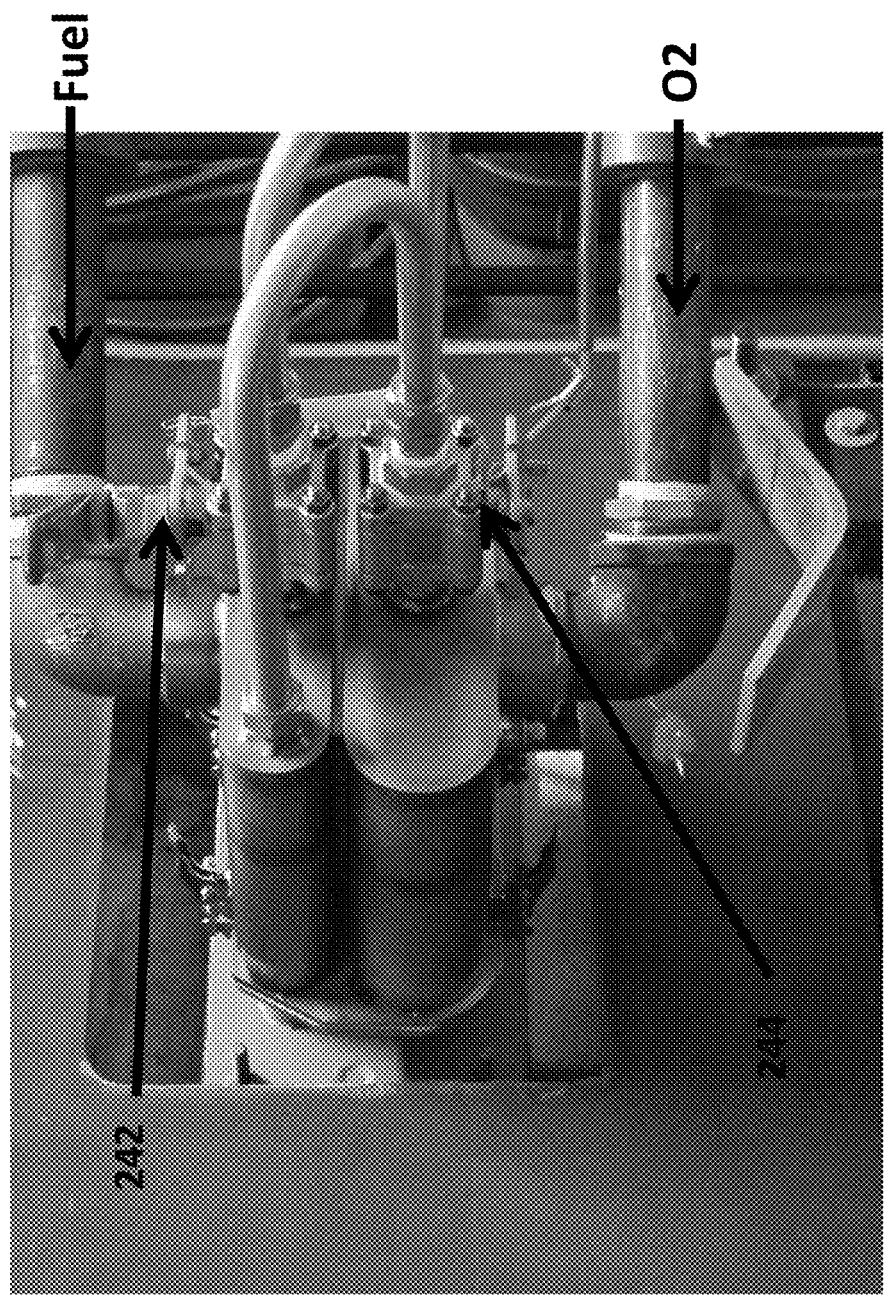
FIG. 44 is a rear photograph of a burner incorporating the two burner elements of the embodiment of FIG. 43 into a single burner.

As described thus far, and with reference to FIGS. 27 to 29, the top (first) burner element 220 and the bottom (second) burner element 230 may be unified into a single burner 210 having one fuel inlet 252 and one oxidizer inlet 254. In this embodiment, the trim or staging functions are carried out using the staging valves 242 and 244 as describe above. Photographs of implementation of this embodiment are shown in FIG. 44 (fuel-rich burner element over fuel-lean burner element) and in FIG. 46 (fuel-lean burner element over fuel-lean burner element). Note that there are many other types and orientations of trim valves or staging valves, not shown herein, that could be equivalently used to accomplish the same functions.

Alternatively, each of the burner elements 220 and 230 could be configured as a separate burner with separately controlled fuel and oxygen flows. FIG. 43, for example, shows a pair of vertically-stacked burners, each burner being equipped with one fuel and one oxygen intake. In one configuration, the top burner comprises a central oxygen nozzle surrounded by an annular fuel nozzle, and operates in a fuel-rich mode according to the limits of equivalence ratio prescribed herein. The top burner element discharges into a pre-combustor (not shown) that separates the burner element (typically made from metal) from the hot furnace environment. The fuel, being present in excess proportion to oxygen, serves the function of cooling the inner pre-combustor wall from flame radiation and impingement (e.g., in the event that the upper flame becomes "attached"). The bottom burner element comprises a central fuel nozzle surrounded by an annular oxygen nozzle, and operates in a fuel-lean or excess oxygen mode according to the limits of equivalence ratio prescribed herein. The bottom burner also discharges into a pre-combustor (not shown) that separates the burner element (typically made from metal) from the hot furnace environment. The oxygen, being present in excess proportion to the fuel, serves the function of cooling the inner pre-combustor wall from flame radiation and impingement. In this embodiment, any "trim" or "staging" functions would be carried out by an external control system on each of the fuel and oxygen intake flows.

The present invention is not to be limited in scope by the specific aspects or embodiments disclosed in the examples which are intended as illustrations of a few aspects of the invention and any embodiments that are functionally equivalent are within the scope of this invention. Various modifications of the invention in addition to those shown and described herein will become apparent to those skilled in the art and are intended to fall within the scope of the appended claims.

The invention claimed is:

1. An oxy-fuel burner comprising:
   a central burner element comprising:
      a central conduit having a central axis and terminating in a central nozzle; and
      an annular conduit terminating in an annular nozzle surrounding and coaxial with the central conduit, the annular conduit and the central conduit being separated by an annular wall;
      the central conduit being arranged to flow a first reactant and the annular conduit being arranged to flow a second reactant;
   a first staging conduit spaced apart from a side of the central burner element and terminating in a first staging nozzle;

a second staging conduit spaced apart from an opposite side the central burner element and terminating in a second staging nozzle;
a first mechanism arranged to apportion a flow of the second reactant into a non-zero primary flow of the second reactant directed to the annular conduit and a non-zero secondary flow of the second reactant; and
a second mechanism arranged to selectively apportion the secondary flow of the second reactant between the first staging conduit and the second staging conduit;
wherein one of the first and second reactants is a fuel and the other of the first and second reactants is oxygen.

2. The oxy-fuel burner of claim 1, wherein the central nozzle and the annular nozzle each have a non-circular shape with an aspect ratio of greater than or equal to 2, wherein the aspect ratio is the ratio of the maximum opening dimension to the minimum opening dimension.

3. The oxy-fuel burner of claim 2, wherein the staging conduits each have a non-circular shape with an aspect ratio of greater than or equal to 2, wherein the aspect ratio is the ratio of the maximum opening dimension to the minimum opening dimension, and wherein an axis defining the maximum opening dimension of the central nozzle and axes defining the respective maximum opening dimensions of each of the staging conduits are substantially parallel to each other.

4. The oxy-fuel burner of claim 1, wherein the first mechanism comprises a variable flow restriction to regulate the primary flow of the second reactant to the annular conduit, thereby indirectly regulating the secondary flow of the second reactant to the second mechanism in a complimentary manner.

5. The oxy-fuel burner of claim 1, wherein the second mechanism comprises a valve to selectively direct the flow of the second reactant between the first staging conduit and the second staging conduit.

6. The oxy-fuel burner of claim 5, wherein the valve is a three-way valve configured to direct the secondary flow of the second reactant to the first staging conduit or to the second staging conduit or to a combination of the first staging conduit and the second staging conduit concurrently.

7. The oxy-fuel burner of claim 1, wherein the first reactant is fuel and the second reactant is oxygen.

8. The oxy-fuel burner of claim 1, wherein the first reactant is oxygen and the second reactant is fuel.

9. The oxy-fuel burner of claim 1, further comprising an apparatus for sensing conditions within a furnace into which the burner is firing, the apparatus being configured to actuate the second mechanism to direct the secondary flow of the second reactant to the first staging conduit or to the second staging conduit or to a combination of the first staging conduit and the second staging conduit concurrently, depending on the sensed condition.

10. The oxy-fuel burner of claim 1, further comprising a burner block having a central passage into which the central burner element exhausts, and first and second staging passages into which the first and second staging nozzles, respectively, exhaust.

11. The oxy-fuel burner of claim 1, further comprising:
a bluff body positioned in the annular nozzle and forming an inner nozzle on one side of the bluff body proximal to the annular wall and an outer nozzle on an opposite side of the bluff body distal from the annular wall, the inner nozzle having a smaller cross-sectional area than the outer nozzle.

12. The oxy-fuel burner of claim 11, wherein the inner nozzle has a non-zero cross-sectional area no more than 10% that of the outer nozzle.

13. The oxy-fuel burner of claim 11, further comprising:
a bluff body having a height, the bluff body being positioned on the central axis of the central conduit and upstream of the central nozzle by an axial distance of 2 to 20 times the bluff body height.

14. The oxy-fuel burner of claim 13, further comprising:
a splitter plate positioned along the central axis of the central conduit downstream of the bluff body, the splitter plate having a length of 1 to 10 times the bluff body height.

15. A method of operating an oxy-fuel glass furnace containing a glass bath and comprising a melting region and a refining region, wherein a first plurality of the oxy-fuel burners of claim 1 are positioned to fire in the melting region and a second plurality of the oxy-fuel burners of claim 1 are positioned to fire in the refining region, wherein for each burner the first staging conduit is positioned between the central burner element and the glass bath and the second staging conduit is positioned between the central burner element and a roof of the furnace, the method comprising:
flowing fuel as the first reactant and oxygen as the second reactant;
operating the first plurality of oxy-fuel burners to create an oxygen-rich (oxidizing) atmosphere adjacent to the glass bath; and
operating the second plurality of oxy-fuel burners to create a fuel-rich (reducing) atmosphere adjacent to the glass bath.

16. The method of claim 15,
where the oxidizing atmosphere is created by apportioning at least 50% of the secondary oxygen flow in the first plurality of oxy-fuel burners to the first staging conduit; and
wherein the reducing atmosphere is created by apportioning at least 70% of the secondary oxygen flow to the second staging conduit.

17. The method of claim 15,
wherein the oxidizing atmosphere is created by operating the first plurality of oxy-fuel burners fuel-lean with a stoichiometric ratio of greater than 1; and
wherein the reducing atmosphere is created by operating the second plurality of oxy-fuel burners fuel-rich with a stoichiometric ratio of greater than 1;
wherein a stoichiometric ratio of a burner is defined as the ratio of oxygen to fuel flow through the burner divided by the ratio of oxygen to fuel flow required for theoretically complete stoichiometric combustion with zero excess oxygen.

18. The method of claim 15, further comprising:
measuring at least one furnace parameter selected from the group of: a parameter indicating a glass surface condition, a furnace temperature profile, a furnace exit gas temperature, and a furnace gas exit composition; and
for at least one of the oxy-fuel burners, controlling one or more of firing rate, oxygen/fuel ratio, and distribution of secondary oxygen flow based on the at least one measured furnace parameter.

19. The method of claim 18, further comprising:
when the measured parameter indicates glass surface foam, switching at least one of the burners in the first plurality of oxy-fuel burners from creating an oxidizing atmosphere adjacent to the glass bath to creating a reducing atmosphere adjacent to the glass bath.

* * * * *